(12) United States Patent
Ravikovitch et al.

(10) Patent No.: US 10,744,449 B2
(45) Date of Patent: Aug. 18, 2020

(54) ADSORBENT MATERIALS AND METHODS OF ADSORBING CARBON DIOXIDE

(71) Applicants: ExxonMobil Upstream Research Company, Spring, TX (US); Georgia Tech Research Corporation, Atlanta, GA (US)

(72) Inventors: Peter I Ravikovitch, Spring, TX (US); David Sholl, Atlanta, GA (US); Charanjit Paur, Spring, TX (US); Karl G. Strohmaier, Spring, TX (US); Hanjun Fang, Atlanta, GA (US); Ambarish R. Kulkarni, Atlanta, GA (US); Rohan V. Awati, Atlanta, GA (US); Preeti Kamakoti, Spring, TX (US)

(73) Assignees: Exxonmobil Upstream Research Company, Spring, TX (US); Georgia Tech Research Corporation, Atlanta, GA (US)

( * ) Notice: Subject to any disclaimer, the term of this patent is extended or adjusted under 35 U.S.C. 154(b) by 550 days.

(21) Appl. No.: 15/351,693

(22) Filed: Nov. 15, 2016

(65) Prior Publication Data

US 2017/0136405 A1 May 18, 2017

Related U.S. Application Data

(60) Provisional application No. 62/337,991, filed on May 18, 2016, provisional application No. 62/255,789, filed on Nov. 16, 2015.

(51) Int. Cl.

| | |
|---|---|
| *B01D 53/02* | (2006.01) |
| *B01D 53/04* | (2006.01) |
| *B01D 53/047* | (2006.01) |
| *B01J 20/18* | (2006.01) |
| *B01J 20/34* | (2006.01) |
| *C10L 3/10* | (2006.01) |

(52) U.S. Cl.
CPC ......... *B01D 53/0462* (2013.01); *B01D 53/02* (2013.01); *B01D 53/047* (2013.01); *B01D 53/0476* (2013.01); *B01J 20/18* (2013.01); *B01J 20/3491* (2013.01); *C10L 3/104* (2013.01); *B01D 2253/1085* (2013.01); *B01D 2253/34* (2013.01); *B01D 2253/3425* (2013.01); *B01D 2257/504* (2013.01); *C10L 2290/12* (2013.01); *C10L 2290/542* (2013.01); *Y02C 10/08* (2013.01)

(58) Field of Classification Search
CPC ........ B01D 2253/1085; B01D 2253/34; B01D 2253/3425; B01D 2257/504; B01D 53/02; B01D 53/0462; B01D 53/047; B01D 53/0476; B01J 20/18; B01J 20/3491; C10L 2290/12; C10L 2290/542; C10L 3/104; Y02C 10/08
See application file for complete search history.

(56) References Cited

U.S. PATENT DOCUMENTS

| | | |
|---|---|---|
| 1,868,138 A | 7/1932 | Fisk |
| 3,103,425 A | 9/1963 | Meyer |
| 3,124,152 A | 3/1964 | Payne |
| 3,142,547 A | 7/1964 | Marsh et al. |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |

(Continued)

FOREIGN PATENT DOCUMENTS

| | | |
|---|---|---|
| EP | 0257493 A1 | 2/1988 |
| EP | 0426937 A1 | 5/1991 |

(Continued)

OTHER PUBLICATIONS

Burtch, Nicholas C. et al., "Molecular-level Insight into Unusual Low Pressure CO2 Affinity in Pillared Metal-Organic Frameworks," J Am Chem Soc, 2013, 7172, 135, ACS Publications.

Cheung, Ocean et al., "Adsorption kinetics for CO2 on highly selective zeolites NaKA and nano-NaKA," Appl Energ, 2013, 1326, 112, Elsevier Ltd.

Fang, Hanjun et al., "Prediction of CO2 Adsorption Properties in Zeolites Using Force Fields Derived from Periodic Dispersion-Corrected DFT Calculations," J Phys Chem C, 2012, 10692, 116, ACS Publications.

Fang, Hanjun et al., "First principles derived, transferable force fields for CO2 adsorption in Na-exchanged cationic zeolites," Phys Chem Chem Phys, 2013, 12882, 15, RSC Publishing.

(Continued)

*Primary Examiner* — Christopher P Jones
(74) *Attorney, Agent, or Firm* — Troutman Pepper Hamilton Sanders LLP

(57) ABSTRACT

Methods of designing zeolite materials for adsorption of $CO_2$. Zeolite materials and processes for $CO_2$ adsorption using zeolite materials.

12 Claims, 6 Drawing Sheets

(56) References Cited

U.S. PATENT DOCUMENTS

| | | | |
|---|---|---|---|
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,767 A * | 7/1998 | Golden .............. B01D 53/0462 95/106 |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,882,380 A | 3/1999 | Sircar |
| 5,906,673 A | 5/1999 | Reinhold, III et al. |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 * | 9/2001 | Lu ......................... B01D 53/02 95/102 |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |

(56) References Cited

U.S. PATENT DOCUMENTS

| | | |
|---|---|---|
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,737,846 B2 | 8/2017 | Carstensen et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0150378 A1 | 7/2005 | Dunne et al. |

(56) References Cited

U.S. PATENT DOCUMENTS

| | | |
|---|---|---|
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1* | 9/2012 | Kamakoti .......... B01D 53/0438 95/99 |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0217943 A1* | 8/2013 | Minoux .................. C07C 1/24 585/640 |
| 2013/0225898 A1 | 8/2013 | Sundaram et al. |
| 2013/0340620 A1* | 12/2013 | Sundaram .......... B01D 53/0407 96/126 |
| 2014/0013955 A1* | 1/2014 | Tammera .................. B01J 20/10 96/115 |
| 2014/0033919 A1* | 2/2014 | Deckman ............ B01D 53/0473 95/100 |
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0174291 A1* | 6/2014 | Gupta .................... B01D 53/06 95/96 |
| 2014/0208797 A1 | 7/2014 | Kelley et al. |
| 2014/0216254 A1 | 8/2014 | Tammera et al. |
| 2014/0364672 A1* | 12/2014 | Bracco ................ B01J 20/3078 585/823 |
| 2014/0371478 A1* | 12/2014 | Schmitt .............. B01D 53/1425 556/40 |
| 2015/0013377 A1 | 1/2015 | Oelfke |
| 2015/0068397 A1 | 3/2015 | Boulet et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0121258 A1* | 5/2016 | First ...................... B01D 53/04 95/139 |
| 2016/0129433 A1 | 5/2016 | Tammera et al. |
| 2016/0166972 A1 | 6/2016 | Owens et al. |
| 2016/0167016 A1* | 6/2016 | Li ............................. C08F 2/10 95/96 |
| 2016/0175815 A1* | 6/2016 | Brody ................ B01J 20/28045 95/96 |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0296980 A1* | 10/2017 | Noda .................. B01J 20/28033 |
| 2017/0341011 A1 | 11/2017 | Nagavarapu et al. |
| 2017/0341012 A1 | 11/2017 | Nagavarapu et al. |
| 2017/0355650 A1* | 12/2017 | Minoux .................. C07C 1/24 |
| 2018/0001301 A1 | 1/2018 | Brody et al. |
| 2018/0015407 A1* | 1/2018 | Vittenet ................ B01J 20/186 |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |

FOREIGN PATENT DOCUMENTS

| | | |
|---|---|---|
| EP | 0904827 A1 | 3/1999 |
| EP | 1674555 A1 | 6/2006 |
| EP | 2823872 A2 | 1/2015 |
| FR | 2854819 A3 | 11/2004 |
| FR | 2924951 A1 | 6/2009 |
| FR | 2979253 A1 | 3/2013 |
| JP | 58-114715 A | 7/1983 |
| JP | 59-232174 A | 12/1984 |

(56) References Cited

FOREIGN PATENT DOCUMENTS

| | | | |
|---|---|---|---|
| JP | 60-189318 A | 9/1985 | |
| JP | 2002-253818 A | 10/1990 | |
| JP | 04-180978 A | 6/1992 | |
| JP | 06006736 | 6/1992 | |
| JP | 3477280 A | 8/1995 | |
| JP | 2011-169640 A | 6/1999 | |
| JP | 2011-280921 A | 10/1999 | |
| JP | 2000-024445 A | 1/2000 | |
| JP | 2002-348651 A | 12/2002 | |
| JP | 2006-016470 A | 1/2006 | |
| JP | 2006-036849 A | 2/2006 | |
| JP | 2008-272534 A | 11/2008 | |
| KR | 101349424 A | 1/2014 | |
| WO | 2002/024309 A1 | 3/2002 | |
| WO | 2002/073728 A1 | 9/2002 | |
| WO | 2005/090793 A1 | 9/2005 | |
| WO | 2010/024643 A1 | 3/2010 | |
| WO | 2011/139894 A1 | 11/2011 | |

OTHER PUBLICATIONS

Liu, Qingling et al., "NaKA sorbents with high CO2-over-N2 selectivity and high capacity to adsorb CO2," Chem Commun, 2010, 4502, 46, RSC Publishing.

Pham, Trong D. et al., "Carbon Dioxide and Nitrogen Adsorption on Cation-Exchanged SSZ-13 Zeolites," Langmuir, 2013, 832, 29, ACS Publications.

Reyes, Sebastian C. et al., "Frequency Modulation Methods for Diffusion and Adsorption Measurements in Porous Solids," J Phys Chem B, 1997, 614, 101, ACS Publications.

Walton, Krista S. et al., "CO2 adsorption in Y and X zeolites modified by alkali metal cation exchange," Micropor Mesopor Mat, 2006, 78, 91, Elsevier Inc.

Zukal Arnost et al., "Isosteric heats of adsorption of carbon dioxide on zeolite MCM-22 modified by alkali metal cations," Adsorption, 2009, 264, 15, Springer.

Harris, Jonathan G. et al., "Carbon Dioxide's Liquid—Vapor Coexistence Curve and Critical Properties as Predicted by a Simple Molecular Model," J Phys Chem, 1995, 12021, 99, ACS Publications.

Demiralp, Ersan et al., "Morse Stretch Potential Charge Equilibrium Force Field for Ceramics: Application to the Quartz-Stishovite Phase Transition and to Silica Glass," Phys Rev Lett, 1999, 1708, 82(8), American Physical Society.

Peng, Ding-Yu et al., "A New Two-Constant Equation of State," Ind Eng Chem Fundam, 1976, 59, 15(1).

Cygan, Randall T. et al., "Molecular Models of Hydroxide, Oxyhydroxide, and Clay Phases and the Development of a General Force Field," J Phys Chem B, 2004, 1255, 108, ACS Publications.

Talu, Orhan et al., "Reference potentials for adsorption of helium, argon, methane, and krypton in high-silica zeolites," Colloids and Surfaces A: Physicochemical and Engineering Aspects, 2001, 187, 83-93, Elsevier Science B.V.

Deem, Michael W. et al., "Computational Discovery of New Zeolite-Like Materials," J Phys Chem C, 2009, 21353, 113, ACS Publications.

Pophale, Ramdas et al., "A database of new zeolite-like materials," Phys Chem Chem Phys, 2011, 12407, 13(27).

Hill, Jorg-R. et al., "Molecular Mechanics Potential for Silica and Zeolite Catalysts Based on ab Initio Calculations. 2. Aluminosilicates," J Phys Chem, 1995, 9536, 99, ACS Publications.

Lowenstein, Walter, "The Distribution of Aluminum in the Tetra-Nedra of Silicates and Aluminates," Am Mineral, 1954, 92, 39.

Beauvais, Christele et al., "Distribution of Sodium Cations in Faujasite-Type Zeolite: A Canonical Parallel Tempering Simulation Study," J Phys Chem B, 2004, 399, 108, ACS Publications.

Earl, David J. et al., "Parallel tempering: Theory, applications, and new perspectives," Phys Chem Chem Phys, 2005, 3910; 7.

Dubbeldam, David et al. "RASPA: molecular simulation software for adsorption and diffusion in flexible nanoporous materials," Mol Simul, 2016 (published online Feb. 26, 2015), 81, 42(2), Taylor & Francis.

Dubbeldam, David et al., "On the inner workings of Monte Carlo codes," Mol Simul, 2013, 1253, 39, Taylor & Francis.

Allen, M. P. et al., Computer Simulation of Liquids, 1987, Clarendon Press.

Frenkel, Daan et al., Understanding Molecular Simulation: From Algorithms to Applications, 2002, pp. 292-301, 2nd ed. Academic Press.

Robinson, Donald B. et al., "The development of the Peng-Robinson Equation and its Application to Phase Equilibrium in a System Containing Methanol," Fluid Phase Equilibria, 1985, 25, 24, Elsevier Science Publishers B.V.

Snurr, Randall Q. et al., "Prediction of Adsorption of Aromatic Hydrocarbons in Silicalite from Grand Canonical Monte Carlo Simulations with Biased Insertions," J Phys Chem, 1993, 13742, 97, ACS Publishing.

Potoff, Jeffrey J. et al., "Vapor-Liquid Equilibria of Mixtures Containing Alkanes, Carbon Dioxide, and Nitrogen," AIChE J, 2001, 1676, 47(7).

Willems, T. F. et al., "Algorithms and tools for high-throughput geometry-based analysis of crystalline porous materials," Micropor Mesopar Mat, 2012, 134, 149, Elsevier, Inc.

Neimark, Alexander V. et al., "Calibration of Pore Volume in Adsorption Experiments and Theoretical Models," Langmuir, 1997, 5148, 13, ACS Publications.

References provided in the International Zeolite Association's "Database of Zeolite Structures," (www.iza-structure.org/databases), available at http://america.iza-structure.org/IZA-SC/search_ref.html.

Baerlocher, C. et al., International Zeolite Association's "Database of Zeolite Structures," available at http://www.iza-structure.org/databases/.

U.S. Appl. No. 16/252,975, filed Jan. 21, 2019, Krishna Nagavarapu et al.

U.S. Appl. No. 16/258,266, filed Jan. 25, 2019, Barnes et al.

U.S. Appl. No. 16/263,940, filed Jan. 31, 2019, Johnson.

U.S. Appl. No. 62/783,766, filed Dec. 21, 2019, Fulton et al.

Exxonmobil Research and Engineering and Questair (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Countercurrent Flow Model for a Bulk PSA Separation Process," *AIChE J.*, vol. 36, No. 2, pp. 310-314.

Flowserve (2005) "Exceeding Expectations, US Navy Cuts Maintenance Costs With Flowserve GX-200 Non-Contacting Seal Retrofits," *Face-to-Face*, vol. 17, No. 1, 8 pgs.

GE Oil & Gas (2007) "Dry Gas Seal Retrofit," Florence, Italy, www.ge.com/oilandgas, 3 pgs.

Hopper, B. et al. (2008) "World's First 10,000 PSI Sour Gas Injection Compressor," *Proceedings of the 37th Turbomachinery Symposium*, pp. 73-94.

Kärger, J. et al. (2012) "Diffusion in Nanoporous Materials," Whiley-VCH Verlag GmbH & Co. KGaA, publisher, vol. 1, Chapter 14, pp. 459-513.

Kikkinides, E. S. et al. (1995) "Natural Gas Desulfurization by Adsorption: Feasibility and Multiplicity of Cyclic Steady States," *Ind. Eng. Chem. Res.* vol. 34, pp. 255-262.

Patcas, F.C. et al. (2007) "CO Oxidation Over Structured Carriers: A Comparison of Ceramic Foams, Honeycombs and Beads," *Chemical Engineering Science*, vol. 62, pp. 3984-3990.

Rameshni, Mahin "Strategies for Sour Gas Field Developments," *Worley Parsons-Brochure*, 20 pgs. http://www.mcilvainecompany.com/Decision_Tree/subscriber/articles/Strategies_for_Sour_Gas_Field_Developments.pdf.

Rezaei, F. et al. (2009) "Optimum Structured Adsorbents for Gas Separation Process," *Chem. Engineering Science*, vol. 64, pp. 5182-5191.

Richardson, J.T. et al. (2000) "Properties of Ceramic Foam Catalyst Supports: Pressure Drop," *Applied Catalysis A: General* vol. 204, pp. 19-32.

Ruthven, D. M. et al. (1997) "Performance of a Parallel Passage Adsorbent Contactor," *Separation and Purification Technology*, vol. 12, pp. 43-60.

(56) References Cited

OTHER PUBLICATIONS

Stahley, J. S. (2003) "Design, Operation, and Maintenance Considerations for Improved Dry Gas Seal Reliability in Centrifugal Compressors," *Dresser-Rand*, 15 pages.

Santos, M. S. et al. (2011) "New Cycle Configuration to Enhance Performance of Kinetic PSA Processes," *Chemical Engineering Science*, vol. 66, pp. 1590-1599.

Stemmet, C.P. et al. (2006) "Solid Foam Packings for Multiphase Reactors: Modelling of Liquid Holdup and Mass Transfer," *Chemical Engineering Research and Design*, vol. 84(A12), pp. 1134-1141.

Suzuki, M. (1985) "Continuous-Countercurrent-Flow Approximation for Dynamic Steady State Profile of Pressure Swing Adsorption," *AIChE Symposium Series* vol. 81, No. 242, pp. 67-73.

International Search Report and Written Opinion of the International Searching Authority for related International Patent Application No. PCT/US2016/062034 dated Mar. 9, 2017.

Hill, Jorg-R. et al., "Molecular Mechanics Potential for Silica and Zeolite Catalysts Based on ab Indio Calculations. 2. Aluminosilicates," J Phys Chem, 1995, 9536, 99, ACS Publications.

Potoff, Jeffrey J. et al., "Vapor-Liquid Equilibria of Mixtures Containing Alkanes, Carbon Dioxide, and Nitrogen," AIChE J, 2001, 1676, 47(7).

Jaramillo et al., Adsorption of Small Molecules in LTA Zeolites. 1. NH3, CO2, and H2O in Zeolite 4A, 108 J. Phys. Chem. B. 20155-20159 (2004) (2004JPCB).

Maurin et al., Adsorption Mechanism of Carbon Dioxide in Faujasites: Grand Canonical Monte Carlo Simulations and Microcalorimetry Measurements, 109 J. Phys. Chem. B. 16084-16091 (2005) (2005JPCB).

Garcia-Sanchez et al., Transferable Force Filed for Carbon Dioxide Adsorption in Zeolites, 113 J. Phys. Chem. C. 8814-8820 (2009) (2009JPCB).

Fang et al., First Principles Derived, Transferable Force Fields for CO2 Adsorption in Na-Exchanged Cationic Zeolites, 15 Phys. Chem. Chem. Phys. 12882-12894 (2013).

Pham et al., Carbon Dioxide and Nitrogen Adsorption on Cation-Exchanged SSZ-13 Zeolites, 29 Langmuir 832-839 (2013) (Exp. data).

Preeti Kamakoti, Modeling Adsorption in Cationic Zeolites-Trials and Tribulations, Presentation at Gordon Research Conference for Nanoporous Materials and Their Applications, (Aug. 11, 2015).

Fang et al., Identification of High-CO2-Capacity Cationic Zeolites by Accurate Computational Screening, 28 Chem Mater. 3887-3896 (2016).

Exam Report No. 2 from corresponding Australian Application No. 2016357289 dated Sep. 9, 2019.

* cited by examiner

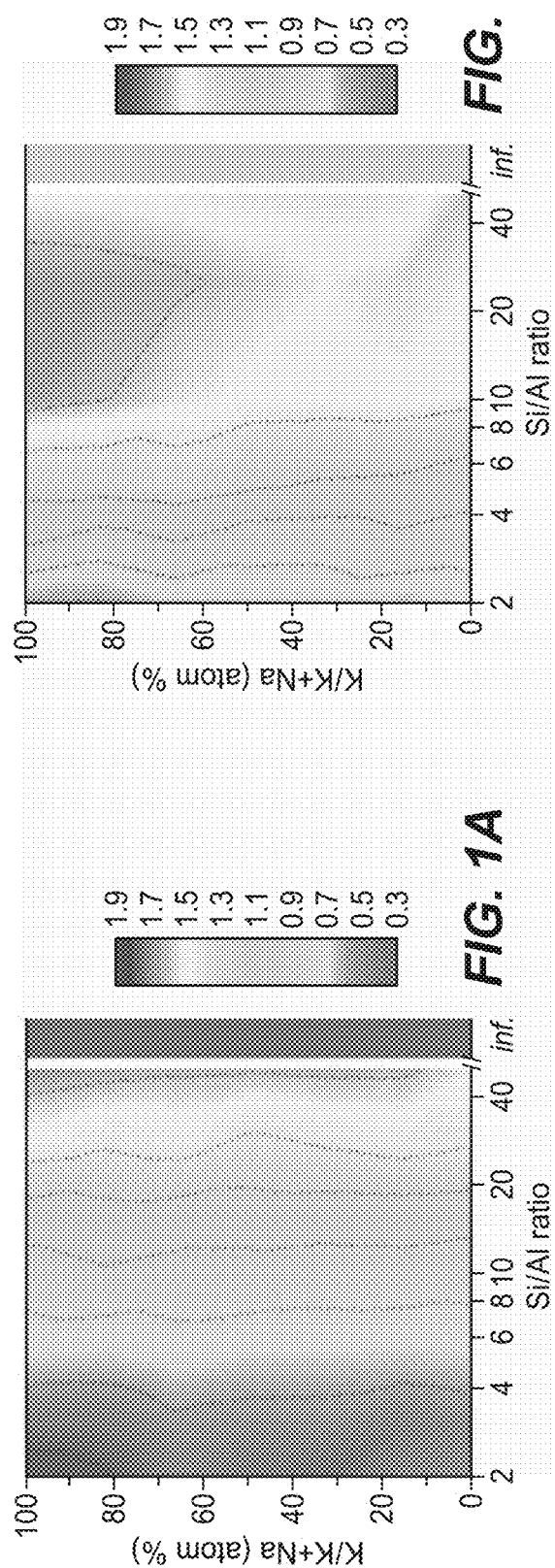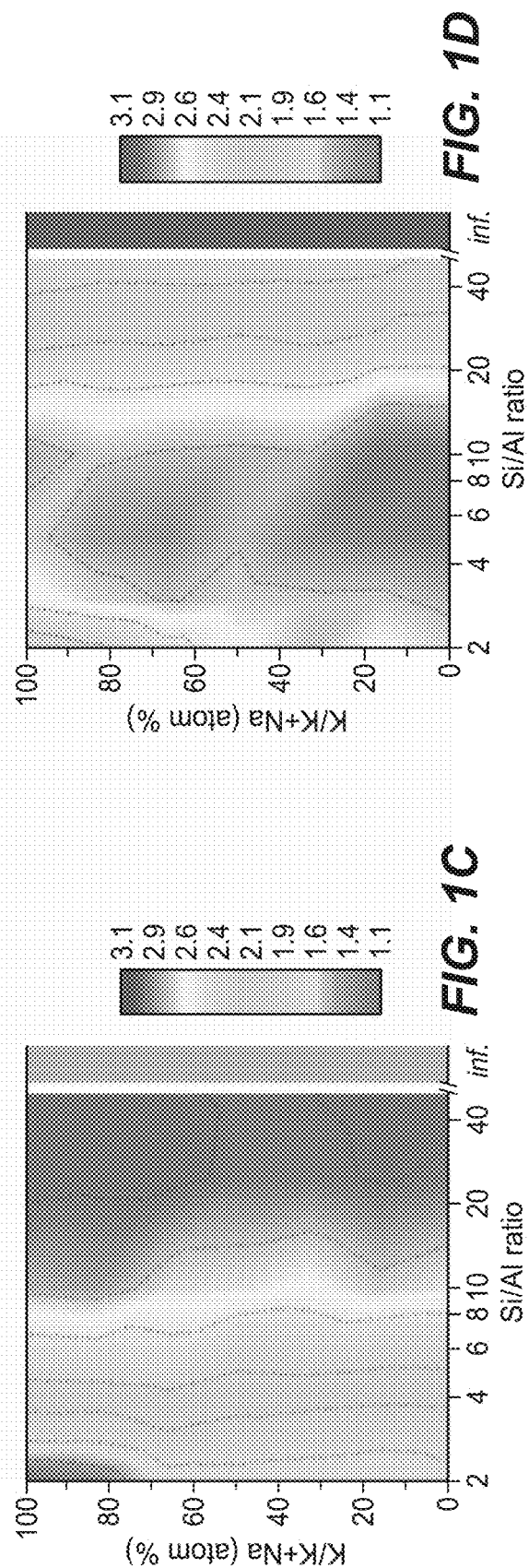

ADSORBENT MATERIALS AND METHODS OF ADSORBING CARBON DIOXIDE

CROSS-REFERENCE TO RELATED APPLICATIONS

This application claims the benefit of U.S. Provisional Patent Application No. 62/337,991, filed 18 May 2016, entitled Absorbent Materials And Methods Of Absorbing Carbon Dioxide and U.S. Provisional Patent Application No. 62/255,789, filed 16 Nov. 2015, entitled Absorbent Materials And Methods Of Absorbing Carbon Dioxide, the entirety of which is incorporated by reference herein.

FIELD

The present invention relates to methods of designing zeolite materials for adsorption of $CO_2$ and processes for $CO_2$ adsorption.

BACKGROUND

Gas separation is important in many industries for removing undesirable contaminants from a gas stream and for achieving a desired gas composition. For example, natural gas from many gas fields can contain significant levels of $H_2O$, $SO_2$, $H_2S$, $CO_2$, $N_2$, mercaptans, and/or heavy hydrocarbons that have to be removed to various degrees before the gas can be transported to market. It is preferred that as much of the acid gases $H_2S$ and $CO_2$ be removed from natural gas as possible to leave methane as the recovered component. Natural gas containing a high concentration of $CO_2$ should not be directly introduced into pipelines because it may be corrosive to the pipelines in the presence of water. Furthermore, small increases in recovery of methane can result in significant improvements in process economics and also serve to prevent unwanted resource loss. It is desirable to recover more than 80 vol %, particularly more than 90 vol %, of the methane when detrimental impurities are removed.

Additionally, synthesis gas (syngas) typically requires removal and separation of various components before it can be used in fuel, chemical and power applications because all of these applications have a specification of the exact composition of the syngas required for the process. As produced, syngas can contain at least CO and $H_2$. Other molecular components in syngas can be $CH_4$, $CO_2$, $H_2S$, $H_2O$, $N_2$, and combinations thereof. Minority (or trace) components in the gas can include hydrocarbons, $NH_3$, $NO_x$, and the like, and combinations thereof. In almost all applications, most of the $H_2S$ should typically be removed from the syngas before it can be used, and, in many applications, it can be desirable to remove much of the $CO_2$.

Adsorptive gas separation techniques are common in various industries using solid sorbent materials such as activated charcoal or a porous solid oxide such as alumina, silica-alumina, silica, or a crystalline zeolite. The selection of suitable zeolite materials is critical for $CO_2$ capture and separation. However, a significant challenge exists in arriving at suitable materials because of the large diversity of zeolite compositions. For example, there are approximately 220 zeolite topologies recognized by the International Zeolite Society, which may have varying Si/Al ratios as well as varying cation concentrations resulting in numerous possible zeolite materials. Thus, there is not only a need for zeolite materials with improved adsorption capacity for a gas contaminant, such as $CO_2$, which can be used in various gas separation processes but also a need for improved methods for identifying suitable zeolite materials for $CO_2$ adsorption.

SUMMARY

Thus, in one aspect, embodiments of the invention provide a pressure swing adsorption process for separating $CO_2$ from a feed gas mixture, wherein the process comprises a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite having a Si/Al ratio above about 100 and a framework structure selected from the group consisting of AFT, AFX, DAC, EMT, EUO, IMF, ITH, ITT, KFI, LAU, MFS, MRE, MTT, MWW, NES, PAU, RRO, SFF, STF, STI, SZR, TER, TON, TSC, TUN, VFI, and a combination thereof; or (ii) a zeolite with a framework structure selected from the group consisting of CAS, EMT, FAU, HEU, IRR, IRY, ITT, LTA, RWY, TSC and VFI, and a combination thereof, having: (a) a Si/Al ratio of about 5 to about 85; and (b) a potassium cation concentration of about 5% to about 100%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) reducing the pressure in the adsorption bed to a second pressure resulting in desorption of at least a portion of $CO_2$ from the adsorbent bed; and d) recovering at least a portion of $CO_2$ from the adsorbent bed.

In still another aspect, embodiments of the invention provide a pressure swing adsorption process for separating $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises a zeolite having a Si/Al ratio of between about 5 and about 45 and with a framework structure selected from the group consisting of CHA, FAU, FER, LTA, MFI, RHO, UFI, and a combination thereof; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) reducing the pressure in the adsorption bed to a second pressure resulting in desorption of at least a portion of $CO_2$ from the adsorbent bed; and d) recovering at least a portion of $CO_2$ from the adsorbent bed.

In still another aspect, embodiments of the invention provide an a pressure temperature swing adsorption process for separating a $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite having a Si/Al ratio above about 100 and a framework structure selected from the group consisting of AFT, AFX, CAS, DAC, HEU, IMF, ITH, KFI, LAU, MFS, MTT, PAU, RRO, SFF, STF, SXR, TER, TON, TUN, and a combination thereof; or a zeolite with a framework structure selected from the group consisting of AFT, AFX, CHA, EMT, EUO, FAU, IRR, IRY, ITT, KFI, LTA, MRE, MWW, NES, PAU, RHO, RWY, SFF, STI, TSC, UFI, VFI, and a combination thereof, having: (a) a Si/Al ratio of about 3 to about 100; and (b) a potassium cation concentration of about 1% to about 100%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) heating the adsorbent bed to a second temperature higher than the first temperature, resulting in desorption of at least a portion of $CO_2$ from the adsorbent bed and recovering at least a first portion of $CO_2$; and d) reducing the pressure of the adsorbent bed to a second pressure lower than the first pressure and recovering a second portion of $CO_2$.

In still another aspect, embodiments of the invention provide a vacuum swing adsorption process for separating $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following; (i) a zeolite having a Si/Al ratio above about 100 and a framework structure selected from the group consisting of CAS, DAC, HEU, LAU, MTT, RRO, TON, and a combination thereof; or (ii) a zeolite with a framework structure selected from the group consisting of AFT, AFX, EMT, EUO, IMF, IRR, IRY, ITH, ITT, KFI, MFS, MRE, MWW, NES, PAU, RWY, SFF, STF, STI, SZR, TER, TSC, TUN, VFI, and a combination thereof, having: (a) a Si/Al ratio of about 1 to about 100; and (b) a potassium cation concentration of about 0% to about 100%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) passing a purge gas, substantially free of $CO_2$, through the adsorbent bed thereby resulting in a reduction in the pressure in the adsorption bed to a second pressure and in desorption of at least a portion of $CO_2$ from the adsorbent bed; and d) recovering at least a portion of $CO_2$ from the adsorbent bed.

In still another aspect, embodiments of the invention provide a vacuum swing adsorption process for separating $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises a zeolite with a framework structure selected from the group consisting of CHA, FAU, FER, LTA, MFI, RHO, UFI and a combination thereof, having (a) a Si/Al ratio of about 3 to about 30; and (b) a potassium cation concentration of about 40% to about 100%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) passing a purge gas, substantially free of $CO_2$, through the adsorbent bed thereby resulting in a reduction in the pressure in the adsorption bed to a second pressure and in desorption of at least a portion of $CO_2$ from the adsorbent bed; and d) recovering at least a portion of $CO_2$ from the adsorbent bed.

In still another aspect, embodiments of the invention provide a vacuum temperature swing adsorption process for separating a $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite having a Si/Al ratio above about 100 with a CAS framework structure; or (ii) a zeolite with a framework structure selected from the group consisting of AFT, AFX, CAS, DAC, EMT, EUO, HEU, IMF, IRR, IRY, ITH, ITT, KFI, LAU, MFS, MRE, MTT, MWW, NES, PAU, RRO, RWY, SFF, STF, STI, SZR, TER, TON, TSC, TUN, VFI, and a combination thereof, having: (a) a Si/Al ratio of about 1 to about 100; and (b) a potassium cation concentration of about 0% to about 100%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) simultaneously heating the adsorbent bed to a second temperature higher than the first temperature and passing a purge gas, substantially free of $CO_2$, through the adsorbent bed thereby resulting in a reduction in the pressure in the adsorption bed to a second pressure, resulting in desorption of at least a portion of $CO_2$ from the adsorbent bed and recovering at least a portion of $CO_2$.

In still another aspect, embodiments of the invention provide a vacuum temperature swing adsorption process for separating a $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite with a framework structure selected from the group consisting of CHA, FAU, FER, MFI, RHO, UFI and a combination thereof, having: (a) a Si/Al ratio of about 1 to about 20; and (b) a potassium cation concentration of about 0% to about 40%; or (ii) a zeolite with a LTA framework structure having: (a) a Si/Al ratio of about 1 to about 20; and (b) a potassium cation concentration of about 5% to about 40%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; and c) simultaneously heating the adsorbent bed to a second temperature higher than the first temperature and passing a purge gas, substantially free of $CO_2$, through the adsorbent bed thereby resulting in a reduction in the pressure in the adsorption bed to a second pressure, resulting in desorption of at least a portion of $CO_2$ from the adsorbent bed and recovering at least a portion of $CO_2$.

In still another aspect, embodiments of the invention provide a temperature swing adsorption process for separating $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises a zeolite with a framework structure selected from the group consisting of AFT AFX, CAS, EMT, IRR, IRY, ITT, KFI, MWW, PAU, RWY, SFF, STF, TSC, UFI, VFI, and a combination thereof, having: (a) a Si/Al ratio of about 1 to about 20; and (b) a potassium cation concentration of about 0% to about 50%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) heating adsorbent bed to a second temperature higher than the first temperature, resulting in desorption of at least a portion of $CO_2$ from the adsorbent bed and recovering at least a portion of $CO_2$ from the adsorbent bed.

In still another aspect, embodiments of the invention provide a temperature swing adsorption process for separating $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite with a framework structure selected from the group consisting of CHA, FAU, RHO, and a combination thereof, having: (a) a Si/Al ratio of about 1 to about 20; and (b) a potassium cation concentration of about 0% to about 40%; or (ii) a zeolite with a LTA framework structure having: (a) a Si/Al ratio of about 1 to about 20; and (b) a potassium cation concentration of about 5% to about 40%; wherein the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) heating adsorbent bed to a second temperature higher than the first temperature, resulting in desorption of at least a portion of $CO_2$ from the adsorbent bed and recovering at least a portion of $CO_2$ from the adsorbent bed.

Other embodiments, including particular aspects of the embodiments summarized above, will be evident from the detailed description that follows.

BRIEF DESCRIPTION OF THE DRAWINGS

FIGS. 1a-1d illustrate contour plots of $CO_2$ working capacity (mol/kg) as a function of Si/Al ratio and K/(K+Na) % (potassium cation concentration) for MWW structures in (a) PSA1, (b) VSA, (c) PTSA1, and (d) VTSA1 processes.

DETAILED DESCRIPTION

Figure 2:
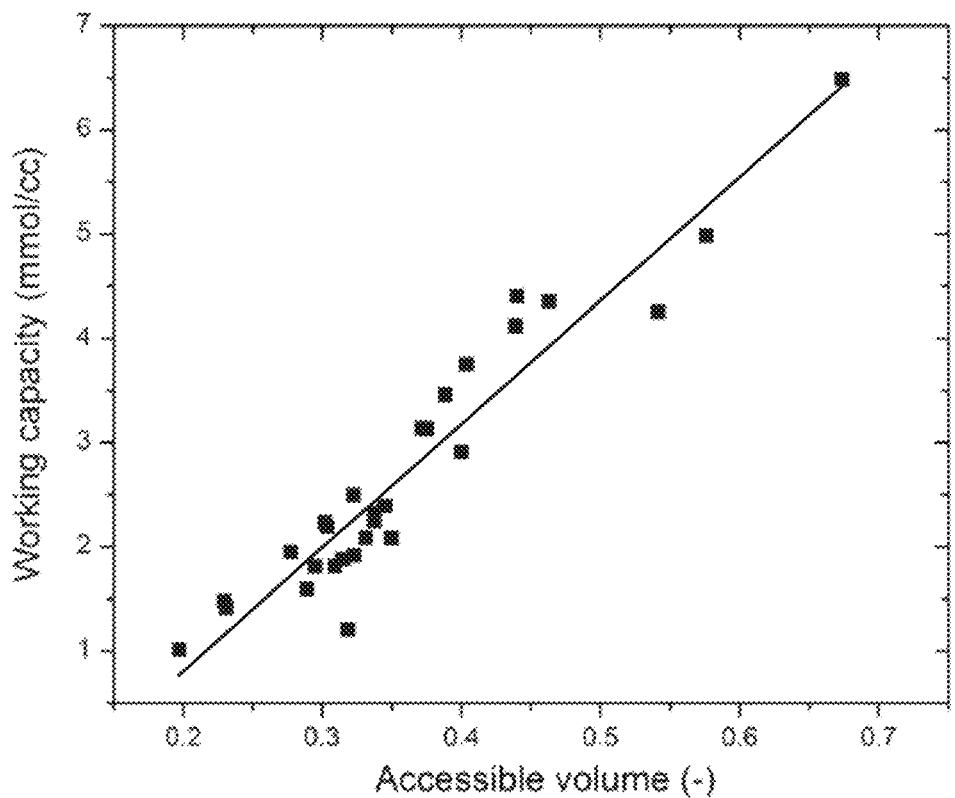
FIG. 2 illustrates a relationship between the working capacity and the accessible pore volume of adsorbents for a pressure swing adsorption (PSA) process.

In various aspects of the invention, adsorbent materials, adsorbent contactors and gas separation processes using the adsorbent materials are provided.

I. Definitions

To facilitate an understanding of the present invention, a number of terms and phrases are defined below.

As used in the present disclosure and claims, the singular forms "a," "an," and "the" include plural forms unless the context clearly dictates otherwise.

Wherever embodiments are described herein with the language "comprising," otherwise analogous embodiments described in terms of "consisting of" and/or "consisting essentially of" are also provided.

The term "and/or" as used in a phrase such as "A and/or B" herein is intended to include "A and B", "A or B", "A", and "B".

As used herein, the term "adsorption" includes physisorption, chemisorption, and condensation onto a solid support, adsorption onto a solid supported liquid, chemisorption onto a solid supported liquid and combinations thereof.

As used herein, the term "breakthrough" refers to the point where the product gas leaving the adsorbent bed exceeds the target specification of the contaminant component. At the breakthrough point, the adsorbent bed can be considered "spent", such that any significant further operation through the spent adsorption bed alone will result in off-specification product gas. As used herein, the "breakthrough" can generally coincide with the "adsorption front", i.e., at the time breakthrough is detected at the outlet of the adsorbent bed, the adsorption front is generally located at the end of the adsorption bed.

As used herein, the term "selectivity" refers to a binary (pairwise) comparison of the molar concentration of components in the feed stream and the total number of moles of these components adsorbed by the particular adsorbent during the adsorption step of the process cycle under the specific system operating conditions and feedstream composition. For a feed containing component A, component B, as well as additional components, an adsorbent that has a greater "selectivity" for component A than component B will have at the end of the adsorption step of the swing adsorption process cycle a ratio:

$U_A$=(total moles of A in the adsorbent)/(molar concentration of A in the feed)

that is greater than the ratio:

$U_B$=(total moles of B in the adsorbent)/(molar concentration of B in the feed)

Where $U_A$ is the "Adsorption Uptake of component A" and $U_B$ is the "Adsorption Uptake of component B".

Therefore for an adsorbent having a selectivity for component A over component B that is greater than one:

Selectivity=$U_A/U_B$ (where $U_A>U_B$).

As used herein, the term "kinetic selectivity" refers to the ratio of single component diffusion coefficients, D (in $m^2$/sec), for two different species. These single component diffusion coefficients are also known as the Stefan-Maxwell transport diffusion coefficients that are measured for a given adsorbent for a given pure gas component. Therefore, for example, the kinetic selectivity for a particular adsorbent for component A with respect to component B would be equal to $D_A/D_B$. The single component diffusion coefficients for a material can be determined by tests well known in the adsorptive materials art. The preferred way to measure the kinetic diffusion coefficient is with a frequency response technique described by Reyes et al. in "Frequency Modulation Methods for Diffusion and Adsorption Measurements in Porous Solids", J. Phys. Chem. B. 101, pages 614-622, 1997. In a kinetically controlled separation it is preferred that kinetic selectivity (i.e., $D_A/D_B$) of the selected adsorbent for the first component (e.g., Component A) with respect to the second component (e.g., Component B) be greater than 5, greater than 20, and particularly greater than 50.

As used herein, the term "equilibrium selectivity" is defined in terms of the slope of the single component uptake into the adsorbent (in μmole/g) vs. pressure (in torr) in the linear portion, or "Henry's regime", of the uptake isotherm for a given adsorbent for a given pure component. The slope of this line is called herein the Henrys constant or "equilibrium uptake slope", or "H". The "equilibrium selectivity" is defined in terms of a binary (or pairwise) comparison of the Henrys constants of different components in the feed for a particular adsorbent. Therefore, for example, the equilibrium selectivity for a particular adsorbent for component A with respect to component B would be HA/HB. It is preferred that in an equilibrium controlled separation the equilibrium selectivity (i.e., HA/HB) of the selected adsorbent for the first component (e.g., Component A) with respect to the second component (e.g., Component B) be greater than 5, greater than 20, and particularly greater than 50.

As used herein, the term "Si/Al ratio" is defined as the molar ratio of silica to alumina of a zeolitic structure.

II. Methods of Designing Zeolite Materials for $CO_2$ Adsorption

In a first embodiment, a method of designing a zeolite material for $CO_2$ adsorption is provided. To describe adsorption of $CO_2$ molecules in zeolites, the following three interactions need to be studied: 1) $CO_2$-zeolite; 2) cation-framework structure; and 3) $CO_2$—$CO_2$. The EPM2 model (see Harris and Young, J. Phys. Chem., 1995, 99 12021) may be used to represent the $CO_2$—$CO_2$ interaction because the phase behavior of pure $CO_2$ is correctly captured. For the $CO_2$-zeolite and the cation-framework structure interactions, a first-principles-based force fields for crystalline porous materials approach may be used. Specifically, a fully periodic framework to represent adsorbent structure may be used and quantum chemistry calculations for numerous adsorption configurations randomly scattered throughout the whole framework may be made. This approach may be used for adsorption of $CO_2$ in siliceous zeolites and also for cation exchanged zeolites (e.g., potassium cation, sodium cation, etc.). See Fang et al., J. Phys. Chem. C, 2012, 116, 10692; Fang et al., Phys Chem. Chem. Phys., 2013, 15, 12882. The developed force fields may accurately predict experimental adsorption properties and show transferability across different zeolite topologies. An example of first-principles-derived force field parameters are shown in Tables 1, 2 and 3 below.

TABLE 1

First-Principles-Derived Force Field Parameters For $CO_2$ In K/Na-Exchanged Zeolites--Shown Are Lennard-Jones Potential Parameters And Partial Charges For Coulombic Interactions

| Cross Species | CCFF | | Charge (e) |
|---|---|---|---|
| | $\varepsilon/k_b$ (K) | σ (Å) | |
| Si—C | 49.75 | 3.620 | Si (2.21) |
| Si—O | 38.90 | 3.494 | $O_z^{Si}$ (−1.105) |
| $O_z$—C | 29.12 | 3.193 | $O_z^{Al}$ (−1.32) |
| $O_z$—O | 23.43 | 3.067 | Al (2.08) |
| Al—C | 32.21 | 3.366 | K (0.99) |
| Al—O | 25.32 | 3.246 | Na (0.99) |
| K—C | 60.60 | 3.232 | H (0.51) |
| K—O | 48.19 | 3.111 | |
| Na—C | 66.78 | 2.827 | |
| Na—O | 54.76 | 2.707 | |
| H—O | 225.46 | 1.969 | |
| H—C | 270.70 | 2.061 | |

TABLE 2

Buckingham Parameters For K- And Na-Framework Interactions

| Cross Species | A (eV) | B (Å) | C (eV) |
|---|---|---|---|
| K—$O_z$ | 5258.3 | 0.2916 | 193.7 |
| Na—$O_z$ | 3261.6 | 0.2597 | 45.4 |

TABLE 3

Morse Potential Parameters For H-Framework Interactions

| Cross Species | $P_0/k_B$(K) | $p_1$ | $p_2$ (Å) |
|---|---|---|---|
| H—$O_z^{Si}$ | 16113.4 | 6.3457 | 1.1239 |
| H—$O_z^{Al}$ | 16113.4 | 6.3457 | 1.1239 |

Here Morse potential is defined as (Demiralp et al, *Phys. Rev. Lett.* 1999, 82, 1708):

$$U = p_0[e^{p1*(1-r/p2)} - 2e^{(p1/2)*(1-r/p3)}]$$

During molecular simulations of adsorption isotherms, framework atoms may be fixed and extra-framework cations may be allowed to move (see e.g. Fang et al., *Phys Chem. Chem. Phys.*, 2013, 15, 12882). The positions of extra-framework cations can have a significant impact on the adsorption properties. For most cationic zeolites, however, the experimental information for cation locations is not available. To get more reliable cation distributions for each material, pre-equilibration simulations prior to the adsorption of $CO_2$ may be performed. Parallel tempering (also known as canonical replica-exchange Monte Carlo) may be used in these simulations. For each cationic material, replicas (e.g., 9) may be included in simulations at temperatures, such as 300K, 390K, 507K, 659K, 857K, 1114K, 1448K, 1882K and 2447K, respectively. The lowest temperature may be room temperature, and the highest temperature should be high enough so as to ensure that no replicas become trapped in local energy minima. Reasonable degree of overlap between the potential energy distributions of neighboring state points was found.

Adsorption isotherms of $CO_2$ in zeolites may be predicted computationally using standard Grand Canonical Monte Carlo (GCMC) methods. The chemical potential may be determined from the fugacity, and the fugacity coefficients may be computed using the Peng-Robinson equation of state (Peng and Robinson *Ind. Eng. Chem. Fundam.* 1976, 15, 59). Isosteric heats of adsorption, $Q_{st}$, defined as the difference in the partial molar enthalpy of the adsorption between the gas phase and the adsorbed phase, may be determined. Some topologies, for example, FAU and LTA, include regions such as sodalite cages that are inaccessible for $CO_2$ molecules. These regions may be blocked in the simulations to avoid spurious adsorption of $CO_2$ in these regions.

Accessible pore volume, which is defined as the percentage of the pore volume to the total volume of the zeolite, may be computed from Widom particle insertion using Helium. For the calculations of pore volumes, the Clay Force Field (CLAYFF) may be used for the atoms of the zeolite and force field parameters from the previous work may be used for He—He interactions (See Cygan et al., *J. Phys. Chem. B*, 2004, 108, 1255; Talu et al. *Colloids and Surfaces a-Physicochemical and Engineering Aspects*, 2001, 187, 83). Lorentz-Berthelot mixing rules may be applied for the cross species interactions.

Prototypical processes may be defined for $CO_2$ capture. For example, the following processes such as in Table 3 may be modeled. It understood that $CO_2$ adsorption processes are not limited to processes considered in Table 4.

TABLE 4

Processes Considered

| | Adsorption | | Desorption | |
|---|---|---|---|---|
| Processes | T (K) | P (bar) | T (K) | P (bar) |
| PSA1 | 300 | 5 | 300 | 1 |
| PSA2 | 300 | 20 | 300 | 1 |
| PSA3 | 300 | 0.066 | 300 | 0.0026 |
| PSA4 | 233 | 0.066 | 233 | 0.0026 |
| PTSA1 | 300 | 5 | 373 | 1 |
| PTSA2 | 300 | 20 | 373 | 1 |
| VSA | 300 | 1 | 300 | 0.1 |
| VTSA1 | 300 | 1 | 373 | 0.1 |
| VTSA2 | 300 | 1 | 473 | 0.2 |
| VTSA3 | 300 | 5 | 473 | 0.2 |
| TSA | 300 | 1 | 473 | 1 |

The choice of adsorption and desorption conditions may vary and be based on previous research and industrial relevance. The conditions in Table 3 are representative of only several possible set of conditions. Detailed process modeling of gas capture may require a description of multi-component adsorption of the gas mixtures of interest. As a first step, it may be sufficient to focus simply on the capacity a material has for the primary component of interest (e.g., $CO_2$). For example, zeolites as potential adsorbents for $CO_2$ may be considered based on single-component adsorption of $CO_2$.

For each process the working capacity ($\Delta N$), which is defined as the difference between the adsorbed amounts of $CO_2$ at the adsorption ($N_{ads}$) and desorption ($N_{des}$) conditions, may be used to evaluate adsorption performance of the materials. Thus, via molecular simulations using the first-principles-derived force fields, the relationship between $CO_2$ working capacity and Si/Al ratio and cation concentration (e.g., sodium cation, potassium cation) may be determined for each zeolite framework structure at each defined process condition. For each framework structure, the optimal composition may be determined for each specified process. The optimal compositions for selected processes in Table 4 are shown below in Table 5.

TABLE 5

Examples Of Working Capacity Of The Optimal Compositions For Selected Zeolite Topologies In The Four $CO_2$ Adsorption Processes

| PSA1 | | VSA | | PTSA1 | | VTSA1 | |
|---|---|---|---|---|---|---|---|
| Zeolite | $\Delta N$ (mmol/cc) | Zeolite | $\Delta N$ (mmol/cc) | Zeolite | $\Delta N$ (mmol/cc) | Zeolite | $\Delta N$ (mmol/cc) |
| RWY_5_100 | 6.49 | RWY_3_17 | 5.34 | RWY_3_17 | 11.17 | IRY_2_0 | 8.78 |
| IRY_10_100 | 4.98 | IRY_3_83 | 4.48 | IRY_3_0 | 8.68 | IRR_2_0 | 7.82 |

TABLE 5-continued

Examples Of Working Capacity Of The Optimal Compositions For Selected Zeolite Topologies In The Four $CO_2$ Adsorption Processes

| PSA1 | | VSA | | PTSA1 | | VTSA1 | |
| --- | --- | --- | --- | --- | --- | --- | --- |
| Zeolite | ΔN (mmol/cc) | Zeolite | ΔN (mmol/cc) | Zeolite | ΔN (mmol/cc) | Zeolite | ΔN (mmol/cc) |
| FAU_50_67 | 4.40 | FAU_5_100 | 4.28 | IRR_5_50 | 7.76 | FAU_2_33 | 7.51 |
| TSC_50_83 | 4.36 | IRR_3_100 | 3.79 | FAU_5_83 | 7.12 | EMT_2_0 | 7.26 |
| IRR_10_100 | 4.25 | EMT_5_83 | 3.78 | TSC_10_17 | 6.87 | RWY_3_17 | 7.14 |
| EMT_50_100 | 4.12 | VFI_1_0 | 3.52 | EMT_5_33 | 6.74 | TSC_1_0 | 6.60 |
| LTA_50_67 | 3.75 | RRO_Si | 3.43 | VFI_1_0 | 6.38 | LTA_1_0 | 5.93 |
| VFI_10_100 | 3.46 | DAC_Si | 3.39 | LTA_10_33 | 5.87 | VFI_2_0 | 5.31 |
| SFF_Si | 3.14 | LTA_5_50 | 3.30 | STF_Si | 5.50 | STF_5_0 | 5.24 |
| STF_Si | 3.13 | TSC_5_0 | 3.27 | DAC_Si | 5.42 | SFF_3_0 | 5.05 |
| MWW_Si | 2.91 | STF_50_100 | 3.13 | RRO_Si | 5.06 | MWW_2_33 | 4.87 |
| ITH_Si | 2.50 | HEU_Si | 2.84 | SFF_50_100 | 4.94 | STI_2_0 | 4.82 |
| NES_Si | 2.39 | MWW_10_100 | 2.72 | MWW_25_100 | 4.90 | DAC_50_17 | 4.75 |
| TUN_Si | 2.32 | SFF_25_67 | 2.69 | ITH_Si | 4.22 | RRO_10_83 | 4.57 |
| TER_Si | 2.24 | TER_50_100 | 2.31 | TER_Si | 4.20 | NES_2_0 | 4.47 |
| FER_Si | 2.23 | STI_10_83 | 2.29 | STI_10_100 | 4.18 | HEU_25_17 | 4.11 |
| MFS_Si | 2.19 | MFS_25_100 | 2.25 | NES_50_100 | 4.15 | MFS_10_17 | 4.04 |
| IMF_Si | 2.09 | TUN_50_100 | 2.23 | TUN_Si | 4.10 | FER_10_33 | 3.79 |
| STI_Si | 2.08 | NES_10_67 | 2.22 | HEU_Si | 4.07 | SZR_5_67 | 3.77 |
| SZR_Si | 1.95 | FER_50_100 | 2.18 | FER_Si | 4.05 | EUO_3_0 | 3.77 |
| MFI_Si | 1.92 | ITH_25_100 | 2.17 | MFS_Si | 3.97 | ITH_10_17 | 3.74 |
| EUO_Si | 1.88 | LAU_Si | 2.15 | LAU_Si | 3.81 | TER_10_17 | 3.66 |
| DAC_Si | 1.81 | MFI_50_100 | 2.13 | MFI_Si | 3.79 | TUN_10_67 | 3.60 |
| LAU_Si | 1.81 | SZR_50_83 | 2.05 | SZR_Si | 3.78 | LAU_10_0 | 3.44 |
| RRO_Si | 1.59 | EUO_25_100 | 1.98 | IMF_Si | 3.78 | MFI_10_33 | 3.34 |
| TON_Si | 1.48 | IMF_50_100 | 1.96 | EUO_25_100 | 3.58 | IMF_10_0 | 3.28 |
| MTT_Si | 1.41 | TON_Si | 1.95 | TON_Si | 3.32 | MTT_10_83 | 2.60 |
| HEU_50_100 | 1.21 | MTT_Si | 1.59 | MTT_Si | 2.89 | TON_25_0 | 2.46 |

$^a$To describe the materials, we use ZEO_A_B to represent cationic zeolites, where ZEO indicates the topology type, A the Si/Al ratio, and B the percentage concentration of K cations. For siliceous zeolites, we use ZEO_Si.

The zeolite materials described herein may be represented by the following formula ZEO_A_B, wherein "ZEO" represents the framework structure, "A" represents the Si/Al ratio and "B" represents the concentration of potassium cations. For example, MFI_10_50 represents a zeolite material having an MFI framework structure, a Si/Al ratio of 10 and a potassium cation concentration of 50%. MFI_Si represents a zeolite material having an MFI framework structure that is highly siliceous. As used herein, "highly siliceous" refers to a zeolite material having a Si/Al ratio of ≥about 100, ≥about 150, ≥about 200, ≥about 250, ≥about 300, ≥about 350, ≥about 400≥about 450, ≥about 500, ≥about 550, ≥about 600, ≥about 650, ≥about 700, ≥about 750, ≥about 800, ≥about 850, ≥about 900, ≥about 950, or ≥about 1000. In particular, a highly siliceous zeolite has a Si/Al ratio of above 100. Such highly siliceous zeolites may include a cation concentration of less than about 10%, less than about 5%, less than about 1%, less than about 0.1%, or about 0%.

Figure 3:
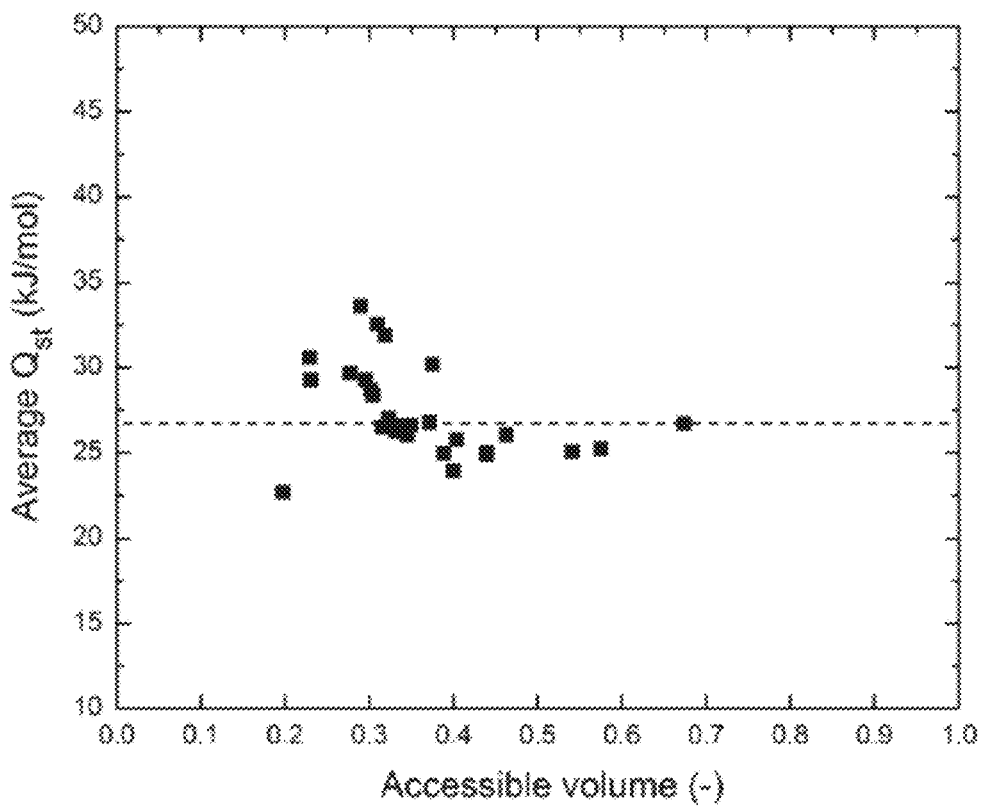
FIG. 3 illustrates average heats of adsorption ($Q_{st}$) at adsorption and desorption conditions for the optimal composition of each topology for the PSA process. The dashed line indicates the mean value of the average $Q_{st}$ for all optimal compositions.

Also, it has been found that a substantially linear relationship between working capacity and accessible pore volume exists for the optimal compositions of the framework structures for the processes studied, as shown in FIG. 2 for the PSA1 process. It was further found that the average $Q_{st}$ are located within a narrow range for each process, as shown in FIG. 3 for the PSA1 process. In contrast, the heats of adsorption at zero coverage ($Q_{st}^0$) are located in a relatively larger range for each process. The results indicated that suitable average $Q_{st}$ are required for maximizing the working capacity of each topology in a specified process. Too high an average $Q_{st}$ may lead to a large amount of residual adsorbed adsorbate at the desorption pressure, and therefore to a reduced working capacity, whereas too low an average $Q_{st}$ may also result in a low working capacity. As a result, for each topology there is an optimal average $Q_{st}$ for obtaining the maximum working capacity.

Thus, in various aspects, a method of designing zeolites for $CO_2$ adsorption involves identifying a target adsorption process for $CO_2$. Any suitable $CO_2$ adsorption process known in the art may be targeted. Non-limiting examples of suitable $CO_2$ adsorption processes include pressure swing adsorption (PSA), temperature swing adsorption (TSA), pressure temperature swing adsorption (PTSA), vacuum swing adsorption (VSA), vacuum temperature swing adsorption (VTSA), partial pressure swing adsorption (PPSA), partial pressure temperature swing adsorption (PPTSA), and displacement desorption swing adsorption (DDSA), and any other combinations thereof. Once the $CO_2$ adsorption process is identified, zeolite framework structure may be selected. In particular, zeolite framework structures with large accessible pore volumes from 0.15 and higher may be selected. Examples of suitable zeolite framework structures include but are not limited to AFT, AFX, CAS, CHA, DAC, EMT, EUO, FAU, FER, HEU, IMF, IRR, IRY, ITH, ITT, KFI, LAU, LTA, MFI, MFS, MRE, MTT, MWW, NES, PAU, RHO, RRO, RWY, SFF, STF, STI, SZR, TER, TON, TSC, TUN, UFI, and VFI. A person of ordinary skill in the art knows how to make the zeolites having an aforementioned framework structure. For example, see the references provided in the International Zeolite Association's database of zeolite structures found at www.iza-structure.org/databases.

Following selection of a zeolite framework, the Si/Al ratio may be adjusted in order to arrive at a heat of adsorption ($Q_{st}$) that results in a high $CO_2$ working capacity (ΔN) for zeolite material in the identified $CO_2$ adsorption process. As used herein, a "high working capacity" or "high AN" may be ≥about 1.0 mmol/cc, ≥about 2.0 mmol/cc, ≥about 3.0 mmol/cc, ≥about 4.0 mmol/cc, ≥about 5.0 mmol/cc, ≥about 6.0 mmol/cc, ≥about 7.0 mmol/cc, ≥about 8.0 mmol/cc, ≥about 9.0 mmol/cc, ≥about 10.0 mmol/cc, ≥about 11.0 mmol/cc, ≥about 12.0 mmol/cc, ≥about 13.0 mmol/cc, ≥about 14.0 mmol/cc, ≥about 15.0 mmol/cc, ≥about 16.0 mmol/cc, ≥about 17.0 mmol/cc, ≥about 18.0 mmol/cc, ≥about 19.0 mmol/cc, or ≥about 20.0 mmol/cc. Examples of suitable Si/Al ratios include, but are not limited to about 1, about 2, about 3, about 5, about 9, about 10, about 15, about 20, about 25, about 30, about 35, about 40, about 45, about 50, about 55, about 60, about 65, about 70, about 75, about 80, about 85, about 90, about 95, or about 100. Ranges expressly disclosed include combinations of the above-enumerated values, e.g., about 1 to about 100, about 3 to about 100, about 1 to about 75, about 1 to about 20, about 1 to about 10, about 9 to about 85, about 9 to about 70, about 5 to about 45, about 40 to about 60, about 3 to about 100, about 3 to about 75, about 5 to about 60, about 3 to about 60, about 3 to about 30, etc.

Additionally, cations may be introduced into the zeolite material at varying concentrations to arrive at a high $CO_2$ working capacity for the zeolite material. The concentration of cations is the percentage of specific cations to the total number of positively charged extra framework cations and protons, which are required to balance the charge in the specific zeolite framework. Examples of suitable cations include, but are not limited to potassium cations ($K^+$), sodium cations ($Na^+$), lithium cations ($Li^+$), cesium cations ($Cs^+$), rubidium cations ($Rb^+$), silver cations ($Ag^+$), calcium cations ($Ca^{2+}$), magnesium cations ($Mg^{2+}$), barium cations ($Ba^{2+}$), strontium cations ($Sr^{2+}$), copper cations ($Cu^{2+}$), and protons ($H^+$). For example, the zeolite material may have a cation (e.g., potassium cation, sodium cation) concentration of ≥about 0.0%, ≥about 5.0%, ≥about 10.0%, ≥about 15.0%, ≥about 16.7%, ≥about 20.0%, ≥about 25.0%, ≥about 30.0%, ≥about 33.4%, ≥about 35.0%, ≥about 40.0%, ≥about 45.0%, ≥about 50.0%, ≥about 55.0%, ≥about 60.0%, ≥about 65.0%, ≥about 66.7%, ≥about 70.0%, ≥about 75.0%, ≥about 80.0%, ≥about 83.3%, ≥about 85.0%, ≥about 90.0%, ≥about 95.0%, or about 100%. Ranges expressly disclosed include combinations of the above-enumerated values, e.g., about 0.0% to about 100%, about 1.0% to about 100%, about 5.0% to about 100%, about 10% to about 100%, about 0.0% to about 90.0%, about 0.0% to about 40.0%, about 40.0% to about 100%, about 0% to about 50%, about 5% to about 40%, etc. In particular, the Si/Al ratio may be adjusted in the zeolite material before the introduction of cations. Once the desired zeolite material is designed, experimental testing may be undergone on the zeolite material where other factors, such as energy costs for adsorbent regeneration, adsorption kinetics, etc., may be considered.

III. $CO_2$ Adsorption Processes

In another embodiment, a $CO_2$ adsorption process is provided herein. The $CO_2$ adsorption process comprises contacting a gas mixture containing $CO_2$ with an adsorbent material, wherein the adsorbent material may be designed according to the description above.

In various aspects, the $CO_2$ adsorption process can be achieved by swing adsorption processes, such as pressure swing adsorption (PSA) and temperature swing adsorption (TSA) and combinations thereof (e.g., pressure temperature swing adsorption (PTSA)). All swing adsorption processes have an adsorption step in which a feed mixture (typically in the gas phase) is flowed over an adsorbent that preferentially adsorbs a more readily adsorbed component relative to a less readily adsorbed component. A component may be more readily adsorbed because of kinetic or equilibrium properties of the adsorbent material.

PSA processes rely on the fact that gases under pressure tend to be adsorbed within the pore structure of the adsorbent materials. Typically, the higher the pressure, the greater the amount of targeted gas component that will be adsorbed. When the pressure is reduced, the adsorbed targeted component is typically released, or desorbed. PSA processes can operate across varying pressures. For example, a PSA process that operates at pressures below atmospheric pressure is a vacuum swing adsorption (VSA) process. PSA processes can be used to separate gases of a gas mixture, because different gases tend to fill the pores or free volume of the adsorbent to different extents due to either the equilibrium or kinetic properties of the adsorbent. In many important applications, to be described as "equilibrium-controlled" processes, the adsorptive selectivity is primarily based upon differential equilibrium uptake of the first and second components. In another important class of applications, to be described as "kinetic-controlled" processes, the adsorptive selectivity is primarily based upon the differential rates of uptake of the first and second components.

TSA processes also rely on the fact that gases under pressure tend to be adsorbed within the pore structure of the adsorbent materials. When the temperature of the adsorbent is increased, the adsorbed gas is typically released, or desorbed. By cyclically swinging the temperature of adsorbent beds, TSA processes can be used to separate gases in a mixture when used with an adsorbent selective for one or more of the components in a gas mixture. Partial pressure purge displacement (PPSA) swing adsorption processes regenerate the adsorbent with a purge. Rapid cycle (RC) swing adsorption processes complete the adsorption step of a swing adsorption process in a short amount of time. For kinetically selective adsorbents, it can be preferable to use a rapid cycle swing adsorption process. If the cycle time becomes too long, the kinetic selectivity can be lost. These swing adsorption protocols can be performed separately or in combinations. Examples of processes that can be used herein either separately or in combination are PSA, TSA, PTSA, VSA, VTSA, PPSA, PPTSA DDSA.

Additionally or alternatively, the processes of the present invention can comprise an adsorption step in which the preferentially adsorbed components (e.g., $CO_2$) of the feed mixture can be adsorbed by the adsorbent material described herein as contained in an adsorbent contactor, such as an adsorbent bed, while recovering the less preferentially adsorbed components at the product end of the adsorbent bed at process pressures. The adsorption step may be performed at a first pressure such that the partial pressure of $CO_2$ is from about 0.5 bar to about 25 bar, particularly about 3 bar to about 25 bar, particularly about 15 bar to about 25 bar, particularly about 3 bar to about 10 bar, particularly about 0.5 bar to about 7 bar, or particularly about 0.5 bar to about 3 bar. Additionally or alternatively, the adsorption step of the present invention can be performed at a first temperature from about −20° C. to about 80° C., particularly from about 0° C. to about 50° C. or particularly from 10° C. to 30° C. Additionally or alternatively, heat of adsorption can be managed by incorporating a thermal mass into the adsorption bed to mitigate the temperature rise occurring during the adsorption step. The temperature rise from the heat of adsorption can additionally or alternately be managed in a variety of ways, such as by flowing a cooling fluid through the passages external to the adsorbent bed (i.e., the passages that are used to heat and cool the contactor).

Additionally or alternatively, the passages external to the adsorbent bed can be filled with a fluid that is not flowing during the adsorption process. In this case, the heat capacity of the fluid can serve to mitigate the temperature rise in the adsorbent bed. Combinations of some or all of these heat management strategies can be employed. Even with these heat management strategies, during this step, the final temperature of the bed can typically be slightly higher than the feed inlet temperature. Particularly, the degree of adsorption and cooling can be managed so that the maximum temperature rise at any point within the contactor can be less than about 40° C., e.g., less than about 20° C., less than about 10° C., or less than about 5° C. During adsorption, the strongest-adsorbing components can tend to attach most strongly to the adsorbent and can thus be least mobile. Such strongest-adsorbing components can thus tend to occupy regions of adsorbent closest to the inlet and can generally displace weakly adsorbed components from those regions.

Over the period of adsorption, the adsorbates can tend to order themselves from strongest to weakest, moving from inlet to outlet of the adsorption channels of the contactor. In preferred embodiments, the feed gas velocity can be chosen so that a relatively sharp concentration front moves through the contactor, i.e., such that the concentration gradient of adsorbate(s) extends over a relatively short distance, taking into consideration the absolute amplitude of the gradient.

The adsorption step can be stopped at a predetermined point before the adsorption front breaks through the product output end of the adsorbent bed. The adsorption front can move at least 30% of the way down the bed, e.g., at least 50% or at least 80%, before the adsorption step is stopped. Additionally or alternatively, the adsorption step can be conducted for a fixed period of time set by the feed flow rate and adsorbent capacity. Further additionally or alternatively, the adsorption step can be conducted for a time less than 600 seconds, particularly less than 120 seconds, e.g., less than 40 seconds or less than 10 seconds, or less than 5 seconds. In some instances, the adsorption front can be allowed to break through the output end only for a short duration (e.g., for at most a few seconds), but usually the adsorption front is not allowed to break through, which can maximize utilization of the bed.

After the adsorption step, the feed gas channels in the contactor can optionally be depressurized to a second pressure lower than the first pressure. For example, the second pressure may be such that the partial pressure of $CO_2$ is from about 0.5 bar to about 2 bar, particularly about 0.05 bar to about 0.5 bar, particularly about 0.08 bar to about 0.3 bar, or particularly about 0.09 bar to about 0.4 bar. Reduction in pressure to a second pressure may be achieved by passing a purge gas, substantially free of target gas species (e.g., $CO_2$) through adsorbent bed. The purge gas may comprise an inert gas, such as nitrogen.

Additionally or alternatively, the feed input end of the adsorbent bed can be sealed with respect to the passage of a gas, and heat can be externally applied to the adsorbent bed. By "externally heated" it is meant that heat is not applied directly to the adsorbent bed through the flow channels through which the feed gas mixture had flowed and into which the target gas component will be desorbed. The heat can be delivered to the adsorbent bed through a plurality of heating/cooling channels in thermal communication, but not in fluid communication, with the feed gas flow channels of the adsorbent. The adsorbent bed can be externally heated co-currently or counter-currently along its length with respect to the flow of the feed gas mixture, or in a combination of co-current and counter-current heating steps. The flow channels that will carry heating and cooling fluid can be in physical contact with the adsorbent bed to enhance heat transfer. The adsorbent bed can be heated to a second temperature higher than the first temperature used during the adsorption step, the second temperature at least about 10° C. higher than the first temperature, e.g., at least about 20° C. higher, at least about 40° C. higher, at least about 75° C. higher, at least about 90° C. higher, at least about 100° C. higher, at least about 125° C. higher, at least about 150° C. higher, at least about 175° C. higher or at least about 200° C. higher; additionally or alternatively, the second temperature can be from about 50° C. to about 250° C., e.g., from about 150° C. to 250° C., from about 50° C. to about 150° C., from about 75° C. to about 125° C. or from about 175° C. to about 225° C.

During the heating step, the gas pressure in the channel can tend to rise. To improve regeneration at the product end of the bed, during the heating step, the bed can advantageously be slowly purged with clean gas from the clean end (product end) of the adsorbent bed to the point of product recovery. By "clean gas" it is meant that a gas is substantially free of target gas components. For example, if the target gas is $CO_2$, then the clean gas will be a stream substantially $CO_2$. In one embodiment, clean gas will contain less than 5 mol % $CO_2$, and particularly less than 1 mol % of $CO_2$. An example of a suitable clean gas would be the product gas itself. When the current invention is utilized for the removal of $CO_2$ from a natural gas stream, in one embodiment, the "clean gas" is comprised of at least one of the hydrocarbon product streams, and in another embodiment is comprised of $C_3$-hydrocarbons, and in another embodiment is comprised of methane. In other embodiments, a separate "clean gas" can be used. In one of these embodiments, the "clean gas" is comprised of nitrogen.

The purge can be introduced at a pressure higher than the pressure in the adsorbent bed. It can be preferred for the total number of moles of purge gas introduced to be less that the number of moles of molecules adsorbed in the contactor, e.g., less than 25% or less that 10% of the number of moles adsorbed. By preventing the adsorption front from breaking through, the product end of the bed can be kept substantially free of the strongly-adsorbed species and can advantageously contain predominantly product species. The isotherms of the adsorbed target component can determine the partial pressure of the preferentially adsorbed component in equilibrium, with the new loading at the higher temperature. This partial pressure can, in some cases, be in excess of 40% greater than the feed pressure, or as much as 70% higher or more. Additionally or alternatively to the recovered sensible heat, a small amount of extra heat may be required to heat the bed to the final predetermined temperature. The isotherm can describe the amount of loading (mmol of adsorbed species per gram of adsorbent) for both chemisorption and physisorption processes.

The external heating can be conducted such that a thermal wave is used to pass heat through the contactor, as it transitions from the adsorption step to the regeneration step, in transitioning from the regeneration to adsorption step, in at least part of the regeneration step, and/or in at least part of the adsorption step. Similarly, it can be preferred to utilize a thermal wave in the cooling step. A thermal wave is a relatively sharp temperature gradient, or front, that can move linearly (i.e., approximately in a single direction within the contactor) during at least one step in the thermal swing adsorption/desorption cycle. The speed at which the thermal front (i.e., region with sharp temperature gradient) can move is referred to as the thermal wave velocity. The thermal wave velocity need not be constant, and the thermal wave direction need not be the same in both adsorption and regeneration steps. For example, the wave can move co-currently, counter-currently, or cross-flow in the adsorption and/or regeneration steps. It is also possible to design a process in which there is no significant thermal wave present in the adsorption step while there is a significant thermal wave in the regeneration step. The presence of a thermal wave in at least some portion of the thermal swing adsorption/regeneration cycle can enable the overall system to achieve a goal of substantially recuperating and recovering the heat required to temperature-swing the adsorbent bed. This, in turn, can improve process efficiency and/or can enable the use of high desorption temperatures that would not normally be considered for TSA operation.

Additionally or alternatively, the contactor is combined with the adsorbent material into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. The heat adding/removing channels can be designed and operated in a manner that results in a relatively sharp temperature wave in both the adsorbent and in the heating and cooling fluids during the heating and cooling steps in the cycle. An example of a contactor that can produce a relatively sharp thermal wave is a contactor as described herein.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$ ($T_{10}$) and about 10% below $T_{max}$ ($T_{90}$). Thermal waves can be said to be relatively sharp when at least the temperature differential of ($T_{90}$–$T_{10}$) occurs over at most 50% (e.g., at most 40%, at most 30%, or at most 25%) of the length of the apparatus that participates in the mass/thermal transfer. Additionally or alternatively, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and a represents the effective thermal diffusivity of the contactor (in m$^2$/s) over the distance L. In addition or alternately to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternatively, to minimize size and energy requirements, it can be preferred for L to be less than 0.1 meter, e.g., less than 0.01 meter or less than 0.001 meter.

Thermal waves in such contactors can be produced when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

Additionally or alternatively, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternatively during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, the recovered energy can be used to reduce the amount of sensible heat that must be supplied to heat and cool the contactor. The sensible heat is determined by the heat capacity and temperature rise (or fall) of the contactor. In some embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

This external heating of the partially sealed adsorbent bed will result in at least a portion of the target species being desorbed from the adsorbent bed. It can also result in an increase in pressure of the resulting target species component stream. At least a portion of the desorbed target species component is recovered at pressures higher than that at the initiation of the heating step. That is, recovery of target gas will take place toward the end of the heating step with minimum or no depressurization of the adsorbent bed. It is preferred that the pressure be a least 2 bar, particularly at least 5 bar higher than that at the initiation of the heating step.

The pressure in the adsorbent bed is then reduced, particularly in a series of blow-down steps in a co-current or counter-current and can be performed with or without a purge gas stream to the final target gas recovery pressure. Pressure reduction can occur in less than 8 steps, particularly in less than 4 steps, with target species being recovered in each step. In one embodiment, the pressure is decreased by a factor of approximately three in each step. It is also preferred that the depressurization be conducted counter-currently and that during the depressurizing step a purge gas be passed counter-current (from product end to feed end) through the adsorbent bed. It is also preferred that the purge gas be a so-called clean gas as previously described.

In another embodiment, in any step, other than the adsorption step, the clean gas is conducted counter-currently through the adsorbent bed to ensure that the end of the bed is substantially free of target species. In another embodiment, the clean gas is conducted counter-currently through the adsorbent bed in at least a portion of the desorption steps. An effective rate of counter-current flowing clean gas is preferred during these step(s) to overcome mass diffusion to ensure that the product end of the bed is kept substantially free of the target species.

After the target gas has been recovered, the adsorbent bed can be cooled and repressurized. One can cool the bed before repressurization. The adsorbent bed can be cooled, particularly to a temperature that is no more than 40° C. above the temperature of feed gas mixture, e.g., no more than 20° C. above or no more than 10° C. above. Additionally or alternatively, the adsorbent bed can be cooled by external cooling in a co-current or counter-current manner, such that a thermal wave can pass through the bed. In some such embodiments, the first part of the adsorbent bed can be cooled then repressurized. In certain of those embodiments, less than 90% of the length of adsorption bed can be cooled, e.g., less than 50%. The adsorbent bed can additionally or alternatively be purged with a clean gas during cooling.

The adsorbent bed can then be repressurized, during and/or after the cooling step, e.g., using clean product gas or counter-currently with blow-down gas from another bed after a first stage of repressurization. The final pressure of the repressurization step can be substantially equal to the pressure of the incoming feed gas mixture.

The adsorbent be can be in the form of open flow channels, e.g., parallel channel connectors, in which the majority of the open pore volume is attributable to microporous pore diameters, e.g., in which less than 40%, particularly less than 20%, for example less than 15% or less than 10%, of its open pore volume can originate from pore diameters greater than 20 angstroms (and less than about 1 micron; i.e., from mesoporous and macroporous pore diameters).

A flow channel is described herein as that portion of the contactor in which gas flows if a steady state pressure difference is applied between the point/place at which a feed stream enters the contactor and the point/place a product stream leaves the contactor. By "open pore volume" herein, it is meant all of the open pore space not occupied in the volume encompassed by the adsorbent material. The open pore volume includes all open spaces in the volume encompassed by the adsorbent material, including but not limited to all volumes within the adsorbent materials themselves, including the pore volume of the structured or amorphous materials, as well as any interstitial open volumes within the structure of the portion of the bed containing the adsorbent material. Open pore volume, as used herein, does not include spaces not accompanied by the adsorbent material such as open volumes in the vessel for entry, exit, or distribution of gases (such as nozzles or distributor areas), open flow channels, and/or volumes occupied by filler materials and/or solid heat adsorption materials. "Parallel channel contactors" are defined herein as a subset of adsorbent contactors comprising structured (engineered) adsorbents in which substantially parallel flow channels are incorporated into the adsorbent structure (typically the adsorbents can be incorporated onto/into the walls of such flow channels). Non-limiting examples of geometric shapes of parallel channel contactors can include various shaped monoliths having a plurality of substantially parallel channels extending from one end of the monolith to the other; a plurality of tubular members, stacked layers of adsorbent sheets with and without spacers between each sheet; multi-layered spiral rolls; spiral wound adsorbent sheets; bundles of hollow fibers; as well as bundles of substantially parallel solid fibers; and combinations thereof. Parallel flow channels are described in detail, e.g., in U.S. Patent Application Publication Nos. 2008/0282892 and 2008/0282886, both of which are incorporated herein by reference. These flow channels can be formed by a variety of ways, and, in addition to the adsorbent material, the adsorbent contactor structure may contain items such as, but not limited to, support materials, heat sink materials, void reduction components, and heating/cooling passages.

It can be desirable to operate with a multiplicity of contactor units, with several coupled in a heating/cooling operation and others involved in adsorption (and/or desorption). In such an operation, the contactor can be substantially cooled by a circulating heat transfer medium before it is switched into service for adsorption. One advantage of such an operation can be that the thermal energy used to swing the bed is retained in the heat transfer medium. If adsorption were to proceed simultaneously with cooling, then a substantial part of the heat in the bed could be lost to the adsorbate-free feed, and a higher heat load could be needed to restore the high temperature of the heat transfer medium.

In various aspects, the adsorbent material selective for adsorbing $CO_2$ in the adsorption processes described herein may comprise a zeolite with a framework structure selected from group consisting of AFT, AFX, CAS, CHA, DAC, EMT, EUO, FAU, FER, HEU, IMF IRR, IRY, ITH, ITT, KFI, LAU, LTA, MFI, MFS, MRE, MTT, MWW, NES, PAU, RHO, RRO, RWY, SFF, STF, STI, SZR, TER, TON, TSC, TUN, UFI and VFI. Additionally or alternatively, in combination with the aforementioned framework structures, the zeolite may have a Si/Al ratio of ≥about 1, ≥about 2, ≥about 3, ≥about 5, ≥about 9, ≥about 10, ≥about 15, ≥about 20, ≥about 25, ≥about 30, ≥about 35, ≥about 40, ≥about 45, ≥about 50, ≥about 55, ≥about 60, ≥about 65, ≥about 70, ≥about 75, ≥about 80, ≥about 85, ≥about 90, ≥about 95, ≥about 100, ≥about 150, ≥about 200, ≥about 250, ≥about 300, ≥about 350, ≥about 400≥about 450, ≥about 500, ≥about 550, ≥about 600, ≥about 650, ≥about 700, ≥about 750, ≥about 800, ≥about 850, ≥about 900, ≥about 950, or ≥about 1000. Additionally or alternatively, in combination with the aforementioned framework structures, the zeolite may have a Si/Al ratio of ≤about 1, ≤about 2, ≤about 3, ≤about 5, ≤about 9, ≤about 10, ≤about 15, ≤about 20, ≤about 25, ≤about 30, ≤about 35, ≤about 40, ≤about 45, ≤about 50, ≤about 55, ≤about 60, ≤about 65, ≤about 70, ≤about 75, ≤about 80, ≤about 85, ≤about 90, ≤about 95, ≤about 100, ≤about 150, ≤about 200, ≤about 250, ≤about 300, ≤about 350, ≤about 400≤about 450, ≤about 500, ≤about 550, ≤about 600, ≤about 650, ≤about 700, ≤about 750, ≤about 800, ≤about 850, ≤about 900, ≤about 950, or ≤about 1000. Ranges expressly disclosed include combinations of the above-enumerated upper and lower limits, e.g., about 1 to about 1000, about 5 to about 100, about 10 to about 90, about 1 to about 70, about 3 to about 85, etc.

Additionally or alternatively, in combination with the aforementioned framework structures and/or Si/Al ratios, the zeolite may have a cation (e.g., potassium cations ($K^+$), sodium cations ($Na^+$), lithium cations ($Li^+$), cesium cations ($Cs^+$), rubidium cations ($Rb^+$), silver cations ($Ag^+$), calcium cations ($Ca^{2+}$), magnesium cations ($Mg^{2+}$), barium cations ($Ba^{2+}$), strontium cations ($Sr^{2+}$), copper cations ($Cu^{2+}$), and protons ($H^+$)) concentration of ≥about 0.0%, ≥about 5.0%, ≥about 10.0%, ≥about 15.0%, ≥about 16.7%, ≥about 20.0%, ≥about 25.0%, ≥about 30.0%, ≥about 33.4%, ≥about 35.0%, ≥about 40.0%, ≥about 45.0%, ≥about 50.0%, ≥about 55.0%, ≥about 60.0%, ≥about 65.0%, ≥about 66.7%, ≥about 70.0%, ≥about 75.0%, ≥about 80.0%, ≥about 83.3%, ≥about 85.0%, ≥about 90.0%, ≥about 95.0%, or about 100%. Ranges expressly disclosed include combinations of the above-enumerated values, e.g., about 0.0% to about 100%, about 1.0% to about 100%, about 5.0% to about 100%, about 10% to about 100%, about 0.0% to about 40.0%, about 40.0% to about 100%, about 5% to about 40%, etc.

The zeolite may have a cation concentration comprising one or more cations. As understood herein, where the zeolite has a specific cation concentration of less than 100%, e.g., a potassium cation concentration of 50%, the zeolite may also contain at least one other cation such that the concentration of all the cations present totals about 100%. Thus, if the zeolite has a potassium cation concentration of about 50%, the zeolite may have one or more other cations at a concentration of about 50%, e.g., a sodium cation concentration of about 50%, a sodium cation concentration of about 25% and a lithium cation concentration of about 25%. In the case of a zeolite containing divalent cations (such as calcium cations ($Ca^{2+}$), magnesium cations ($Mg^{2+}$), barium cations ($Ba^{2+}$), strontium cations ($Sr^2$) and copper cations ($Cu^{2+}$)) it is understood that the number of divalent cations required to balance the charge is twice smaller than the number of monovalent cations (such as potassium cations ($K^+$), sodium cations ($Na^+$), lithium cations ($Li^+$), cesium cations ($Cs^+$), rubidium cations ($Rb^+$), silver cations ($Ag^+$) or protons ($H^+$)). For example, if the zeolite has a potassium cation concentration of about 50%, the zeolite may have one or more other cations, e.g., a sodium cation concentration of about 50%, or calcium cation concentration of about 25%.

Details regarding specific processes for $CO_2$-adsorption are provided below.

A. Pressure Swing Adsorption (PSA) Processes

In another embodiment, a PSA process for separating $CO_2$ from a feed gas mixture is provided. The PSA process may include subjecting the feed gas mixture comprising $CO_2$ to an adsorption step by introducing the feed gas mixture into a feed input end of an adsorbent bed. The feed gas mixture may be natural gas, syngas, flue gas as well as other streams containing $CO_2$. Typical natural gas mixtures contain $CH_4$ and higher hydrocarbons ($C_2H_6$, $C_3H_8$, $C_4H_{10}$ etc), as well as acid gases ($CO_2$ and $H_2S$), $N_2$ and $H_2O$. The amount of water in the natural gas mixture depends on prior dehydration processing to remove $H_2O$. Typical syngas mixtures contain $H_2$, CO, $CO_2$, $CH_4$, COS and $H_2S$. Typical flue gas mixtures contain $N_2$, $CO_2$, $H_2O$, $O_2$, $SO_2$. The adsorbent bed may comprise a feed input end, a product output end and an adsorbent material selective for adsorbing $CO_2$. Additionally, the adsorbent bed may be operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed.

The first temperature may be ≥about −30° C., ≥about −25° C., ≥about −20° C., ≥about −15° C., ≥about −10° C., ≥about −5° C., ≥about 0° C., ≥about 5° C., ≥about 10° C., ≥about 15° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., or ≥about 100° C. In particular, the first temperature may be ≥about 25° C. Additionally or alternatively, the first temperature may be ≤about −30° C., ≤about −25° C., ≤about −20° C., ≤about −15° C., ≤about −10° C., ≤about −5° C., ≤about 0° C., ≤about 5° C., ≤about 10° C., ≤about 15° C., ≤about 20° C., ≤about 25° C., ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., or ≤about 100° C. Ranges expressly disclosed include combinations of the above-enumerated upper and lower limits, e.g., about −30° C. to about 100° C., about −25° C. to about 95° C., about −20° C. to about 80° C., about 0° C. to about 50° C., about 10° C. to about 30° C. In particular, the first temperature is about −20° C. to about 80° C., about 0° C. to about 50° C. or about 10° C. to about 30° C.

The first pressure in combination with the above described first temperatures may be such that the partial pressure of $CO_2$ may be ≥about 1 bar, ≥about 2 bar, ≥about 3 bar, ≥about 4 bar, ≥about 5 bar, ≥about 6 bar, ≥about 7 bar, ≥about 8 bar, ≥about 9 bar, ≥about 10 bar, ≥about 12 bar, ≥about 15 bar, ≥about 16 bar, ≥about 18 bar, ≥about 20 bar, ≥about 22 bar, ≥about 24 bar, ≥about 25 bar, ≥about 26 bar, ≥about 28 bar, or ≥about 30 bar. In particular, the first pressure in combination with the above described first temperatures may be such that the partial pressure of $CO_2$ is ≥about 5 bar or ≥about 25 bar. Additionally or alternatively, the first pressure in combination with the above described first temperatures may be such that the partial pressure of $CO_2$ is ≤about 1 bar, ≤about 2 bar, ≤about 3 bar, ≤about 4 bar, ≤about 5 bar, ≤about 6 bar, ≤about 7 bar, ≤about 8 bar, ≤about 9 bar, ≤about 10 bar, ≤about 12 bar, ≤about 15 bar, ≤about 16 bar, ≤about 18 bar, ≤about 20 bar, ≤about 22 bar, ≤about 24 bar, ≤about 25 bar, ≤about 26 bar, ≤about 28 bar, or ≤about 30 bar. Ranges expressly disclosed include combinations of the above-enumerated upper and lower limits, e.g., about 1 bar to about 30 bar, about 2 bar to about 28 bar, about 3 bar to about 25 bar, about 3 bar to about 10 bar, about 15 bar to about 25 bar. In particular, the first pressure in combination with the above described first temperatures may be such that the partial pressure of $CO_2$ is about 3 bar to about 25 bar, about 3 bar to about 10 bar, about 3 bar to about 7 bar, about 15 bar to about 25 bar, or about 18 bar to about 22 bar.

In various aspects, the PSA process may further include stopping the introduction of the feed gas mixture to the adsorbent bed before breakthrough of $CO_2$ from the product output end of the adsorbent bed, reducing the pressure in the adsorption bed to a second pressure, which may be lower than the first pressure, resulting in desorption of at least a portion of $CO_2$ from the adsorbent bed, and recovering at least a portion of $CO_2$ from the adsorbent bed. The second pressure may be such that the partial pressure of $CO_2$ is ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 1 bar, ≥about 2 bar, ≥about 3 bar, ≥about 4 bar, ≥about 6 bar, ≥about 7 bar, ≥about 8 bar, ≥about 9 bar, or ≥about 10 bar. In particular, the second pressure may be such that the partial pressure of $CO_2$ is ≥about 1 bar. Additionally or alternatively, the second pressure may be such that the partial pressure of $CO_2$ is ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 1 bar, ≤about 2 bar, ≤about 3 bar, ≤about 4 bar, ≤about 6 bar, ≤about 7 bar, ≤about 8 bar, ≤about 9 bar, or ≤about 10 bar. Ranges expressly disclosed include combinations of the above-enumerated upper and lower limits, e.g., about 0.1 bar to about 10 bar, about 0.3 bar to about 9 bar, about 0.5 bar to about 5 bar, about 0.5 bar to about 2 bar, about 1 bar to about 5 bar, etc. In particular, the second pressure may be such that the partial pressure of $CO_2$ is about 0.5 bar to about 2 bar, about 1 bar to about 5 bar, or about 0.9 bar to about 3 bar.

In various aspects, the adsorbent material may comprise a zeolite having a Si/Al ratio above about 100 (e.g. above about 200, above about 400, above about 600, etc.) and a framework structure selected from the group consisting of AFT, AFX, DAC, EMT, EUO, IMF, ITH, ITT, KFI, LAU, MFS, MRE, MTT, MWW, NES, PAU, RRO, SFF, STF, STI, SZR, TER, TON, TSC, TUN, VFI, and a combination thereof. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of CAS, EMT, FAU, HEU, IRR, IRY, ITT, LTA, RWY, TSC and VFI, and a combination thereof, having (i) a Si/Al ratio of about 5 to about 100, about 5 to about 90, about 5 to about 85, about 5 to about 70 or about 5 to about 50; and/or (ii) a cation concentration (e.g., potassium cation, sodium cation) of about 0% to about 100%, about 5% to about 100%, about 10% to about 100%, about 40% to about 100%, about 60% to about 100% or about 70% to about 100%.

Additionally or alternatively, the adsorbent material may comprise a zeolite having a Si/Al ratio above about 100 (e.g. above about 200, above about 400, above about 600, etc.) and a framework structure selected from the group consisting of AFT, AFX, KFI, PAU, TSC, and a combination thereof. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of LTA, TSC, and a combination thereof, having (i) a Si/Al ratio of about 40 to about 60 or about 50; and/or a (ii) a cation concentration (e.g., potassium cation, sodium cation) of about 50% to about 90%, about 50% to about 80% or about 60% to about 70%.

Additionally or alternatively, the above mentioned adsorbent materials may not include a zeolite with a framework structure selected from the group consisting of CHA, FAU, LTA, RHO and a combination thereof.

Additionally or alternatively, the adsorbent material may comprise a zeolite having a Si/Al ratio of between about 5 and about 45 (e.g., about 6, about 10, about 20, about 30, about 40, etc.) and with a framework structure selected from the group consisting of CHA, FAU, FER, LTA, MFI, RHO, UFI, and a combination thereof. Additionally or alternatively, the adsorbent material may comprise a zeolite having a Si/Al ratio of between about 5 and about 45 (e.g., about 6, about 10, about 20, about 30, about 40, etc.) and with a framework structure selected from the group consisting of CHA, FAU, LTA, RHO, and a combination thereof. Additionally or alternatively, these zeolites may include a cation concentration of less than about 10%, less than about 5%, less than about 1%, less than about 0.1%, or about 0%.

Additionally or alternatively, the adsorbent material may have a working capacity of ≥about 1.0 mmol/cc, ≥about 2.0 mmol/cc, ≥about 3.0 mmol/cc, ≥about 4.0 mmol/cc, ≥about 5.0 mmol/cc, ≥about 6.0 mmol/cc, ≥about 7.0 mmol/cc, ≥about 8.0 mmol/cc, ≥about 9.0 mmol/cc, ≥about 10.0 mmol/cc, ≥about 11.0 mmol/cc, ≥about 12.0 mmol/cc, ≥about 13.0 mmol/cc, ≥about 14.0 mmol/cc, ≥about 15.0 mmol/cc, ≥about 16.0 mmol/cc, ≥about 17.0 mmol/cc, ≥about 18.0 mmol/cc, ≥about 19.0 mmol/cc, or ≥about 20.0 mmol/cc. Additionally or alternatively, the adsorbent material may have a working capacity of ≤about 1.0 mmol/cc, ≤about 2.0 mmol/cc, ≤about 3.0 mmol/cc, ≤about 4.0 mmol/cc, ≤about 5.0 mmol/cc, ≤about 6.0 mmol/cc, ≤about 7.0 mmol/cc, ≤about 8.0 mmol/cc, ≤about 9.0 mmol/cc, ≤about 10.0 mmol/cc, ≤about 11.0 mmol/cc, ≤about 12.0 mmol/cc, ≤about 13.0 mmol/cc, ≤about 14.0 mmol/cc, ≤about 15.0 mmol/cc, ≤about 16.0 mmol/cc, ≤about 17.0 mmol/cc, ≤about 18.0 mmol/cc, ≤about 19.0 mmol/cc, or ≤about 20.0 mmol/cc. Ranges expressly disclosed include combinations of the above-enumerated values, e.g., about 1.0 mmol/cc to about 20.0 mmol/cc, about 1.0 mmol/cc to about 16.0 mmol/cc, about 2.0 mmol/cc to about 15.0 mmol/cc, about 3.0 mmol/cc to about 12.0 mmol/cc, etc. In particular, the adsorbent material described herein may have a working capacity of about 2.0 mmol/cc to about 15.0 mmol/cc or about 3.0 mmol/cc to about 12.0 mmol/cc.

Additionally or alternatively, the adsorbent material may have an average heat of adsorption of ≥about 15 kJ/mol, ≥about 16 kJ/mol, ≥about 18 kJ/mol, ≥about 20 kJ/mol, ≥about 22 kJ/mol, ≥about 24 kJ/mol, ≥about 26 kJ/mol, ≥about 28 kJ/mol, ≥about 30 kJ/mol, ≥about 32 kJ/mol, ≥about 34 kJ/mol, ≥about 36 kJ/mol, ≥about 38 kJ/mol or ≥about 40 kJ/mol. Additionally or alternatively, the adsorbent material may have an average heat of adsorption of ≤about 15 kJ/mol, ≤about 16 kJ/mol, ≤about 18 kJ/mol, ≤about 20 kJ/mol, ≤about 22 kJ/mol, ≤about 24 kJ/mol, ≤about 26 kJ/mol, ≤about 28 kJ/mol, ≤about 30 kJ/mol, ≤about 32 kJ/mol, ≤about 34 kJ/mol, ≤about 36 kJ/mol, ≤about 38 kJ/mol or ≤about 40 kJ/mol. Ranges expressly disclosed include combinations of the above-enumerated values, e.g., about 15 kJ/mol to about 40 kJ/mol, about 18 kJ/mol to about 38 kJ/mol, about 20 kJ/mol to about 36 kJ/mol, about 22 kJ/mol to about 34 kJ/mol, etc. In particular, the adsorbent material may have an average heat of adsorption of about 20 kJ/mol to about 36 kJ/mol or about 22 kJ/mol to about 34 kJ/mol.

In various aspects, an adsorbent material comprising one or more of the following: (i) a zeolite having a Si/Al ratio above about 100 and a framework structure selected from the group consisting of AFT, AFX, DAC, EMT, EUO, IMF, ITH, ITT, KFI, LAU, MFS, MRE, MTT, MWW, NES, PAU, RRO, SFF, STF, STI, SZR, TER, TON, TSC, TUN, VFI, and a combination thereof; or (ii) a zeolite with a framework structure selected from the group consisting of CAS, EMT, FAU, HEU, IRR, IRY, ITT, LTA, RWY, TSC and VFI, and a combination thereof, having: (a) a Si/Al ratio of about 5 to about 85; and/or (b) a potassium cation concentration of about 5% to about 100%, for use in a PSA process for separating $CO_2$ from a feed gas mixture is provided.

In various aspects, an adsorbent material comprising a zeolite having a Si/Al ratio of between about 5 and about 45 and with a framework structure selected from the group consisting of CHA, FAU, FER, LTA, MFI, RHO, UFI, and a combination thereof, for use in a PSA process for separating $CO_2$ from a feed gas mixture is provided.

Nonlimiting examples of suitable zeolites for use in the PSA described herein are those which are provided below in Table 6.

TABLE 6

| Zeolites | |
|---|---|
| AFT_Si | LTA_50_67 |
| AFX_Si | MFI_Si |
| CAS_25_83 | MFS_Si |
| CAS_50_17 | MRE_Si |
| CHA_Si | MTT_Si |
| DAC_Si | MWW_Si |
| EMT_Si | NES_Si |
| EMT_50_100 | PAU_Si |
| EUO_Si | RHO_Si |
| FAU_Si | RRO_Si |
| FAU_50_67 | RWY_5_100 |
| FER_Si | RWY_10_100 |
| HEU_50_100 | SFF_Si |
| IMF_Si | STF_Si |
| IRR_10_100 | STI_Si |
| IRR_50_100 | SZR_Si |
| IRY_10_100 | TER_Si |
| IRY_50_100 | TON_Si |
| ITH_Si | TSC_Si |
| ITT_Si | TSC_50_83 |
| ITT_10_100 | TUN_Si |
| KFI_Si | UFI_Si |
| LAU_Si | VFI_Si |
| LTA_Si | VFI_10_100 |

B. Pressure Temperature Swing Adsorption (PTSA) Processes

In another embodiment, a PTSA process for separating $CO_2$ from a feed gas mixture is provided. The PTSA process may include subjecting the feed gas mixture comprising $CO_2$ to an adsorption step by introducing the feed gas mixture into a feed input end of an adsorbent bed. The feed gas mixture may be natural gas, syngas, flue gas as well as other streams containing $CO_2$. Typical natural gas mixtures contain $CH_4$ and higher hydrocarbons ($C_2H_6$, $C_3H_8$, $C_4H_{10}$ etc), as well as acid gases ($CO_2$ and $H_2S$), $N_2$ and $H_2O$. The amount of water in the natural gas mixture depends on prior dehydration processing to remove $H_2O$. Typical syngas mixtures contain $H_2$, CO, $CO_2$, $CH_4$, COS and $H_2S$. Typical flue gas mixtures contain $N_2$, $CO_2$, $H_2O$, $O_2$, $SO_2$. The adsorbent bed may comprise a feed input end, a product output end and an adsorbent material selective for adsorbing $CO_2$. Additionally, the adsorbent bed may be operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed.

The first temperature may be ≥about −30° C., ≥about −25° C., ≥about −20° C., ≥about −15° C., ≥about −10° C., ≥about −5° C., ≥about 0° C., ≥about 5° C., ≥about 10° C., ≥about 15° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., or ≥about 100° C. In particular, the first temperature may be ≥about 25° C. Additionally or alternatively, the first temperature may be ≤about −30° C., ≤about −25° C., ≤about −20° C., ≤about −15° C., ≤about −10° C., ≤about −5° C., ≤about 0° C., ≤about 5° C., ≤about 10° C., ≤about 15° C., ≤about 20° C., ≤about 25° C., ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., or ≤about 100° C. Ranges expressly disclosed include combinations of the above-enumerated upper and lower limits, e.g., about −30° C. to about 100° C., about 25° C. to about 95° C., about −20° C. to about 80° C., about 0° C. to about 50° C., about 10° C. to about 30° C. In particular, the first temperature is about −20° C. to about 80° C., about 0° C. to about 50° C. or about 10° C. to about 30° C.

The first pressure in combination with the above described first temperatures may be such that the partial pressure of $CO_2$ may be ≥about 1 bar, ≥about 2 bar, ≥about 3 bar, ≥about 4 bar, ≥about 5 bar, ≥about 6 bar, ≥about 7 bar, ≥about 8 bar, ≥about 9 bar, ≥about 10 bar, ≥about 12 bar, ≥about 15 bar, ≥about 16 bar, ≥about 18 bar, ≥about 20 bar, ≥about 22 bar, ≥about 24 bar, ≥about 25 bar, ≥about 26 bar, ≥about 28 bar, or ≥about 30 bar. In particular, the first pressure in combination with the above described first temperatures may be such that the partial pressure of $CO_2$ is ≥about 5 bar or ≥about 25 bar. Additionally or alternatively, the first pressure in combination with the above described first temperatures may be such that the partial pressure of $CO_2$ is ≤about 1 bar, ≤about 2 bar, ≤about 3 bar, ≤about 4 bar, ≤about 5 bar, ≤about 6 bar, ≤about 7 bar, ≤about 8 bar, ≤about 9 bar, ≤about 10 bar, ≤about 12 bar, ≤about 15 bar, ≤about 16 bar, ≤about 18 bar, ≤about 20 bar, ≤about 22 bar, ≤about 24 bar, ≤about 25 bar, ≤about 26 bar, ≤about 28 bar, or ≤about 30 bar. Ranges expressly disclosed include combinations of the above-enumerated upper and lower limits, e.g., about 1 bar to about 30 bar, about 2 bar to about 28 bar, about 3 bar to about 25 bar, about 3 bar to about 10 bar, about 15 bar to about 25 bar. In particular, a first pressure in combination with the above described first temperatures may be such that the partial pressure of $CO_2$ is about 3 bar to about 25 bar, about 3 bar to about 10 bar, about 3 bar to about 7 bar, about 15 bar to about 25 bar, or about 18 bar to about 22 bar.

In various aspects, the PTSA process may further include stopping the introduction of the feed gas mixture to the adsorbent bed before breakthrough of $CO_2$ from the product output end of the adsorbent bed and heating the adsorbent bed to a second temperature, which may be higher than the first temperature, resulting in desorption of at least a portion of $CO_2$ from the adsorbent bed and recovering at least a first portion of $CO_2$. The second temperature may be ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., ≥about 100° C., ≥about 105° C., ≥about 110° C., ≥about 115° C., ≥about 120° C., ≥about 125° C., ≥about 130° C., ≥about 135° C., ≥about 140° C., ≥about 145° C., ≥about 150° C., ≥about 155° C., ≥about 160° C., ≥about 165° C., ≥about 170° C., ≥about 175° C., ≥about 180° C., ≥about 185° C., ≥about 190° C., ≥about 195° C., or ≥about 200° C. In particular, the second temperature may be ≥about 95° C. Additionally or alternatively, the second temperature may be ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., ≤about 100° C., ≤about 105° C., ≤about 110° C., ≤about 115° C., ≤about 120° C., ≤about 125° C., ≤about 130° C., ≤about 135° C., ≤about 140° C., ≤about 145° C., ≤about 150° C., ≤about 155° C., ≤about 160° C., ≤about 165° C., ≤about 170° C., ≤about 175° C., ≤about 180° C., ≤about 185° C., ≤about 190° C., ≤about 195° C., or ≤about 200° C. Ranges expressly disclosed include combinations of the above-enumerated upper and lower limits, e.g., about 30° C. to about 200° C., about 50° C. to about 150° C., about 55° C. to about 125° C., about 75° C. to about 120° C., about 80° C. to about 110° C., etc. In particular, the second temperature is about 50° C. to about 150° C., about 75° C. to about 120° C. or about 80° C. to about 110° C.

Additionally or alternatively, the PTSA process may further include reducing the pressure of the adsorbent bed to a second pressure, which may be lower than the first pressure, and recovering a second portion of $CO_2$. The second pressure in combination with above described second temperature may be such that the partial pressure of $CO_2$ is ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 1 bar, ≥about 2 bar, ≥about 3 bar, ≥about 4 bar, ≥about 6 bar, ≥about 7 bar, ≥about 8 bar, ≥about 9 bar, or ≥about 10 bar. In particular, the second pressure in combination with above described second temperature may be such that the partial pressure of $CO_2$ is ≥about 1 bar. Additionally or alternatively, the second pressure in combination with above described second temperature may be such that the partial pressure of $CO_2$ is ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 1 bar, ≤about 2 bar, ≤about 3 bar, ≤about 4 bar, ≤about 6 bar, ≤about 7 bar, ≤about 8 bar, ≤about 9 bar, or ≤about 10 bar. Ranges expressly disclosed include combinations of the above-enumerated upper and lower limits, e.g., about 0.1 bar to about 10 bar, about 0.3 bar to about 9 bar, about 0.5 bar to about 5 bar, about 0.5 bar to about 2 bar, about 1 bar to about 5 bar, etc. In particular, the second pressure in combination with above described second temperature may be such that the partial pressure of $CO_2$ is about 0.5 bar to about 2 bar, about 1 bar to about 5 bar, or about 0.9 bar to about 3 bar.

In various aspects, the adsorbent material may comprise a zeolite having a Si/Al ratio above about 100 (e.g. above about 200, above about 400, above about 600, etc.) and a framework structure selected from the group consisting of AFT, AFX, CAS, DAC, HEU, IMF, ITH, KFI, LAU, MFS, MTT, PAU, RRO, SFF, STF, SXR, TER, TON, TUN, and a combination thereof. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of AFT, AFX, CHA, EMT, EUO, FAU, IRR, IRY, ITT, KFI, LTA, MRE, MWW, NES, PAU, RHO, RWY, SFF, STI, TSC, UFI, VFI, having (i) a Si/Al ratio of about 3 to about 100, about 3 to 75, about 5 to about 90, about 5 to about 85, about 5 to about 70, about 5 to about 60 or about 5 to about 50; and/or (ii) a cation concentration (e.g., potassium cation, sodium cation) of about 0% to about 100%, about 1% to about 100%, about 5% to about 100%, about 10% to about 100%, about 40% to about 100%, about 60% to about 100% or about 70% to about 100%.

Additionally or alternatively, the adsorbent material may comprise a zeolite having a Si/Al ratio above about 100 (e.g. above about 200, above about 400, above about 600, etc.) and a framework structure selected from the group consisting of AFT, AFX, KFI, PAU, TSC, and a combination thereof. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of AFT, AFX, CHA, KFI, LTA, PAU, RHO, TSC, UFI, and a combination thereof, having (i) a Si/Al ratio of about 5 to about 60 or about 10 to about 50; and/or a (ii) a cation concentration (e.g., potassium cation, sodium cation) of about 1% to about 100%, about 30% to about 100%, or about 50% to about 100%.

Additionally or alternatively, the above mentioned adsorbent materials may not include a zeolite with a framework structure selected from the group consisting of CHA, FAU, LTA, RHO and a combination thereof.

Additionally or alternatively, the adsorbent material may comprise a zeolite having a Si/Al ratio of between about 5 and about 45 (e.g., about 6, about 10, about 20, about 30, about 40, etc.) and with a framework structure selected from the group consisting of CHA, FAU, FER, LTA, MFI, RHO, UFI, and a combination thereof. Additionally or alternatively, the adsorbent material may comprise a zeolite having a Si/Al ratio of between about 5 and about 45 (e.g., about 6, about 10, about 20, about 30, about 40, etc.) and with a framework structure selected from the group consisting of CHA, FAU, LTA, RHO, and a combination thereof. Additionally or alternatively, these zeolites may include a cation concentration of less than about 10%, less than about 5%, less than about 1%, less than about 0.1%, or about 0%.

Additionally or alternatively, the adsorbent material may have a working capacity of ≥about 1.0 mmol/cc, ≥about 2.0 mmol/cc, ≥about 3.0 mmol/cc, ≥about 4.0 mmol/cc, ≥about 5.0 mmol/cc, ≥about 6.0 mmol/cc, ≥about 7.0 mmol/cc, ≥about 8.0 mmol/cc, ≥about 9.0 mmol/cc, ≥about 10.0 mmol/cc, ≥about 11.0 mmol/cc, ≥about 12.0 mmol/cc, ≥about 13.0 mmol/cc, ≥about 14.0 mmol/cc, ≥about 15.0 mmol/cc, ≥about 16.0 mmol/cc, ≥about 17.0 mmol/cc, ≥about 18.0 mmol/cc, ≥about 19.0 mmol/cc, or ≥about 20.0 mmol/cc. Additionally or alternatively, the adsorbent material may have a working capacity of ≤about 1.0 mmol/cc, ≤about 2.0 mmol/cc, ≤about 3.0 mmol/cc, ≤about 4.0 mmol/cc, ≤about 5.0 mmol/cc, ≤about 6.0 mmol/cc, ≤about 7.0 mmol/cc, ≤about 8.0 mmol/cc, ≤about 9.0 mmol/cc, ≤about 10.0 mmol/cc, ≤about 11.0 mmol/cc, ≤about 12.0 mmol/cc, ≤about 13.0 mmol/cc, ≤about 14.0 mmol/cc, ≤about 15.0 mmol/cc, ≤about 16.0 mmol/cc, ≤about 17.0 mmol/cc, ≤about 18.0 mmol/cc, ≤about 19.0 mmol/cc, or ≤about 20.0 mmol/cc. Ranges expressly disclosed include combinations of the above-enumerated values, e.g., about 1.0 mmol/cc to about 20.0 mmol/cc, about 1.0 mmol/cc to about 16.0 mmol/cc, about 2.0 mmol/cc to about 15.0 mmol/cc, about 3.0 mmol/cc to about 12.0 mmol/cc, about 3.0 mmol/cc to about 17.0 mmol/cc, about 5.0 mmol/cc to about 15.0 mmol/cc, etc. In particular, the adsorbent material may have a working capacity of about 3.0 mmol/cc to about 17.0 mmol/cc or about 5.0 mmol/cc to about 15.0 mmol/cc.

Additionally or alternatively, the adsorbent material may have an average heat of adsorption of ≥about 15 kJ/mol, ≥about 16 kJ/mol, ≥about 18 kJ/mol, ≥about 20 kJ/mol, ≥about 22 kJ/mol, ≥about 24 kJ/mol, ≥about 25 kJ/mol, ≥about 26 kJ/mol, ≥about 28 kJ/mol, ≥about 30 kJ/mol, ≥about 32 kJ/mol, ≥about 34 kJ/mol, ≥about 35 kJ/mol, ≥about 36 kJ/mol, ≥about 38 kJ/mol or ≥about 40 kJ/mol. Additionally or alternatively, the adsorbent may have an average heat of adsorption of ≤about 15 kJ/mol, ≤about 16 kJ/mol, ≤about 18 kJ/mol, ≤about 20 kJ/mol, ≤about 22 kJ/mol, ≤about 24 kJ/mol, ≤about 25 kJ/mol, ≤about 26 kJ/mol, ≤about 28 kJ/mol, ≤about 30 kJ/mol, ≤about 32 kJ/mol, ≤about 34 kJ/mol, ≤about 35 kJ/mol, ≤about 36 kJ/mol, ≤about 38 kJ/mol or ≤about 40 kJ/mol. Ranges expressly disclosed include combinations of the above-enumerated values, e.g., about 15 kJ/mol to about 40 kJ/mol, about 18 kJ/mol to about 38 kJ/mol, about 20 kJ/mol to about 36 kJ/mol, about 22 kJ/mol to about 36 kJ/mol, about 24 kJ/mol to about 36 kJ/mol, about 25 kJ/mol to about 35 kJ/mol etc. In particular, the adsorbent material may have an average heat of adsorption of about 20 kJ/mol to about 38 kJ/mol, about 22 kJ/mol to about 36 kJ/mol or about 24 kJ/mol to about 36 kJ/mol.

In various aspects, an adsorbent material comprising one or more of the following: (i) a zeolite having a Si/Al ratio above about 100 and a framework structure selected from the group consisting of AFT, AFX, CAS, DAC, HEU, IMF, ITH, KFI, LAU, MFS, MTT, PAU, RRO, SFF, STF, SXR, TER, TON, TUN, and a combination thereof; or (ii) a zeolite with a framework structure selected from the group consisting of AFT, AFX, CHA, EMT, EUO, FAU, IRR, IRY, ITT, KFI, LTA, MRE, MWW, NES, PAU, RHO, RWY, SFF, STI, TSC, UFI, VFI, and a combination thereof, having: (a) a Si/Al ratio of about 3 to about 100; and/or (b) a potassium cation concentration of about 1% to about 100%, for use in a PTSA process for separating $CO_2$ from a feed gas mixture is provided.

Nonlimiting examples of suitable zeolites for use in the PTSA described herein are those which are provided below in Table 7.

TABLE 7

| Zeolites | |
|---|---|
| AFT_Si | MFI_Si |
| AFT_50_33 | MFS_Si |
| AFX_Si | MRE_10_100 |
| AFX_50_0 | MTT_Si |
| CAS_Si | MWW_25_100 |
| CHA_Si | MWW_50_100 |
| CHA_25_50 | NES_50_100 |
| DAC_Si | PAU_Si |
| EMT_5_33 | PAU_50_67 |
| EMT_10_100 | RHO_Si |
| EUO_25_100 | RHO_25_83 |
| FAU_5_83 | RRO_Si |
| FER_Si | RWY_3_17 |
| HEU_Si | SFF_Si |

TABLE 7-continued

| Zeolites | |
|---|---|
| IMF_Si | SFF_50_100 |
| IRR_5_50 | STF_Si |
| IRR_10_33 | STI_10_100 |
| IRY_3_0 | SZR_Si |
| IRY_10_67 | TER_Si |
| ITH_Si | TON_Si |
| ITT_5_50 | TSC_10_17 |
| ITT_25_50 | TSC_25_33 |
| KFI_Si | TUN_Si |
| KFI_25_100 | UFI_Si |
| LAU_Si | UFI_25_100 |
| LTA_10_33 | VFI_1_0 |
| LTA_50_83 | |

C. Vacuum Swing Adsorption (VSA) Processes

In another embodiment, a VSA process for separating $CO_2$ from a feed gas mixture is provided. The VSA process may include subjecting the feed gas mixture comprising $CO_2$ to an adsorption step by introducing the feed gas mixture into a feed input end of an adsorbent bed. The feed gas mixture may be natural gas, syngas, flue gas as well as other streams containing $CO_2$. Typical natural gas mixtures contain $CH_4$ and higher hydrocarbons ($C_2H_6$, $C_3H_8$, $C_4H_{10}$ etc), as well as acid gases ($CO_2$ and $H_2S$), $N_2$ and $H_2O$. The amount of water in the natural gas mixture depends on prior dehydration processing to remove $H_2O$. Typical syngas mixtures contain $H_2$, CO, $CO_2$, $CH_4$, COS and $H_2S$. Typical flue gas mixtures contain $N_2$, $CO_2$, $H_2O$, $O_2$, $SO_2$. The adsorbent bed may comprise a feed input end, a product output end and an adsorbent material selective for adsorbing $CO_2$. Additionally, the adsorbent bed may be operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed.

The first temperature may be ≥about −30° C., ≥about −25° C., ≥about −20° C., ≥about −15° C., ≥about −10° C., ≥about −5° C., ≥about 0° C., ≥about 5° C., ≥about 10° C., ≥about 15° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., or ≥about 100° C. In particular, the first temperature may be ≥about 25° C. Additionally or alternatively, the first temperature may be ≤about −30° C., ≤about −25° C., ≤about −20° C., ≤about −15° C., ≤about −10° C., ≤about −5° C., ≤about 0° C., ≤about 5° C., ≤about 10° C., ≤about 15° C., ≤about 20° C., ≤about 25° C., ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., or ≤about 100° C. Ranges expressly disclosed include combinations of the above-enumerated upper and lower limits, e.g., about −30° C. to about 100° C., about −25° C. to about 95° C., about −20° C. to about 80° C., about 0° C. to about 50° C., about 10° C. to about 30° C. In particular, the first temperature is about −20° C. to about 80° C., about 0° C. to about 50° C. or about 10° C. to about 30° C.

The first pressure in combination with the above described first temperatures may be such that the partial pressure of $CO_2$ may be ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 1 bar, ≥about 2 bar, ≥about 3 bar, ≥about 4 bar, ≥about 6 bar, ≥about 7 bar, ≥about 8 bar, ≥about 9 bar, or ≥about 10 bar.

In particular, the first pressure in combination with the above described first temperatures may be such that the partial pressure of $CO_2$ is ≥about 1 bar. Additionally or alternatively, the first pressure in combination with above described first temperature may be such that the partial pressure of $CO_2$ is ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 1 bar, ≤about 2 bar, ≤about 3 bar, ≤about 4 bar, ≤about 6 bar, ≤about 7 bar, ≤about 8 bar, ≤about 9 bar, or ≤about 10 bar. Ranges expressly disclosed include combinations of the above-enumerated upper and lower limits, e.g., about 0.1 bar to about 10 bar, about 0.3 bar to about 9 bar, about 0.5 bar to about 5 bar, about 0.5 bar to about 3 bar, about 1 bar to about 5 bar, etc. In particular, the first pressure in combination with above described first temperature may be such that the partial pressure of $CO_2$ is about 0.5 bar to about 3 bar, about 0.5 bar to about 2 bar, about 1 bar to about 5 bar, or about 0.7 bar to about 2 bar.

In various aspects, the VSA process may further include stopping the introduction of the feed gas mixture to the adsorbent bed before breakthrough of $CO_2$ from the product output end of the adsorbent bed, passing a purge gas, substantially free of $CO_2$, through the adsorbent bed thereby resulting in a reduction in the pressure in the adsorption bed to a second pressure and in desorption of at least a portion of $CO_2$ from the adsorbent bed, and recovering at least a portion of $CO_2$ from the adsorbent bed. The second pressure may be such that the partial pressure of $CO_2$ is ≥about 0.01 bar, ≥about 0.02 bar, ≥about 0.03 bar, ≥about 0.04 bar, ≥about 0.05 bar, ≥about 0.06 bar, ≥about 0.07 bar, ≥about 0.08 bar, ≥about 0.09 bar, ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 0.95 bar or about 0.99 bar. In particular, the second pressure may be such that the partial pressure of $CO_2$ is ≥about 0.1 bar. Additionally or alternatively, the second pressure may be such that the partial pressure of $CO_2$ is ≤about 0.01 bar, ≤about 0.02 bar, ≤about 0.03 bar, ≤about 0.04 bar, ≤about 0.05 bar, ≤about 0.06 bar, ≤about 0.07 bar, ≤about 0.08 bar, ≤about 0.09 bar, ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 0.95 bar or ≤0.99 bar. Ranges expressly disclosed include combinations of the above-enumerated upper and lower limits, e.g., about 0.01 bar to about 0.99 bar, about 0.05 bar to about 0.8 bar, about 0.05 bar to about 0.5 bar, about 0.07 bar to about 0.4 bar, about 0.09 bar to about 0.2 bar, etc. In particular, the second pressure may be such that the partial pressure of $CO_2$ is about 0.05 bar to about 0.5 bar or about 0.09 bar to about 0.2 bar.

In various aspects, the adsorbent material may comprise a zeolite having a Si/Al ratio above about 100 (e.g. above about 200, above about 400, above about 600, etc.) and a framework structure selected from the group consisting of CAS, DAC, HEU, LAU, MTT, RRO, TON, and a combination thereof. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of AFT, AFX, EMT, EUO, IMF, IRR, IRY, ITH, ITT, KFI, MFS, MRE, MWW, NES, PAU, RWY, SFF, STF, STI, SZR, TER, TSC, TUN, VFI, and a combination thereof, having (i) a Si/Al ratio of about 1 to about 100, about 1 to about 90, about 1 to about 75, about 1 to about 60 or about 1 to about 50; and/or (ii) a cation concentration (e.g., potassium cation, sodium cation) of about 0% to about 100%, about 5% to about 100%, about 10% to about 100%, about 10% to about 90%, about 40% to about 100%, about 60% to about 100% or about 70% to about 100%.

Additionally or alternatively, the adsorbent material may comprise a zeolite with a framework structure selected from the group consisting of AFX, AFT, KFI, PAU, TSC, and a combination thereof, having (i) a Si/Al ratio of about 3 to about 60 or about 5 to about 50; and/or a (ii) a cation concentration (e.g., potassium cation, sodium cation) of about 0% to about 100%, about 10% to about 100%, about 30% to about 100%, about 50% to about 100%, or about 70% to about 100%.

Additionally or alternatively, the above mentioned adsorbent materials may not include a zeolite with a framework structure selected from the group consisting of CHA, FAU, LTA, RHO and a combination thereof.

Additionally or alternatively, the adsorbent material may comprise a zeolite with a framework structure selected from the group consisting of CHA, FAU, FER, LTA, MFI, RHO, UFI, and a combination thereof, having (i) a Si/Al ratio of between about 3 and about 50, about 4 to about 40, about 4 to about 30 or about 5 to about 25; and/or (ii) a cation concentration (e.g., potassium cation, sodium cation) of about 20% to about 100%, about 30% to about 100%, about 40% to about 100%, about 50% to about 100%, or about 70% to about 100%. Additionally or alternatively, the adsorbent material may comprise a zeolite with a framework structure selected from the group consisting of CHA, FAU, LTA, RHO, and a combination thereof, having (i) a Si/Al ratio of between about 3 and about 50, about 4 to about 40, about 4 to about 30 or about 5 to about 25; and/or (ii) a cation concentration (e.g., potassium cation, sodium cation) of about 20% to about 100%, about 30% to about 100%, about 40% to about 100%, about 50% to about 100%, or about 70% to about 100%.

Additionally or alternatively, the adsorbent material may have a working capacity of ≥about 0.5 mmol/cc ≥about 1.0 mmol/cc, ≥about 2.0 mmol/cc, ≥about 3.0 mmol/cc, ≥about 4.0 mmol/cc, ≥about 5.0 mmol/cc, ≥about 6.0 mmol/cc, ≥about 7.0 mmol/cc, ≥about 8.0 mmol/cc, ≥about 9.0 mmol/cc, ≥about 10.0 mmol/cc, ≥about 11.0 mmol/cc, ≥about 12.0 mmol/cc, ≥about 13.0 mmol/cc, ≥about 14.0 mmol/cc, ≥about 15.0 mmol/cc, ≥about 16.0 mmol/cc, ≥about 17.0 mmol/cc, ≥about 18.0 mmol/cc, ≥about 19.0 mmol/cc, or ≥about 20.0 mmol/cc. Additionally or alternatively, the adsorbent material may have a working capacity of ≤about 0.5 mmol/cc, ≤about 1.0 mmol/cc, ≤about 2.0 mmol/cc, ≤about 3.0 mmol/cc, ≤about 4.0 mmol/cc, ≤about 5.0 mmol/cc, ≤about 6.0 mmol/cc, ≤about 7.0 mmol/cc, ≤about 8.0 mmol/cc, ≤about 9.0 mmol/cc, ≤about 10.0 mmol/cc, ≤about 11.0 mmol/cc, ≤about 12.0 mmol/cc, ≤about 13.0 mmol/cc, ≤about 14.0 mmol/cc, ≤about 15.0 mmol/cc, ≤about 16.0 mmol/cc, ≤about 17.0 mmol/cc, ≤about 18.0 mmol/cc, ≤about 19.0 mmol/cc, or ≤about 20.0 mmol/cc. Ranges expressly disclosed include combinations of the above-enumerated values, e.g., about 0.5 mmol/cc to about 20.0 mmol/cc, about 1.0 mmol/cc to about 16.0 mmol/cc, about 2.0 mmol/cc to about 15.0 mmol/cc, about 3.0 mmol/cc to about 12.0 mmol/cc, about 3.0 mmol/cc to about 10.0 mmol/cc, about 3.0 mmol/cc to about 6.0 mmol/cc etc. In particular, the adsorbent material may have a working capacity of about 3.0 mmol/cc to about 10.0 mmol/cc or about 3.0 mmol/cc to about 6.0 mmol/cc.

Additionally or alternatively, the adsorbent material may have an average heat of adsorption of ≥about 15 kJ/mol, ≥about 16 kJ/mol, ≥about 18 kJ/mol, ≥about 20 kJ/mol, ≥about 22 kJ/mol, ≥about 24 kJ/mol, ≥about 26 kJ/mol, ≥about 28 kJ/mol, ≥about 30 kJ/mol, ≥about 32 kJ/mol, ≥about 34 kJ/mol, ≥about 36 kJ/mol, ≥about 38 kJ/mol or ≥about 40 kJ/mol. Additionally or alternatively, the adsorbent material may have an average heat of adsorption of ≤about 15 kJ/mol, ≤about 16 kJ/mol, ≤about 18 kJ/mol, ≤about 20 kJ/mol, ≤about 22 kJ/mol, ≤about 24 kJ/mol, ≤about 26 kJ/mol, ≤about 28 kJ/mol, ≤about 30 kJ/mol, ≤about 32 kJ/mol, ≤about 34 kJ/mol, ≤about 36 kJ/mol, ≤about 38 kJ/mol or ≤about 40 kJ/mol. Ranges expressly disclosed include combinations of the above-enumerated values, e.g., about 15 kJ/mol to about 40 kJ/mol, about 20 kJ/mol to about 38 kJ/mol, about 22 kJ/mol to about 38 kJ/mol, about 24 kJ/mol to about 38 kJ/mol etc. In particular, the adsorbent material for use in the PSA process described herein may have an average heat of adsorption of about 20 kJ/mol to about 38 kJ/mol or about 24 kJ/mol to about 38 kJ/mol.

In various aspects, an adsorbent material comprising one or more of the following: (i) a zeolite having a Si/Al ratio above about 100 and a framework structure selected from the group consisting of CAS, DAC, HEU, LAU, MTT, RRO, TON, and a combination thereof; or (ii) a zeolite with a framework structure selected from the group consisting of AFT, AFX, EMT, EUO, IMF IRR, IRY, ITH, ITT, KFI, MFS, MRE, MWW, NES, PAU, RWY, SFF, STF, STI, SZR, TER, TSC, TUN, VFI, and a combination thereof, having: (a) a Si/Al ratio of about 1 to about 100; and/or (b) a potassium cation concentration of about 0% to about 100%, for use in a VSA process for separating $CO_2$ from a feed gas mixture is provided.

In various aspects, an adsorbent material comprising a zeolite with a framework structure selected from the group consisting of CHA, FAU, FER, LTA, MFI, RHO, UFI and a combination thereof, having (a) a Si/Al ratio of about 3 to about 30; and/or a potassium cation concentration of about 40% to about 100%, for use in a VSA process for separating $CO_2$ from a feed gas mixture is provided.

Nonlimiting examples of suitable zeolites for use in the VSA described herein are those which are provided below in Table 8.

TABLE 8

| Zeolites | |
|---|---|
| RWY_3_17 | HEU_Si |
| IRY_3_83 | MWW_10_100 |
| FAU_5_100 | SFF_25_67 |
| UFI_25_100 | CAS_Si |
| KFI_25_100 | TER_50_100 |
| IRR_3_100 | STI_10_83 |
| EMT_5_83 | MFS_25_100 |
| RHO_10_50 | TUN_50_100 |
| AFX_25_33 | NES_10_67 |
| PAU_50_33 | FER_50_100 |
| VFI_1_0 | ITH_25_100 |
| AFT_25_83 | LAU_Si |
| RRO_Si | MFI_50_100 |
| CHA_25_83 | SZR_50_83 |
| DAC_Si | EUO_25_100 |
| LTA_5_50 | IMF_50_100 |
| TSC_5_0 | TON_Si |

TABLE 8-continued

| Zeolites | |
|---|---|
| ITT_3_50 | MTT_Si |
| STF_50_100 | MRE_10_100 |

D. Vacuum Temperature Swing Adsorption (VTSA) Processes

In another embodiment, a VTSA process for separating $CO_2$ from a feed gas mixture is provided. The VTSA process may include subjecting the feed gas mixture comprising $CO_2$ to an adsorption step by introducing the feed gas mixture into a feed input end of an adsorbent bed. The feed gas mixture may be natural gas, syngas, flue gas as well as other streams containing $CO_2$. Typical natural gas mixtures contain $CH_4$ and higher hydrocarbons (C2H6, C3H8, C4H10 etc), as well as acid gases ($CO_2$ and $H_2S$), $N_2$ and $H_2O$. The amount of water in the natural gas mixture depends on prior dehydration processing to remove $H_2O$. Typical syngas mixtures contain $H_2$, CO, $CO_2$, $CH_4$, COS and $H_2S$. Typical flue gas mixtures contain $N_2$, $CO_2$, $H_2O$, $O_2$, $SO_2$. The adsorbent bed may comprise a feed input end, a product output end and an adsorbent material selective for adsorbing $CO_2$. Additionally, the adsorbent bed may be operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed.

The first temperature may be ≥about −30° C., ≥about −25° C., ≥about −20° C., ≥about −15° C., ≥about −10° C., ≥about −5° C., ≥about 0° C., ≥about 5° C., ≥about 10° C., ≥about 15° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., or ≥about 100° C. In particular, the first temperature may be ≥about 25° C. Additionally or alternatively, the first temperature may be ≤about −30° C., ≤about −25° C., ≤about −20° C., ≤about −15° C., ≤about −10° C., ≤about −5° C., ≤about 0° C., ≤about 5° C., ≤about 10° C., ≤about 15° C., ≤about 20° C., ≤about 25° C., ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., or ≤about 100° C. Ranges expressly disclosed include combinations of the above-enumerated upper and lower limits, e.g., about −30° C. to about 100° C., about −25° C. to about 95° C., about −20° C. to about 80° C., about 0° C. to about 50° C., about 10° C. to about 30° C. In particular, the first temperature is about −20° C. to about 80° C., about 0° C. to about 50° C. or about 10° C. to about 30° C.

The first pressure in combination with the above described first temperatures may be such that the partial pressure of $CO_2$ may be ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 1 bar, ≥about 2 bar, ≥about 3 bar, ≥about 4 bar, ≥about 6 bar, ≥about 7 bar, ≥about 8 bar, ≥about 9 bar, or ≥about 10 bar. In particular, the first pressure in combination with the above described first temperatures may be such that the partial pressure of $CO_2$ is ≥about 1 bar. Additionally or alternatively, the first pressure in combination with above described first temperature may be such that the partial pressure of $CO_2$ is ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 1 bar, ≤about 2 bar, ≤about 3 bar, ≤about 4 bar, ≤about 6 bar, ≤about 7 bar, ≤about 8 bar, ≤about 9 bar, or ≤about 10 bar. Ranges expressly disclosed include combinations of the above-enumerated upper and lower limits, e.g., about 0.1 bar to about 10 bar, about 0.3 bar to about 9 bar, about 0.5 bar to about 7 bar, about 0.5 bar to about 6 bar, about 1 bar to about 5 bar, etc. In particular, the first pressure in combination with above described first temperature may be such that the partial pressure of $CO_2$ is about 0.5 bar to about 7 bar, about 0.5 bar to about 6 bar, about 1 bar to about 5 bar, or about 0.7 bar to about 2 bar.

In various aspects, the VTSA process may further include stopping the introduction of the feed gas mixture to the adsorbent bed before breakthrough of $CO_2$ from the product output end of the adsorbent bed and heating the adsorbent bed to a second temperature higher than the first temperature and passing a purge gas, substantially free of $CO_2$, through the adsorbent bed thereby resulting in a reduction in the pressure in the adsorption bed to a second pressure, resulting in desorption of at least a portion of $CO_2$ from the adsorbent bed and recovering at least a portion of $CO_2$. The adsorbent bed may be heated simultaneously with passing the purge gas through though adsorbent bed. The second temperature may be ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., ≥about 100° C., ≥about 105° C., ≥about 110° C., ≥about 115° C., ≥about 120° C., ≥about 125° C., ≥about 130° C., ≥about 135° C., ≥about 140° C., ≥about 145° C., ≥about 150° C., ≥about 155° C., ≥about 160° C., ≥about 165° C., ≥about 170° C., ≥about 175° C., ≥about 180° C., ≥about 185° C., ≥about 190° C., ≥about 195° C., ≥about 200° C., ≥about 205° C., ≥about 210° C., ≥about 215° C., ≥about 220° C., ≥about 225° C., ≥about 250° C., ≥about 275° C., or ≥300° C. In particular, the second temperature may be ≥about 95° C. or ≥about 195° C. Additionally or alternatively, the second temperature may be ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., ≤about 100° C., ≤about 105° C., ≤about 110° C., ≤about 115° C., ≤about 120° C., ≤about 125° C., ≤about 130° C., ≤about 135° C., ≤about 140° C., ≤about 145° C., ≤about 150° C., ≤about 155° C., ≤about 160° C., ≤about 165° C., ≤about 170° C., ≤about 175° C., ≤about 180° C., ≤about 185° C., ≤about 190° C., ≤about 195° C., ≤about 200° C., ≤about 205° C., ≤about 210° C., ≤about 215° C., ≤about 220° C., ≤about 225° C., ≤about 250° C., ≤about 275° C., or ≤300° C. Ranges expressly disclosed include combinations of the above-enumerated upper and lower limits, e.g., about 30° C. to about 300° C., about 50° C. to about 250° C., about 60° C. to about 200° C., about 75° C. to about 125° C., about 150° C. to about 250° C., bout 175° C. to about 225° C., etc. In particular, the second temperature is about 50° C. to about 250° C., about 75° C. to about 125° C. or about 175° C. to about 225° C.

The second pressure in combination with above described second temperature may be such that the partial pressure of $CO_2$ is ≥about 0.01 bar, ≥about 0.02 bar, ≥about 0.03 bar, ≥about 0.04 bar, ≥about 0.05 bar, ≥about 0.06 bar, ≥about 0.07 bar, ≥about 0.08 bar, ≥about 0.09 bar, ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 0.95 bar or about 0.99 bar. In particular, the second pressure may be such that the partial pressure of $CO_2$ is ≥about 0.1 bar or ≥about 0.2 bar. Additionally or alternatively, the second pressure may be such that the partial pressure of $CO_2$ is ≤about 0.01 bar, ≤about 0.02 bar, ≤about 0.03 bar, ≤about 0.04 bar, ≤about 0.05 bar, ≤about 0.06 bar, ≤about 0.07 bar, ≤about 0.08 bar, ≤about 0.09 bar, ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 0.95 bar or ≤0.99 bar. Ranges expressly disclosed include combinations of the above-enumerated upper and lower limits, e.g., about 0.01 bar to about 0.99 bar, about 0.05 bar to about 0.8 bar, about 0.05 bar to about 0.5 bar, about 0.07 bar to about 0.4 bar, about 0.09 bar to about 0.4 bar, about 0.08 bar to about 0.3 bar, etc. In particular, the second pressure may be such that the partial pressure of $CO_2$ is about 0.05 bar to about 0.5 bar, about 0.09 bar to about 0.4 bar or about 0.08 bar to about 0.3 bar.

In various aspects, the adsorbent material may comprise a zeolite having a Si/Al ratio above about 100 (e.g. above about 200, above about 400, above about 600, etc.) and a CAS framework structure. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of AFT, AFX, CAS, DAC, EMT, EUO, HEU, IMF, IRR, IRY, ITH, ITT, KFI, LAU, MFS, MRE, MTT, MWW, NES, PAU, RRO, RWY, SFF, STF, STI, SZR, TER, TON, TSC, TUN, VFI, and a combination thereof, having (i) a Si/Al ratio of about 1 to about 100, about 1 to 90, about 1 to about 75, about 1 to about 50, about 1 to about 25, or about 1 to about 10; and/or (ii) a cation concentration (e.g., potassium cation, sodium cation) of about 0% to about 100%, about 0% to about 90%, about 0% to about 50%, about 0% to about 40%, or about 0% to about 30%.

Additionally or alternatively, the adsorbent material may comprise a zeolite with a framework structure selected from the group consisting of AFT, AFX, KFI, PAU, TSC, and a combination thereof, having (i) a Si/Al ratio of about 1 to about 30, about 1 to about 20, or about 1 to about 10; and/or a (ii) a cation concentration (e.g., potassium cation, sodium cation) of about 0% to about 50%, about 0% to about 40%, or about 0% to about 20%.

Additionally or alternatively, the above mentioned adsorbent materials may not include a zeolite with a framework structure selected from the group consisting of CHA, FAU, LTA, RHO and a combination thereof.

Additionally or alternatively, the adsorbent material may comprise a zeolite with a framework structure selected from the group consisting of CHA, FAU, FER, MFI, RHO, UFI, and a combination thereof, having (i) a Si/Al ratio of between about 1 and about 30, about 1 to about 20, or about 1 to about 10; and/or (ii) a cation concentration (e.g., potassium cation, sodium cation) of about 0% to about 40%, about 0% to about 20%, about 0% to about 10%, or about 0% to about 5%.

Additionally or alternatively, the adsorbent material may comprise a zeolite with a LTA framework structure having (i) a Si/Al ratio of between about 1 and about 20, about 1 to about 10, or about 1 to about 5; and/or (ii) a cation concentration (e.g., potassium cation, sodium cation) of about 0% to about 40%, about 2% to about 40%, about 5% to about 40%, about 5% to about 20%, or about 5% to about 10%.

Additionally or alternatively, the adsorbent material may comprise a zeolite with a framework structure selected from the group consisting of CHA, FAU, RHO, and a combination thereof, having (i) a Si/Al ratio of between about 1 and about 30, about 1 to about 20, or about 1 to about 10; and/or (ii) a cation concentration (e.g., potassium cation, sodium cation) of about 0% to about 40%, about 0% to about 20%, about 0% to about 10%, or about 0% to about 5%.

Additionally or alternatively, the adsorbent material may have a working capacity of ≥about 1.0 mmol/cc, ≥about 2.0 mmol/cc, ≥about 3.0 mmol/cc, ≥about 4.0 mmol/cc, ≥about 5.0 mmol/cc, ≥about 6.0 mmol/cc, ≥about 7.0 mmol/cc, ≥about 8.0 mmol/cc, ≥about 9.0 mmol/cc, ≥about 10.0 mmol/cc, ≥about 11.0 mmol/cc, ≥about 12.0 mmol/cc, ≥about 13.0 mmol/cc, ≥about 14.0 mmol/cc, ≥about 15.0 mmol/cc, ≥about 16.0 mmol/cc, ≥about 17.0 mmol/cc, ≥about 18.0 mmol/cc, ≥about 19.0 mmol/cc, or ≥about 20.0 mmol/cc. Additionally or alternatively, the adsorbent material described herein may have a working capacity of ≤about 1.0 mmol/cc, ≤about 2.0 mmol/cc, ≤about 3.0 mmol/cc, ≤about 4.0 mmol/cc, ≤about 5.0 mmol/cc, ≤about 6.0 mmol/cc, ≤about 7.0 mmol/cc, ≤about 8.0 mmol/cc, ≤about 9.0 mmol/cc, ≤about 10.0 mmol/cc, ≤about 11.0 mmol/cc, ≤about 12.0 mmol/cc, ≤about 13.0 mmol/cc, ≤about 14.0 mmol/cc, ≤about 15.0 mmol/cc, ≤about 16.0 mmol/cc, ≤about 17.0 mmol/cc, ≤about 18.0 mmol/cc, ≤about 19.0 mmol/cc, or ≤about 20.0 mmol/cc. Ranges expressly disclosed include combinations of the above-enumerated values, e.g., about 1.0 mmol/cc to about 20.0 mmol/cc, about 1.0 mmol/cc to about 16.0 mmol/cc, about 2.0 mmol/cc to about 15.0 mmol/cc, about 3.0 mmol/cc to about 14.0 mmol/cc, about 5.0 mmol/cc to about 12.0 mmol/cc, etc. In particular, the adsorbent material described herein may have a working capacity of about 3.0 mmol/cc to about 14.0 mmol/cc or about 5.0 mmol/cc to about 12.0 mmol/cc.

Additionally or alternatively, the adsorbent material may have an average heat of adsorption of ≥about 15 kJ/mol, ≥about 16 kJ/mol, ≥about 18 kJ/mol, ≥about 20 kJ/mol, ≥about 22 kJ/mol, ≥about 24 kJ/mol, ≥about 25 kJ/mol, ≥about 26 kJ/mol, ≥about 28 kJ/mol, ≥about 30 kJ/mol, ≥about 32 kJ/mol, ≥about 34 kJ/mol, ≥about 35 kJ/mol, ≥about 36 kJ/mol, ≥about 38 kJ/mol, ≥about 40 kJ/mol, ≥about 42 kJ/mol, ≥about 44 kJ/mol, ≥about 45 kJ/mol, ≥about 46 kJ/mol, ≥about 48 kJ/mol, ≥about 50 kJ/mol, ≥about 52 kJ/mol, ≥about 54 kJ/mol, ≥about 55 kJ/mol, ≥about 56 kJ/mol, ≥about 58 kJ/mol, or ≥about 60 kJ/mol. Additionally or alternatively, the adsorbent material may have an average heat of adsorption of ≤about 15 kJ/mol, ≤about 16 kJ/mol, ≤about 18 kJ/mol, ≤about 20 kJ/mol, ≤about 22 kJ/mol, ≤about 24 kJ/mol, ≤about 25 kJ/mol, ≤about 26 kJ/mol, ≤about 28 kJ/mol, ≤about 30 kJ/mol, ≤about 32 kJ/mol, ≤about 34 kJ/mol, ≤about 35 kJ/mol, ≤about 36 kJ/mol, ≤about 38 kJ/mol, ≤about 40 kJ/mol, ≤about 42 kJ/mol, ≤about 44 kJ/mol, ≤about 45 kJ/mol, ≤about 46 kJ/mol, ≤about 48 kJ/mol, ≤about 50 kJ/mol, ≤about 52 kJ/mol, ≤about 54 kJ/mol, ≤about 55 kJ/mol, ≤about 56 kJ/mol, ≤about 58 kJ/mol, or ≤about 60 kJ/mol. Ranges expressly disclosed include combinations of the above-enumerated values, e.g., about 15 kJ/mol to about 60 kJ/mol, about 25 kJ/mol to about 58 kJ/mol, about 28 kJ/mol to about 54 kJ/mol, about 30 kJ/mol to about 55 kJ/mol, etc. In particular, the adsorbent material for use in the VTSA process described herein may have an average heat of adsorption of about 25 kJ/mol to about 58 kJ/mol, about 28 kJ/mol to about 54 kJ/mol or about 30 kJ/mol to about 55 kJ/mol.

In various aspects, an adsorbent material comprising one or more of the following: (i) a zeolite having a Si/Al ratio above about 100 with a CAS framework structure; or (ii) a zeolite with a framework structure selected from the group consisting of AFT, AFX, CAS, DAC, EMT, EUO, HEU, IMF, IRR, IRY, ITH, ITT, KFI, LAU, MFS, MRE, MTT, MWW, NES, PAU, RRO, RWY, SFF, STF, STI, SZR, TER, TON, TSC, TUN, VFI, and a combination thereof, having: (a) a Si/Al ratio of about 1 to about 100; and/or (b) a potassium cation concentration of about 0% to about 100%, for use in a VTSA process for separating $CO_2$ from a feed gas mixture is provided.

In various aspects, an adsorbent material comprising one or more of the following: (i) a zeolite with a framework structure selected from the group consisting of CHA, FAU, FER, MFI, RHO, UFI and a combination thereof, having: (a) a Si/Al ratio of about 1 to about 20; and/or (b) a potassium cation concentration of about 0% to about 40%; or (ii) a zeolite with a LTA framework structure having: (a) a Si/Al ratio of about 1 to about 20; and/or (b) a potassium cation concentration of about 5% to about 40%, for use in a VTSA process for separating $CO_2$ from a feed gas mixture is provided.

Nonlimiting examples of suitable zeolites for use in the VTSA described herein are those which are provided below in Table 9.

TABLE 9

| Zeolites | |
|---|---|
| AFT_3_0 | MFI_10_33 |
| AFT_5_0 | MFS_10_17 |
| AFX_3_0 | MRE_2_0 |
| AFX_10_17 | MTT_10_83 |
| CAS_2_0 | MWW_2_0 |
| CAS_Si | MWW_2_33 |
| CHA_10_0 | NES_2_0 |
| CHA_1_0 | PAU_5_0 |
| DAC_50_17 | PAU_10_33 |
| EMT_1_0 | RHO_3_0 |
| EMT_2_0 | RHO_5_0 |
| EUO_3_0 | RRO_10_83 |
| FAU_1_0 | RWY_3_17 |
| FAU_2_33 | SFF_2_0 |
| FER_10_33 | SFF_3_0 |
| HEU_25_17 | STF_2_0 |
| IMF_10_0 | STF_5_0 |
| IRR_2_0 | STI_2_0 |
| IRY_2_0 | SZR_5_67 |
| ITH_10_17 | TER_10_17 |
| ITT_2_0 | TON_25_0 |
| ITT_2_17 | TSC_1_0 |
| KFI_3_0 | TUN_10_67 |
| LAU_10_0 | UFI_2_0 |
| LTA_1_0 | VFI_2_0 |
| KFI_5_0 | |

E. Temperature Swing Adsorption (TSA) Processes

In another embodiment, a TSA process for separating $CO_2$ from a feed gas mixture is provided. The TSA process may include subjecting the feed gas mixture comprising $CO_2$ to an adsorption step by introducing the feed gas mixture into a feed input end of an adsorbent bed. The feed gas mixture may be natural gas, syngas, flue gas as well as other streams containing $CO_2$. Typical natural gas mixtures contain $CH_4$ and higher hydrocarbons ($C2H6$, $C3H8$, $C4H10$ etc), as well as acid gases ($CO_2$ and $H_2S$), $N_2$ and $H_2O$. The amount of water in the natural gas mixture depends on prior dehydration processing to remove $H_2O$. Typical syngas mixtures contain $H_2$, CO, $CO_2$, $CH_4$, COS and $H_2S$. Typical flue gas mixtures contain $N_2$, $CO_2$, $H_2O$, $O_2$, $SO_2$. The adsorbent bed may comprise a feed input end, a product output end and an adsorbent material selective for adsorbing $CO_2$. Additionally, the adsorbent bed may be operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed.

The first temperature may be ≥about −30° C., ≥about −25° C., ≥about −20° C., ≥about −15° C., ≥about −10° C., ≥about −5° C., ≥about 0° C., ≥about 5° C., ≥about 10° C., ≥about 15° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., or ≥about 100° C. In particular, the first temperature may be ≥about 25° C. Additionally or alternatively, the first temperature may be ≤about −30° C., ≤about −25° C., ≤about −20° C., ≤about −15° C., ≤about −10° C., ≤about −5° C., ≤about 0° C., ≤about 5° C., ≤about 10° C., ≤about 15° C., ≤about 20° C., ≤about 25° C., ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., or ≤about 100° C. Ranges expressly disclosed include combinations of the above-enumerated upper and lower limits, e.g., about −30° C. to about 100° C., about −25° C. to about 95° C., about −20° C. to about 80° C., about 0° C. to about 50° C., about 10° C. to about 30° C. In particular, the first temperature is about −20° C. to about 80° C., about 0° C. to about 50° C. or about 10° C. to about 30° C.

The first pressure in combination with the above described first temperatures may be such that the partial pressure of $CO_2$ may be ≥about 0.1 bar, ≥about 0.2 bar, ≥about 0.3 bar, ≥about 0.4 bar, ≥about 0.5 bar, ≥about 0.6 bar, ≥about 0.7 bar, ≥about 0.8 bar, ≥about 0.9 bar, ≥about 1 bar, ≥about 2 bar, ≥about 3 bar, ≥about 4 bar, ≥about 6 bar, ≥about 7 bar, ≥about 8 bar, ≥about 9 bar, or ≥about 10 bar. In particular, the first pressure in combination with the above described first temperatures may be such that the partial pressure of $CO_2$ is ≥about 1 bar. Additionally or alternatively, the first pressure in combination with above described first temperature may be such that the partial pressure of $CO_2$ is ≤about 0.1 bar, ≤about 0.2 bar, ≤about 0.3 bar, ≤about 0.4 bar, ≤about 0.5 bar, ≤about 0.6 bar, ≤about 0.7 bar, ≤about 0.8 bar, ≤about 0.9 bar, ≤about 1 bar, ≤about 2 bar, ≤about 3 bar, ≤about 4 bar, ≤about 6 bar, ≤about 7 bar, ≤about 8 bar, ≤about 9 bar, or ≤about 10 bar. Ranges expressly disclosed include combinations of the above-enumerated upper and lower limits, e.g., about 0.1 bar to about 10 bar, about 0.3 bar to 9 bar, about 0.5 bar to about 5 bar, about 0.5 bar to about 3 bar, about 1 bar to about 5 bar, etc. In particular, the first pressure in combination with above described first temperature may be such that the partial pressure of $CO_2$ is about 0.5 bar to about 3 bar, about 0.5 bar to about 6 bar, about 1 bar to about 5 bar, or about 0.7 bar to about 2 bar.

In various aspects, the TSA process may further include stopping the introduction of the feed gas mixture to the adsorbent bed before breakthrough of $CO_2$ from the product output end of the adsorbent bed and heating the adsorbent bed to a second temperature higher than the first temperature, resulting in desorption of at least a portion of $CO_2$ from the adsorbent bed and recovering at least a portion of $CO_2$ from the adsorbent bed. The second temperature may be ≥about 30° C., ≥about 35° C., ≥about 40° C., ≥about 45° C., ≥about 50° C., ≥about 55° C., ≥about 60° C., ≥about 65° C., ≥about 70° C., ≥about 75° C., ≥about 80° C., ≥about 85° C., ≥about 90° C., ≥about 95° C., ≥about 100° C., ≥about 105° C., ≥about 110° C., ≥about 115° C., ≥about 120° C., ≥about 125° C., ≥about 130° C., ≥about 135° C., ≥about 140° C., ≥about 145° C., ≥about 150° C., ≥about 155° C., ≥about 160° C., ≥about 165° C., ≥about 170° C., ≥about 175° C., ≥about 180° C., ≥about 185° C., ≥about 190° C., ≥about 195° C., ≥about 200° C., ≥about 205° C., ≥about 210° C., ≥about 215° C., ≥about 220° C., ≥about 225° C., ≥about 250° C., ≥about 275° C., or ≥300° C. In particular, the second temperature may be ≥about 95° C. or ≥about 195° C. Additionally or alternatively, the second temperature may be ≤about 30° C., ≤about 35° C., ≤about 40° C., ≤about 45° C., ≤about 50° C., ≤about 55° C., ≤about 60° C., ≤about 65° C., ≤about 70° C., ≤about 75° C., ≤about 80° C., ≤about 85° C., ≤about 90° C., ≤about 95° C., ≤about 100° C., ≤about 105° C., ≤about 110° C., ≤about 115° C., ≤about 120° C., ≤about 125° C., ≤about 130° C., ≤about 135° C., ≤about 140° C., ≤about 145° C., ≤about 150° C., ≤about 155° C., ≤about 160° C., ≤about 165° C., ≤about 170° C., ≤about 175° C., ≤about 180° C., ≤about 185° C., ≤about 190° C., ≤about 195° C., ≤about 200° C., ≤about 205° C., ≤about 210° C., ≤about 215° C., ≤about 220° C., ≤about 225° C., ≤about 250° C., ≤about 275° C., or ≤about 300° C. Ranges expressly disclosed include combinations of the above-enumerated upper and lower limits, e.g., about 30° C. to about 300° C., about 50° C. to about 250° C., about 60° C. to about 200° C., about 75° C. to about 125° C., about 150° C. to about 250° C., about 175° C. to about 225° C., etc. In particular, the second temperature is about 50° C. to about 250° C., about 150° C. to about 250° C., about 75° C. to about 125° C. or about 175° C. to about 225° C.

In various aspects, the adsorbent material may comprise a zeolite having a Si/Al ratio above about 100 (e.g. above about 200, above about 400, above about 600, etc.) and a CAS framework structure. Additionally or alternatively, these zeolites may include a cation concentration of less than about 10%, less than about 5%, less than about 1%, less than about 0.1%, or about 0%.

Additionally or alternatively, the adsorbent material may comprise a zeolite with a framework structure selected from the group consisting of AFT, AFX, CAS, EMT, IRR, IRY, ITT, KFI, MWW, PAU, RWY, SFF, STF, TSC, UFI, VFI, and a combination thereof, having (i) a Si/Al ratio of about 1 to about 50, about 1 to 20, about 1 to about 10, or about 1 to about 5; and/or (ii) a cation concentration (e.g., potassium cation, sodium cation) of about 0% to about 50%, about 0% to about 40%, about 0% to about 30%, or about 0% to about 20%.

Additionally or alternatively, the adsorbent material may comprise a zeolite with a framework structure selected from the group consisting of AFT, AFX, KFI, PAU, TSC, UFI, and a combination thereof, having (i) a Si/Al ratio of about 1 to about 50, about 1 to 20, about 1 to about 10, or about 1 to about 5; and/or (ii) a cation concentration (e.g., potassium cation, sodium cation) of about 0% to about 50%, about 0% to about 40%, about 0% to about 30%, or about 0% to about 20%.

Additionally or alternatively, the above mentioned adsorbent materials may not include a zeolite with a framework structure selected from the group consisting of CHA, FAU, LTA, RHO and a combination thereof.

Additionally or alternatively, the adsorbent material may comprise a zeolite with a framework structure selected from the group consisting of CHA, FAU, FER, MFI, RHO, UFI, and a combination thereof, having (i) a Si/Al ratio of between about 1 and about 30, about 1 to about 20, about 1 to about 10 or about 1 to about 5; and/or (ii) a cation concentration (e.g., potassium cation, sodium cation) of about 0% to about 40%, about 0% to about 20%, about 0% to about 10%, or about 0% to about 5%.

Additionally or alternatively, the adsorbent material may comprise a zeolite with a LTA framework structure having (i) a Si/Al ratio of between about 1 and about 20, about 1 to about 10, or about 1 to about 5; and/or (ii) a cation concentration (e.g., potassium cation, sodium cation) of about 0% to about 40%, about 2% to about 40%, about 5% to about 40%, about 5% to about 20%, or about 5% to about 10%.

Additionally or alternatively, the adsorbent material may comprise a zeolite with a framework structure selected from the group consisting of CHA, FAU, RHO and a combination thereof, having (i) a Si/Al ratio of between about 1 and about 30, about 1 to about 20, about 1 to about 10 or about 1 to about 5; and/or (ii) a cation concentration (e.g., potassium cation, sodium cation) of about 0% to about 40%, about 0% to about 20%, about 0% to about 10%, or about 0% to about 5%.

Additionally or alternatively, the adsorbent material may have a working capacity of ≥about 1.0 mmol/cc, ≥about 2.0 mmol/cc, ≥about 3.0 mmol/cc, ≥about 4.0 mmol/cc, ≥about 5.0 mmol/cc, ≥about 6.0 mmol/cc, ≥about 7.0 mmol/cc, ≥about 8.0 mmol/cc, ≥about 9.0 mmol/cc, ≥about 10.0 mmol/cc, ≥about 11.0 mmol/cc, ≥about 12.0 mmol/cc, ≥about 13.0 mmol/cc, ≥about 14.0 mmol/cc, ≥about 15.0 mmol/cc, ≥about 16.0 mmol/cc, ≥about 17.0 mmol/cc, ≥about 18.0 mmol/cc, ≥about 19.0 mmol/cc, or ≥about 20.0 mmol/cc. Additionally or alternatively, the adsorbent material described herein may have a working capacity of ≤about 1.0 mmol/cc, ≤about 2.0 mmol/cc, ≤about 3.0 mmol/cc, ≤about 4.0 mmol/cc, ≤about 5.0 mmol/cc, ≤about 6.0 mmol/cc, ≤about 7.0 mmol/cc, ≤about 8.0 mmol/cc, ≤about 9.0 mmol/cc, ≤about 10.0 mmol/cc, ≤about 11.0 mmol/cc, ≤about 12.0 mmol/cc, ≤about 13.0 mmol/cc, ≤about 14.0 mmol/cc, ≤about 15.0 mmol/cc, ≤about 16.0 mmol/cc, ≤about 17.0 mmol/cc, ≤about 18.0 mmol/cc, ≤about 19.0 mmol/cc, or ≤about 20.0 mmol/cc. Ranges expressly disclosed include combinations of the above-enumerated values, e.g., about 1.0 mmol/cc to about 20.0 mmol/cc, about 1.0 mmol/cc to about 16.0 mmol/cc, about 2.0 mmol/cc to about 15.0 mmol/cc, about 3.0 mmol/cc to about 14.0 mmol/cc, about 3.0 mmol/cc to about 12.0 mmol/cc, about 5.0 mmol/cc to about 10.0 mmol/cc, etc. In particular, the adsorbent material described herein may have a working capacity of about 3.0 mmol/cc to about 12.0 mmol/cc or about 5.0 mmol/cc to about 10.0 mmol/cc.

Additionally or alternatively, the adsorbent material for use in the TSA process described herein may have an average heat of adsorption of ≥about 15 kJ/mol, ≥about 16 kJ/mol, ≥about 18 kJ/mol, ≥about 20 kJ/mol, ≥about 22 kJ/mol, ≥about 24 kJ/mol, ≥about 25 kJ/mol, ≥about 26 kJ/mol, ≥about 28 kJ/mol, ≥about 30 kJ/mol, ≥about 32 kJ/mol, ≥about 34 kJ/mol, ≥about 35 kJ/mol, ≥about 36 kJ/mol, ≥about 38 kJ/mol, ≥about 40 kJ/mol, ≥about 42 kJ/mol, ≥about 44 kJ/mol, ≥about 45 kJ/mol, ≥about 46 kJ/mol, ≥about 48 kJ/mol, ≥about 50 kJ/mol, ≥about 52 kJ/mol, ≥about 54 kJ/mol, ≥about 55 kJ/mol, ≥about 56 kJ/mol, ≥about 58 kJ/mol, or ≥about 60 kJ/mol. Additionally or alternatively, the adsorbent material for use in the TSA process described herein may have an average heat of adsorption of ≤about 15 kJ/mol, ≤about 16 kJ/mol, ≤about 18 kJ/mol, ≤about 20 kJ/mol, ≤about 22 kJ/mol, ≤about 24 kJ/mol, ≤about 25 kJ/mol, ≤about 26 kJ/mol, ≤about 28 kJ/mol, ≤about 30 kJ/mol, ≤about 32 kJ/mol, ≤about 34 kJ/mol, ≤about 35 kJ/mol, ≤about 36 kJ/mol, ≤about 38 kJ/mol, ≤about 40 kJ/mol, ≤about 42 kJ/mol, ≤about 44 kJ/mol, ≤about 45 kJ/mol, ≤about 46 kJ/mol, ≤about 48 kJ/mol, ≤about 50 kJ/mol, ≤about 52 kJ/mol, ≤about 54 kJ/mol, ≤about 55 kJ/mol, ≤about 56 kJ/mol, ≤about 58 kJ/mol, or ≤about 60 kJ/mol. Ranges expressly disclosed include combinations of the above-enumerated values, e.g., about 15 kJ/mol to about 60 kJ/mol, about 25 kJ/mol to about 58 kJ/mol, about 28 kJ/mol to about 54 kJ/mol, about 28 kJ/mol to about 52 kJ/mol, etc. In particular, the adsorbent material for use in the TSA process described herein may have an average heat of adsorption of about 25 kJ/mol to about 58 kJ/mol, about 28 kJ/mol to about 54 kJ/mol or about 28 kJ/mol to about 52 kJ/mol.

In various aspects, an adsorbent material comprising a zeolite with a framework structure selected from the group consisting of AFT AFX, CAS, EMT, IRR, IRY, ITT, KFI, MWW, PAU, RWY, SFF, STF, TSC, UFI, VFI, and a combination thereof, having: (a) a Si/Al ratio of about 1 to about 20; and/or (b) a potassium cation concentration of about 0% to about 50%, for use in a TSA process for separating $CO_2$ from a feed gas mixture is provided.

In various aspects, an adsorbent material comprising one or more of the following: (i) a zeolite with a framework structure selected from the group consisting of CHA, FAU, RHO, and a combination thereof, having: (a) a Si/Al ratio of about 1 to about 20; and (b) a potassium cation concentration of about 0% to about 40%; or (ii) a zeolite with a LTA framework structure having: (a) a Si/Al ratio of about 1 to about 20; and/or (b) a potassium cation concentration of about 5% to about 40%, for use in a TSA process for separating $CO_2$ from a feed gas mixture is provided.

Nonlimiting examples of suitable zeolites for use in the TSA described herein are those which are provided below in Table 10.

TABLE 10

| Zeolites |
| --- |
| IRY_2_0 |
| IRR_2_0 |
| FAU_1_0 |
| EMT_1_0 |
| ITT_2_0 |
| RHO_5_0 |
| KFI_3_0 |
| RWY_3_17 |
| PAU_5_33 |
| TSC_1_0 |
| CHA_1_0 |
| UFI_2_0 |
| LTA_1_0 |
| AFX_3_0 |
| AFT_3_0 |
| SFF_2_0 |
| STF_5_0 |
| MWW_3_0 |
| VFI_2_0 |
| CAS_2_0 |

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), temperature swing adsorption (TSA), and vacuum swing adsorption (VSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed 1 Mar. 2011, as well as the U.S. patent application Ser. No. 13/406,079, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(e) using exhaust or recycle streams to minimize processing and hydrocarbon losses, such as using exhaust streams from one or more RC-TSA units as fuel gas instead of re-injecting or venting;

(f) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(g) using feed compression before one or more RC-TSA units to achieve a desired product purity;

(h) contemporaneous removal of non-acid gas contaminants such as mercaptans, COS, and BTEX; selection processes and materials to accomplish the same;

(i) using structured adsorbents for gas-solid contactors to minimize pressure drop compared to conventional packed beds;

(j) selecting a cycle time and cycle steps based on adsorbent material kinetics; and (k) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

FURTHER EMBODIMENTS

The invention can additionally or alternatively include one or more of the following embodiments.

Embodiment 1

A pressure swing adsorption process for separating $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite having a Si/Al ratio above about 100 and a framework structure selected from the group consisting of AFT, AFX, DAC, EMT, EUO, IMF, ITH, ITT, KFI, LAU, MFS, MRE, MTT, MWW, NES, PAU, RRO, SFF, STF, STI, SZR, TER, TON, TSC, TUN, VFI, and a combination thereof; or (ii) a zeolite with a framework structure selected from the group consisting of CAS, EMT, FAU, HEU, IRR, IRY, ITT, LTA, RWY, TSC and VFI, and a combination thereof, having: (a) a Si/Al ratio of about 5 to about 85 or about 5 to about 70; and/or (b) a potassium cation concentration of about 5% to about 100% or about 10% to about 100%; wherein the adsorbent bed is operated at a first pressure (e.g., such that the partial pressure of $CO_2$ is from about 3 bar to about 25 bar, about 3 bar to about 10 bar, about 15 bar to about 25 bar) and at a first temperature (e.g., about −20° C. to about 80° C., about 0° C. to about 50° C.) wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) reducing the pressure in the adsorption bed to a second pressure (e.g., such that the partial pressure of $CO_2$ is from about 0.5 bar to about 2 bar) resulting in desorption of at least a portion of $CO_2$ from the adsorbent bed; and d) recovering at least a portion of $CO_2$ from the adsorbent bed.

Embodiment 2

The process of embodiment 1, wherein the adsorbent material comprises one or more of the following: (i) a zeolite having a Si/Al ratio above about 100 and a framework structure selected from the group consisting of AFT, AFX, KFI, PAU, TSC, and a combination thereof; or (ii) a zeolite with a framework structure selected from the group consisting of LTA, TSC, and a combination thereof, having: (a) a Si/Al ratio of about 40 to about 60; and/or (b) a potassium cation concentration of about 50% to about 90%.

Embodiment 3

A pressure swing adsorption process for separating $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises a zeolite having a Si/Al ratio of between about 5 and about 45 and with a framework structure selected from the group consisting of CHA, FAU, FER, LTA, MFI, RHO, UFI, and a combination thereof; wherein the adsorbent bed is operated at a first pressure (e.g., such that the partial pressure of $CO_2$ is from about 3 bar to about 25 bar, about 3 bar to about 10 bar, about 15 bar to about 25 bar) and at a first temperature (e.g., about −20° C. to about 80° C., about 0° C. to about 50° C.) wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) reducing the pressure in the adsorption bed to a second pressure (e.g., such that the partial pressure of $CO_2$ is from about 0.5 bar to about 2 bar) resulting in desorption of at least a portion of $CO_2$ from the adsorbent bed; and d) recovering at least a portion of $CO_2$ from the adsorbent bed.

Embodiment 4

The process of any one of the previous embodiments, wherein the adsorbent material has a working capacity of about 2.0 mmol/cc to about 15.0 mmol/cc.

Embodiment 5

A pressure temperature swing adsorption process for separating a $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite having a Si/Al ratio above about 100 and a framework structure selected from the group consisting of AFT, AFX, CAS, DAC, HEU, IMF, ITH, KFI, LAU, MFS, MTT, PAU, RRO, SFF, STF, SXR, TER, TON, TUN, and a combination thereof; or (ii) a zeolite with a framework structure selected from the group consisting of AFT, AFX, CHA, EMT, EUO, FAU, IRR, IRY, ITT, KFI, LTA, MRE, MWW, NES, PAU, RHO, RWY, SFF, STI, TSC, UFI, VFI, and a combination thereof, having: (a) a Si/Al ratio of about 3 to about 100 or about 3 to about 75; and (b) a potassium cation concentration of about 1% to about 100%; wherein the adsorbent bed is operated at a first pressure (e.g., such that the partial pressure of $CO_2$ is from about 3 bar to about 25 bar, about 3 bar to about 10 bar, about 15 bar to about 25 bar) and at a first temperature (e.g., about −20° C. to about 80° C., from about 0° C. to about 50° C.) wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) heating the adsorbent bed to a second temperature (e.g., about 50° C. to about 150° C.) higher than the first temperature, resulting in desorption of at least a portion of $CO_2$ from the adsorbent bed and recovering at least a first portion of $CO_2$; and d) reducing the pressure of the adsorbent bed to a second pressure (e.g., such that the partial pressure of $CO_2$ is from about 0.5 bar to about 2 bar) lower than the first pressure and recovering a second portion of $CO_2$.

Embodiment 6

The process of embodiment 5, wherein the adsorbent material comprises one or more of the following: (i) a zeolite having a Si/Al ratio above about 100 and a framework structure selected from the group consisting of AFT, AFX, KFI, PAU, TSC, and a combination thereof; or (ii) a zeolite with a framework structure selected from the group consisting of AFT, AFX, CHA, KFI, LTA, PAU, RHO, TSC, UFI and a combination thereof, having: (a) a Si/Al ratio of about 5 to about 60; and/or (b) a potassium cation concentration of about 1% to about 100%.

Embodiment 7

The process of embodiment 5 or 6, wherein the adsorbent material has a working capacity of about 3.0 mmol/cc to about 17.0 mmol/cc.

Embodiment 8

A vacuum swing adsorption process for separating $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following; (i) a zeolite having a Si/Al ratio above about 100 and a framework structure selected from the group consisting of CAS, DAC, HEU, LAU, MTT, RRO, TON, and a combination thereof; or (ii) a zeolite with a framework structure selected from the group consisting of AFT, AFX, EMT, EUO, IMF, IRR, IRY, ITH, ITT, KFI, MFS, MRE, MWW, NES, PAU, RWY, SFF, STF, STI, SZR, TER, TSC, TUN, VFI, and a combination thereof, having: (a) a Si/Al ratio of about 1 to about 100 or about 1 to about 75; and (b) a potassium cation concentration of about 0% to about 100%; wherein the adsorbent bed is operated at a first pressure (e.g., such that the partial pressure of $CO_2$ is from about 0.5 bar to about 3 bar) and at a first temperature (e.g., about −20° C. to about 80° C.), wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) passing a purge gas, substantially free of $CO_2$, through the adsorbent bed thereby resulting in a reduction in the pressure in the adsorption bed to a second pressure (e.g., such that the partial pressure of $CO_2$ is from about 0.05 bar to about 0.5 bar) and in desorption of at least a portion of $CO_2$ from the adsorbent bed; and d) recovering at least a portion of $CO_2$ from the adsorbent bed.

Embodiment 9

The process of embodiment 8, wherein the adsorbent material comprises a zeolite with a framework structure selected from the group consisting of AFX, AFT, KFI, PAU, TSC, and a combination thereof, having: (a) a Si/Al ratio of about 3 to about 60; and (b) a potassium cation concentration of about 0% to about 100%.

Embodiment 10

A vacuum swing adsorption process for separating $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises a zeolite with a framework structure selected from the group consisting of CHA, FAU, FER, LTA, MFI, RHO, UFI and a combination thereof, having (a) a Si/Al ratio of about 3 to about 30; and/or (b) a potassium cation concentration of about 40% to about 100%; wherein the adsorbent bed is operated at first pressure (e.g., such that the partial pressure of $CO_2$ is from about 0.5 bar to about 3 bar) and at a first temperature (e.g., about −20° C. to about 80° C.), wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) passing a purge gas, substantially free of $CO_2$, through the adsorbent bed thereby resulting in a reduction in the pressure in the adsorption bed to a second pressure (e.g., such that the partial pressure of $CO_2$ is from about 0.05 bar to about 0.5 bar) and in desorption of at least a portion of $CO_2$ from the adsorbent bed; and d) recovering at least a portion of $CO_2$ from the adsorbent bed.

Embodiment 11

The process of any one of embodiments 8-10, wherein the adsorbent material has a working capacity of about 3.0 mmol/cc to about 10.0 mmol/cc.

Embodiment 12

A vacuum temperature swing adsorption process for separating a $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite having a Si/Al ratio above about 100 with a CAS framework structure; or (ii) a zeolite with a framework structure selected from the group consisting of AFT, AFX, CAS, DAC, EMT, EUO, HEU, IRR, IRY, ITH, ITT, KFI, LAU, MFS, MRE, MTT, MWW, NES, PAU, RRO, RWY, SFF, STF, STI, SZR, TER, TON, TSC, TUN, VFI, and a combination thereof, having: (a) a Si/Al ratio of about 1 to about 100 or about 1 to about 75; and/or (b) a potassium cation concentration of about 0% to about 100% or about 0% to about 90%; wherein the adsorbent bed is operated at a first pressure (e.g., such that the partial pressure of $CO_2$ is from about 0.5 bar to about 7 bar) and at a first temperature (e.g., about −20° C. to about 80° C., about 0° C. to about 50° C.) wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; and c) simultaneously heating the adsorbent bed to a second temperature (e.g., about 50° C. to about 250° C., about 75° C. to about 125° C., about 175° C. to about 225° C.) higher than the first temperature and passing a purge gas, substantially free of $CO_2$, through the adsorbent bed thereby resulting in a reduction in the pressure in the adsorption bed to a second pressure (e.g., such that the partial pressure of $CO_2$ is from about 0.05 bar to about 0.5 bar, about 0.08 bar to about 0.3 bar, about 0.09 bar to about 0.4 bar), resulting in desorption of at least a portion of $CO_2$ from the adsorbent bed and recovering at least a portion of $CO_2$.

Embodiment 13

The process of embodiment 12, wherein the adsorbent material comprises a zeolite with a framework structure selected from the group consisting of AFX, AFT, KFI, PAU, TSC, and a combination thereof, having: (a) a Si/Al ratio of about 1 to about 20; and/or (b) a potassium cation concentration of about 0% to about 40%.

Embodiment 14

A vacuum temperature swing adsorption process for separating a $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite with a framework structure selected from the group consisting of CHA, FAU, FER, MFI, RHO, UFI and a combination thereof, having: (a) a Si/Al ratio of about 1 to about 20; and/or (b) a potassium cation concentration of about 0% to about 40%; or (ii) a zeolite with a LTA framework structure having: (a) a Si/Al ratio of about 1 to about 20; and/or (b) a potassium cation concentration of about 5% to about 40%; wherein the adsorbent bed is operated at a first pressure (e.g., such that the partial pressure of $CO_2$ is from about 0.5 bar to about 7 bar) and at a first temperature (e.g., about −20° C. to about 80° C., about 0° C. to about 50° C.) wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; and c) simultaneously heating the adsorbent bed to a second temperature (e.g., about 50° C. to about 250° C., about 75° C. to about 125° C., about 175° C. to about 225° C.) higher than the first temperature and passing a purge gas, substantially free of $CO_2$, through the adsorbent bed thereby resulting in a reduction in the pressure in the adsorption bed to a second pressure (e.g., such that the partial pressure of $CO_2$ is from about 0.05 bar to about 0.5 bar, about 0.08 bar to about 0.3 bar, about 0.09 bar to about 0.4 bar), resulting in desorption of at least a portion of $CO_2$ from the adsorbent bed and recovering at least a portion of $CO_2$.

Embodiment 15

The process of any one of embodiments 12-14, wherein the adsorbent material has a working capacity of about 3.0 mmol/cc to about 14.0 mmol/cc.

Embodiment 16

A temperature swing adsorption process for separating $CO_2$ from a feed gas mixture (e.g., natural gas stream), wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises a zeolite with a framework structure selected from the group consisting of AFT AFX, CAS, EMT, IRR, IRY, ITT, KFI, MWW, PAU, RWY, SFF, STF, TSC, UFI, VFI, and a combination thereof, having: (a) a Si/Al ratio of about 1 to about 20 or about 1 to about 10; and/or (b) a potassium cation concentration of about 0% to about 50% or about 0% to about 40%; wherein the adsorbent bed is operated at a first pressure (e.g., such that the partial pressure of $CO_2$ is from about 0.5 bar to about 3 bar, about 0.5 bar to about 3 bar) and at a first temperature (e.g., about −20° C. to about 80° C., about 0° C. to about 50° C.) wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) heating the adsorbent bed to a second temperature (e.g., about 150° C. to about 250° C.) higher than the first temperature, resulting in desorption of at least a portion of $CO_2$ from the adsorbent bed and recovering at least a portion of $CO_2$ from the adsorbent bed.

Embodiment 17

The process of embodiment 16, wherein the adsorbent material comprises a zeolite with a framework structure selected from the group consisting of AFX, AFT, KFI, PAU, TSC, UFI, and a combination thereof, having: (a) a Si/Al ratio of about 1 to about 10; and/or (b) a potassium cation concentration of about 0% to about 40%.

Embodiment 18

A temperature swing adsorption process for separating $CO_2$ from a feed gas mixture, wherein the process comprises: a) subjecting the feed gas mixture comprising $CO_2$ to an adsorption step by introducing the feed gas mixture into a feed input end of an adsorbent bed, wherein the adsorbent bed comprises: a feed input end and a product output end; and an adsorbent material selective for adsorbing $CO_2$, wherein the adsorbent material comprises one or more of the following: (i) a zeolite with a framework structure selected from the group consisting of CHA, FAU, RHO, and a combination thereof, having: (a) a Si/Al ratio of about 1 to about 20; and/or (b) a potassium cation concentration of about 0% to about 40%; or (ii) a zeolite with a LTA framework structure having: (a) a Si/Al ratio of about 1 to about 20; and/or (b) a potassium cation concentration of about 5% to about 40%; the adsorbent bed is operated at a first pressure and at a first temperature wherein at least a portion of the $CO_2$ in the feed gas mixture is adsorbed by the adsorbent bed and wherein a gaseous product depleted in $CO_2$ exits the product output end of the adsorbent bed; b) stopping the introduction of the feed gas mixture to the adsorbent bed before breakthrough of $CO_2$ from the product output end of the adsorbent bed; c) heating adsorbent bed to a second temperature higher than the first temperature, resulting in desorption of at least a portion of $CO_2$ from the adsorbent bed and recovering at least a portion of $CO_2$ from the adsorbent bed.

Embodiment 19

The process of embodiments 16-18, wherein the adsorbent material has a working capacity of about 5.0 mmol/cc to about 12.0 mmol/cc.

Embodiment 20

The process of any one of the previous embodiments, wherein the adsorbent bed has open flow channels throughout its entire length through which the feed gas mixture is passed, e.g., a parallel channel contactor.

EXAMPLES

The following examples are merely illustrative, and do not limit this disclosure in any way.

Example 1—Gas Adsorption Simulation Studies

General Simulation Method

Roughly 220 zeolite topologies have been identified experimentally and are recognized by the International Zeolite Association (IZA) (Baerlocher, C.; McCusker, L. B., *Database of Zeolite Structures*. http://www.iza-structure-.org/databases/, accessed on Apr. 14, 2015). In addition, large collections of hypothetical zeolite-like materials have been generated (Deem, M. W.; Pophale, R.; Cheeseman, P. A.; Earl, D. J. *J Phys Chem C* 2009, 113, 21353; Pophale, R.; Cheeseman, P. A.; Deem, M. W. *Phys Chem Phys* 2011, 13, 12407). An important simplification can be made by noting that only a fraction of the known experimental topologies (and none of the hypothetical materials) have known synthesis routes for aluminosilicate or siliceous materials. Most of the materials selected for calculations can be tested experimentally. First ten-membered ring (10MR) zeolites were considered. This choice avoids complications associated with the pore blocking and/or strongly hindered diffusion that can occur in K-containing zeolites with smaller pores. In the IZA database there are a total of 21 10MR topologies where aluminosilicate or silica analogues have been synthesized experimentally: DAC, EUO, FER, HEU, IMF, ITH, LAU, MFI, MFS, MRE, MTT, MWW, NES, RRO, SFF, STF, STI, SZR, TER, TON, TUN. In addition simulations were performed for 16 other topologies from the IZA database with large pore volumes (or void fraction), including three 18MR (IRR, VFI, ITT), one 16MR (IRY), three 12MR (FAU, EMT, RWY), and nine 8MR (LTA, TSC, AFT, AFX, CHA, KFI, PAU, RHO, UFI) zeolites. IRR, VFI, ITT, IRY, RWY, and AFT topologies were included because of their large pore volumes, although their siliceous or aluminosilicate analogues have not been synthesized experimentally to date.

For each topology, full optimizations of the siliceous structure were performed using the Hill-Sauer force field (Hill, J. R.; Sauer, J. *J Phys Chem* 1995, 99, 9536). Using these optimized frameworks, aluminosilicate structures were constructed with Si/Al ratios of 1, 2, 3, 5, 10, 25, and 50. Si atoms were randomly substituted by Al atoms obeying the Löwenstein's rule (Loewenstein, W. Am Mineral 1954, 39, 92). For the topologies that include odd numbered window sizes (e.g., 3, 5, and 7MR windows), it was therefore impossible to make structures with Si/Al=1, because Si and Al atoms cannot appear alternatively in these windows. For these topologies, the lowest Si/Al ratio used was 2 or 3. For each Si/Al ratio, K and/or Na extra-framework cations were introduced with the K/(K+Na) ratio chosen to be 0, 16.7, 33.4, 50, 66.7, 83.3, and 100%. For 10MR zeolites, this procedure generated 910 distinct materials.

The notation ZEO_A_B is used to represent cationic zeolites, where ZEO indicates the topology, A the Si/Al ratio, and B the percentage of potassium cations. Siliceous zeolites are denoted ZEO_Si. For instance, MFI_10_50 represents a zeolite material having the MFI topology, a Si/Al ratio of 10, and 50% K cations, while MFI_Si represents the siliceous MFI zeolite.

To get reliable cation distributions for each material, pre-equilibration simulations were performed prior to the adsorption of $CO_2$. In every material, Al atoms were randomly distributed subject to the Löwenstein rule (Loewenstein, W. Am Mineral 1954, 39, 92). Parallel tempering (also known as canonical replica-exchange Monte Carlo) was used in these simulations (Beauvais, C.; Guerrault, X.; Coudert, F. X.; Boutin, A.; Fuchs, A. H. *J Phys Chem B* 2004, 108, 399; Earl, D. J.; Deem, M. W. Phys Chem 2005, 7, 3910). For each cationic material, nine replicas were included in simulations at temperatures of 300, 390, 507, 659, 857, 1114, 1448, 1882, 2447 K, respectively. Adjacent temperatures are in a ratio of 1.3 for each temperature interval, as suggested in previous work (Beauvais, C.; Guerrault, X.; Coudert, F. X.; Boutin, A.; Fuchs, A. H. *J Phys Chem B* 2004, 108, 399). The lowest temperature was room temperature, and the highest temperature was high enough so as to ensure that no replicas become trapped in local energy minima. Reasonable degree of overlap between the potential energy distributions of neighboring state points was found.

Classical simulations were performed using the RASPA code developed by Dubbeldam and co-workers (Dubbeldam, D.; Calero, S.; Ellis, D. E.; Snurr, R. Q. Mol Simul 2015, 1; Dubbeldam, D.; Torres-Knoop, A.; Walton, K. S. Mol Simul 2013, 39, 1253), where the first-principles developed force fields as described above were used for calculating the interactions between $CO_2$ and zeolite as well as the interactions between cation and framework. Periodic boundary conditions were employed, vdW interactions were evaluated with the cutoff of 12 Å, and electrostatic energies were calculated using Ewald summation (Allen, M. P.; Tildesley, D. J. Computer Simulation of Liquids; Clarendon Press: Oxford, U. K., 1987; Frenkel, D.; Smit, B. Understanding Molecular Simulation: From Algorithms to Applications 2nd ed.; Academic Press: San Diego, Calif., 2002). Truncated potentials with tail corrections were used. During the simulations all framework atoms were fixed at their crystallographic positions while cations were allow to move.

Adsorption isotherms of $CO_2$ in zeolites were predicted computationally using standard Grand Canonical Monte Carlo (GCMC) methods, where volume (V), temperature (T), and chemical potential ($\mu$) are held constant and the number of adsorbate molecules fluctuates. The chemical potential is determined from the fugacity, and the fugacity coefficients are computed using the Peng-Robinson equation of state (Robinson, D. B.; Peng, D. Y.; Chung, S. Y. K. Fluid Phase Equilibr 1985, 24, 25). Isosteric heats of adsorption, Qst, defined as the difference in the partial molar enthalpy of the adsorption between the gas phase and the adsorbed phase, were obtained during GCMC simulations using (Snurr, R. Q.; Bell, A. T.; Theodorou, D. N. *J Phys Chem* 1993, 97, 13742)

$$Q_{st} = RT - \frac{\langle NV \rangle - \langle N \rangle \langle V \rangle}{\langle N^2 \rangle - \langle N \rangle^2}$$

where T is the temperature, R is the gas constant, < > denotes the ensemble average, N is the number of adsorbed molecules, and V is the sum of the interactions of all adsorbed molecules among themselves and with the zeolite. Isosteric heats of adsorption at the limit of zero loading, $Q_{st}^0$, were calculated using NVT ensemble, where N=1 (Burtch, N. C.; Jasuja, H.; Dubbeldam, D.; Walton, K. S. *J Am Chem Soc* 2013, 135, 7172).

The number of simulation cycles were tested to ensure that the predicted values of these adsorption properties were well converged (with deviation less than 5%). For cation pre-equilibration 100,000 cycles were used, while for $CO_2$ adsorption 25,000 cycles were used to guarantee equilibration and the following 25,000 cycles were used to sample the desired thermodynamics properties.

Some topologies, for example, FAU and LTA, include regions such as sodalite cages that are inaccessible for $CO_2$ molecules. These regions were blocked in simulations to avoid spurious adsorption of $CO_2$ in these regions.

For the structures with low Si/Al ratios, the blockage effect from K+ cations locating at 8MR windows may exist, and GCMC simulations cannot account it. So that was kept it in mind when these structures were chosen for $CO_2$ capture.

Void fractions of zeolite structures were computed from Widom particle insertion using Helium. The pore volume is the void fraction times the unit cell volume. Surface areas were computed using $N_2$ as the probe molecule. For the calculations of pore volumes and surface areas, the Clay Force Field (CLAYFF) was used for the atoms of the zeolite, force field parameters from the previous work were used for He—He interactions (Talu, O.; Myers, A. L. *Colloid Surface A* 2001, 187, 83), and the TraPPE was used for $N_2$-$N_2$ interactions (Potoff, J. J.; Siepmann, J. I. *Aiche J* 2001, 47, 1676). Lorentz-Berthelot mixing rules was applied for the cross species interactions (Cygan, R. T.; Liang, J.-J.; Kalinichev, A. G. *J Phys Chem B* 2004, 108, 1255).

Pore sizes including the largest cavity diameter (LCD) and the pore limiting diameter (PLD) were computed using Zeo++ (Willems, T. F.; Rycroft, C.; Kazi, M.; Meza, J. C.;

Haranczyk, M. Micropor Mesopor Mat 2012, 149, 134), where the radii of O, Si, and Al atoms in zeolite structures were adjusted to be 1.35 Å and the default CCDC radii were used for Na and K (2.27 and 2.75 Å, respectively).

In all simulations, framework atoms were fixed and extra-framework cations were allowed to move. Cation positions were determined using parallel tempering method prior to $CO_2$ adsorption. GCMC simulations were performed to predict the adsorbed amount of $CO_2$ and isosteric heat of adsorption at each condition in Table 1, while single-molecule NVT Monte Carlo simulations were used to compute the isosteric heat of adsorption at zero loading (Qst0) (Burtch, N. C.; Jasuja, H.; Dubbeldam, D.; Walton, K. S. J Am Chem Soc 2013, 135, 7172). Geometrical properties of the empty zeolite structures were calculated, including pore size in terms of pore limiting diameter (PLD), largest cavity diameter (LPD), accessible pore volume, and surface area.

To illustrate the approach, FIG. 1a-1d shows the results for MWW zeolites topology. This figure shows that for each process the $CO_2$ working capacity varies with Si/Al ratio and cation composition, with the Si/Al ratio having a stronger influence on the working capacity.

For PSA the siliceous form of MMW has higher working capacity than the cationic analogues with high Si/Al ratios, which are in turn better than those with medium and low Si/Al ratios. Even though the adsorbed amounts of $CO_2$ in the cationic forms of MWW were larger than in the siliceous form at the adsorption condition, the cationic structures have lower working capacities due to the larger residual amounts of $CO_2$ at the desorption condition. The stronger $CO_2$ interactions created by the presence of extra-framework cations resulted in a trade-off between high total adsorption capacities and reduced working capacities.

In VSA (FIG. 1b), however, the cationic forms of MWW with Si/Al ratio around 25 perform better than those with lower and higher Si/Al ratios, including the siliceous analog of MWW. In PTSA and VTSA, the optimal Si/Al ratios lie at 50 and 10. The optimal MWW structures are determined to be MWW_Si, MWW_25_100, MWW_50_100, and MWW_10_17 for PSA, VSA, PTSA, and VTSA, respectively. The results in FIG. 1 represent a detailed, quantitative description of $CO_2$ adsorption in a wide range of MWW zeolites that would require enormously time-consuming synthesis and testing to establish experimentally. This kind of data, which we have calculated for all of the zeolite topologies listed above, greatly extends the number of zeolites for which thorough information is available regarding $CO_2$ adsorption. Using our results, we determined the optimal composition for each zeolite topology in each process, as characterized by $CO_2$ working capacity. Simulations were performed for process conditions listed in Table 4.

Example 1A—PSA1

Conditions:

Adsorption: 300K, 5 bar

Desorption: 300 K, 1 bar

| | Optimal boundaries | |
|---|---|---|
| Topology | Si/Al ratio | K/(K + Na)% |
| RWY | 3-10 | 0-100 |
| IRY | 3-25 | 0-100 |
| FAU | 25-inf | 0-100 |
| TSC | 25-inf | 0-100 |
| IRR | 3-25 | 0-100 |
| EMT | 25-inf | 0-100 |
| RHO | 25-inf | 0-100 |
| UFI | 25-inf | 0-100 |
| CHA | 25-inf | 0-100 |
| AFT | 25-inf | 0-100 |
| LTA | 25-inf | 0-100 |
| AFX | 25-inf | 0-100 |
| ITT | 3-25 | 0-100 |
| KFI | 25-inf | 0-100 |
| VFI | 3-25 | 0-100 |

The results are shown in Table 11

TABLE 11

PSA1 Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m3 | $Q_{st}^{ave}$ kJ/mol |
|---|---|---|---|---|---|---|---|---|---|---|---|
| RWY_5_100 | 6.49 | 10.90 | 4.41 | 26 | 27 | 38 | 12.69 | 6.45 | 0.67 | 867.28 | 27 |
| IRY_10_100 | 4.98 | 8.42 | 3.44 | 26 | 25 | 44 | 10.55 | 6.71 | 0.58 | 1180.48 | 25 |
| FAU_50_67 | 4.40 | 6.32 | 1.92 | 26 | 24 | 35 | 10.89 | 6.94 | 0.44 | 1292.53 | 25 |
| TSC_50_83 | 4.36 | 6.68 | 2.32 | 26 | 27 | 38 | 15.19 | 3.89 | 0.46 | 1297.36 | 26 |
| IRR_10_100 | 4.25 | 7.35 | 3.10 | 25 | 26 | 33 | 11.49 | 8.07 | 0.54 | 1173.74 | 25 |
| EMT_50_100 | 4.12 | 6.08 | 1.96 | 26 | 24 | 36 | 11.30 | 6.94 | 0.44 | 1294.05 | 25 |
| RHO_Si | 4.02 | 7.01 | 2.99 | 27 | 26 | 29 | 10.62 | 3.82 | 0.46 | 1386.76 | 27 |
| UFI_Si | 4.01 | 6.85 | 2.84 | 30 | 26 | 28 | 10.33 | 3.41 | 0.44 | 1444.84 | 28 |
| CHA_Si | 3.86 | 6.60 | 2.74 | 30 | 26 | 22 | 7.23 | 3.82 | 0.42 | 1465.94 | 28 |
| AFT_Si | 3.77 | 6.78 | 3.02 | 30 | 27 | 28 | 7.59 | 3.67 | 0.42 | 1469.05 | 28 |
| LTA_50_67 | 3.75 | 5.53 | 1.78 | 26 | 25 | 44 | 10.95 | 3.72 | 0.40 | 1362.60 | 26 |
| AFX_Si | 3.72 | 6.96 | 3.24 | 30 | 27 | 29 | 7.56 | 3.66 | 0.42 | 1468.58 | 28 |
| ITT_10_100 | 3.60 | 7.07 | 3.47 | 25 | 27 | 38 | 11.58 | 8.02 | 0.49 | 1286.64 | 26 |
| KFI_Si | 3.58 | 7.47 | 3.89 | 31 | 31 | 29 | 10.74 | 4.06 | 0.42 | 1458.36 | 31 |
| VFI_10_100 | 3.46 | 5.38 | 1.92 | 25 | 25 | 34 | 10.38 | 7.62 | 0.39 | 1457.56 | 25 |
| SFF_Si | 3.14 | 5.33 | 2.20 | 29 | 25 | 21 | 7.62 | 5.49 | 0.37 | 1605.67 | 27 |
| STF_Si | 3.13 | 6.02 | 2.89 | 33 | 27 | 22 | 7.67 | 5.52 | 0.38 | 1603.81 | 30 |
| PAU_Si | 3.00 | 7.20 | 4.20 | 32 | 31 | 30 | 10.55 | 3.82 | 0.38 | 1535.92 | 32 |
| MWW_Si | 2.91 | 4.72 | 1.81 | 25 | 23 | 22 | 9.76 | 4.94 | 0.40 | 1538.37 | 24 |
| ITH_Si | 2.50 | 4.64 | 2.14 | 28 | 26 | 23 | 6.74 | 4.74 | 0.32 | 1635.73 | 27 |
| NES_Si | 2.39 | 4.27 | 1.88 | 28 | 24 | 21 | 7.05 | 4.85 | 0.34 | 1600.43 | 26 |
| TUN_Si | 2.32 | 4.61 | 2.29 | 28 | 25 | 23 | 8.72 | 5.51 | 0.34 | 1628.85 | 26 |

TABLE 11-continued

PSA1 Results

| Zeolite | $\Delta N$ mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m3 | $Q_{st}^{ave}$ kJ/mol |
|---|---|---|---|---|---|---|---|---|---|---|---|
| TER_Si | 2.24 | 4.75 | 2.51 | 28 | 26 | 23 | 6.98 | 5.17 | 0.34 | 1649.03 | 27 |
| FER_Si | 2.23 | 4.56 | 2.33 | 30 | 27 | 24 | 6.33 | 4.66 | 0.30 | 1704.70 | 29 |
| MFS_Si | 2.19 | 4.41 | 2.22 | 30 | 27 | 24 | 6.82 | 5.47 | 0.30 | 1685.27 | 28 |
| IMF_Si | 2.09 | 4.27 | 2.18 | 28 | 25 | 22 | 7.44 | 5.44 | 0.33 | 1648.76 | 26 |
| STI_Si | 2.08 | 4.37 | 2.29 | 28 | 25 | 23 | 6.04 | 5.01 | 0.35 | 1607.43 | 27 |
| SZR_Si | 1.95 | 4.19 | 2.24 | 31 | 28 | 20 | 6.26 | 4.62 | 0.28 | 1696.17 | 30 |
| MFI_Si | 1.92 | 4.36 | 2.44 | 28 | 26 | 24 | 6.85 | 5.55 | 0.32 | 1654.46 | 27 |
| EUO_Si | 1.88 | 3.73 | 1.85 | 28 | 25 | 23 | 7.10 | 4.88 | 0.32 | 1638.00 | 26 |
| DAC_Si | 1.81 | 6.53 | 4.72 | 34 | 32 | 33 | 5.34 | 3.85 | 0.31 | 1686.90 | 33 |
| LAU_Si | 1.81 | 4.43 | 2.62 | 30 | 28 | 24 | 6.04 | 4.10 | 0.30 | 1689.47 | 29 |
| RRO_Si | 1.59 | 5.83 | 4.24 | 34 | 33 | 29 | 4.67 | 4.19 | 0.29 | 1688.62 | 34 |
| TON_Si | 1.48 | 3.86 | 2.38 | 32 | 29 | 25 | 5.77 | 5.19 | 0.23 | 1759.92 | 31 |
| MTT_Si | 1.42 | 3.38 | 1.96 | 31 | 28 | 25 | 6.30 | 5.19 | 0.23 | 1760.11 | 29 |
| CAS_50_17 | 1.33 | 4.45 | 3.12 | 35 | 35 | 35 | 4.97 | 2.93 | 0.16 | 1846.57 | 35 |
| HEU_50_100 | 1.21 | 5.26 | 4.05 | 32 | 31 | 38 | 5.83 | 4.17 | 0.32 | 1666.11 | 32 |
| MRE_Si | 1.02 | 1.86 | 0.85 | 24 | 22 | 20 | 6.66 | 5.74 | 0.20 | 1779.94 | 23 |

Example 1B—PSA2

Conditions:
Adsorption: 300K, 20 bar
Desorption: 300 K, 1 bar

| Optimal boundaries | | |
|---|---|---|
| Topology | Si/Al ratio | K/(K + Na)% |
| RWY | 3-25 | 0-100 |
| IRY | 25-inf | 0-100 |
| IRR | 25-inf | 0-100 |
| TSC | 25-inf | 0-100 |
| ITT | 25-inf | 0-100 |
| FAU | 25-inf | 0-100 |
| EMT | 25-inf | 0-100 |
| LTA | 25-inf | 0-100 |
| RHO | 25-inf | 0-100 |
| VFI | 25-inf | 0-100 |
| UFI | 25-inf | 0-100 |
| CHA | 25-inf | 0-100 |
| AFT | 25-inf | 0-100 |
| AFX | 25-inf | 0-100 |
| KFI | 25-inf | 0-100 |

The results are shown in Table 12

TABLE 12

PSA2 Results

| Zeolite | $\Delta N$ mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| RWY_10_100 | 11.43 | 13.90 | 2.47 | 28 | 24 | 29 | 13.06 | 6.45 | 0.69 | 828.60 | 26 |
| IRY_50_100 | 9.74 | 10.58 | 0.84 | 26 | 19 | 25 | 11.28 | 9.31 | 0.61 | 1129.92 | 23 |
| IRR_50_100 | 8.92 | 9.90 | 0.98 | 25 | 20 | 24 | 14.84 | 9.21 | 0.57 | 1123.25 | 23 |
| TSC_Si | 7.96 | 9.46 | 1.49 | 29 | 26 | 28 | 16.07 | 3.89 | 0.47 | 1281.40 | 27 |
| ITT_Si | 7.64 | 8.58 | 0.94 | 24 | 20 | 21 | 13.84 | 12.34 | 0.53 | 1217.09 | 22 |
| FAU_Si | 7.31 | 8.39 | 1.09 | 29 | 20 | 18 | 10.89 | 6.94 | 0.45 | 1277.51 | 25 |
| EMT_Si | 7.17 | 8.26 | 1.09 | 29 | 20 | 19 | 11.30 | 6.95 | 0.45 | 1277.26 | 25 |
| LTA_Si | 6.70 | 7.55 | 0.86 | 29 | 21 | 19 | 10.95 | 3.72 | 0.42 | 1346.77 | 25 |
| RHO_Si | 6.50 | 9.49 | 2.99 | 30 | 26 | 29 | 10.62 | 3.82 | 0.46 | 1386.76 | 28 |
| VFI_Si | 6.25 | 6.55 | 0.30 | 24 | 15 | 13 | 12.29 | 11.61 | 0.42 | 1379.02 | 19 |
| UFI_Si | 5.97 | 8.80 | 2.84 | 31 | 26 | 28 | 10.33 | 3.41 | 0.44 | 1444.84 | 29 |
| CHA_Si | 5.89 | 8.63 | 2.74 | 31 | 26 | 22 | 7.23 | 3.82 | 0.42 | 1465.94 | 28 |
| AFT_Si | 5.79 | 8.80 | 3.02 | 31 | 27 | 28 | 7.59 | 3.67 | 0.42 | 1469.05 | 29 |
| AFX_Si | 5.56 | 8.80 | 3.24 | 32 | 27 | 29 | 7.56 | 3.66 | 0.42 | 1468.58 | 30 |
| KFI_Si | 5.28 | 9.17 | 3.89 | 30 | 31 | 29 | 10.74 | 4.06 | 0.42 | 1458.36 | 30 |
| MWW_Si | 4.95 | 6.76 | 1.81 | 28 | 23 | 22 | 9.76 | 4.94 | 0.40 | 1538.37 | 25 |
| PAU_Si | 4.66 | 8.86 | 4.20 | 31 | 31 | 30 | 10.55 | 3.82 | 0.38 | 1535.92 | 31 |
| SFF_Si | 4.60 | 6.80 | 2.20 | 30 | 25 | 21 | 7.62 | 5.49 | 0.37 | 1605.67 | 27 |
| STF_Si | 4.56 | 7.45 | 2.89 | 34 | 27 | 22 | 7.67 | 5.52 | 0.38 | 1603.81 | 31 |
| CAS_25_83 | 1.88 | 4.20 | 2.32 | 33 | 34 | 39 | 4.97 | 2.93 | 0.15 | 1873.34 | 34 |

Example 1C—PTSA1

Conditions:
Adsorption: 300K, 5 bar
Desorption: 373 K, 1 bar

| | Optimal boundaries | |
|---|---|---|
| Topology | Si/Al ratio | K/(K + Na)% |
| RWY | 3-10 | 0-100 |
| IRY | 2-10 | 0-100 |
| IRR | 2-25 | 0-100 |
| FAU | 2-25 | 0-100 |
| KFI | 10-inf | 0-100 |
| RHO | 10-inf | 0-100 |
| TSC | 3-25 | 0-100 |
| UFI | 10-inf | 0-100 |
| EMT | 2-25 | 0-100 |
| ITT | 2-25 | 0-100 |
| PAU | 25-inf | 0-100 |
| VFI | 1-5 | 0-100 |
| AFX | 25-inf | 0-100 |
| AFT | 25-inf | 0-100 |
| CHA | 10-inf | 0-100 |

Example 1D—PTSA2

Conditions:
Adsorption: 300K, 20 bar
Desorption: 373 K, 1 bar

| | Optimal boundaries | |
|---|---|---|
| Topology | Si/Al ratio | K/(K + Na)% |
| RWY | 3-10 | 0-100 |
| IRY | 2-25 | 0-100 |
| IRR | 2-25 | 0-100 |
| TSC | 10-inf | 0-100 |
| ITT | 10-inf | 0-100 |
| RHO | 25-inf | 0-100 |
| FAU | 2-25 | 0-100 |
| EMT | 3-inf | 0-100 |
| KFI | 25-inf | 0-100 |
| AFT | 25-inf | 0-100 |
| UFI | 25-inf | 0-100 |
| CHA | 25-inf | 0-100 |
| AFX | 25-inf | 0-100 |
| PAU | 25-inf | 0-100 |
| VFI | 1-5 | 0-100 |

The results are shown in Table 13

TABLE 13

PTSA1 Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| RWY_3_17 | 11.17 | 12.84 | 1.67 | 29 | 31 | 35 | 12.43 | 6.45 | 0.68 | 864.94 | 30 |
| IRY_3_0 | 8.68 | 12.37 | 3.70 | 33 | 36 | 48 | 9.64 | 6.69 | 0.58 | 1216.97 | 35 |
| IRR_5_50 | 7.76 | 9.56 | 1.80 | 28 | 33 | 43 | 12.01 | 7.98 | 0.54 | 1201.02 | 31 |
| FAU_5_83 | 7.12 | 8.58 | 1.46 | 34 | 32 | 38 | 8.03 | 5.38 | 0.41 | 1402.97 | 33 |
| KFI_25_100 | 6.99 | 8.22 | 1.23 | 33 | 33 | 36 | 10.74 | 4.06 | 0.40 | 1494.29 | 33 |
| RHO_25_83 | 6.98 | 8.17 | 1.19 | 29 | 31 | 53 | 10.62 | 3.82 | 0.45 | 1418.05 | 30 |
| TSC_10_17 | 6.87 | 8.11 | 1.25 | 28 | 34 | 46 | 13.46 | 3.89 | 0.45 | 1329.29 | 31 |
| UFI_25_100 | 6.82 | 7.92 | 1.10 | 33 | 30 | 35 | 8.76 | 3.41 | 0.43 | 1480.44 | 32 |
| EMT_5_33 | 6.74 | 8.74 | 2.00 | 33 | 33 | 44 | 9.60 | 6.79 | 0.43 | 1373.43 | 33 |
| ITT_5_50 | 6.57 | 8.86 | 2.29 | 29 | 34 | 46 | 11.02 | 7.68 | 0.48 | 1318.02 | 32 |
| PAU_50_67 | 6.40 | 7.77 | 1.37 | 33 | 32 | 39 | 9.61 | 3.82 | 0.37 | 1552.23 | 33 |
| VFI_1_0 | 6.38 | 7.89 | 1.52 | 31 | 33 | 36 | 9.67 | 8.69 | 0.41 | 1630.18 | 32 |
| AFX_50_0 | 6.36 | 7.57 | 1.22 | 32 | 31 | 37 | 7.56 | 3.66 | 0.41 | 1479.72 | 31 |
| AFT_50_33 | 6.25 | 7.37 | 1.12 | 30 | 30 | 35 | 7.59 | 3.67 | 0.41 | 1482.92 | 30 |
| CHA_25_50 | 6.24 | 7.52 | 1.28 | 32 | 31 | 36 | 7.23 | 3.82 | 0.41 | 1492.96 | 31 |
| LTA_10_33 | 5.87 | 6.94 | 1.07 | 31 | 31 | 44 | 9.42 | 3.72 | 0.40 | 1401.43 | 31 |
| STF_Si | 5.50 | 6.02 | 0.52 | 33 | 23 | 22 | 7.67 | 5.52 | 0.38 | 1603.81 | 28 |
| DAC_Si | 5.42 | 6.53 | 1.11 | 34 | 31 | 33 | 5.34 | 3.85 | 0.31 | 1686.90 | 32 |
| RRO_Si | 5.06 | 5.83 | 0.77 | 34 | 30 | 29 | 4.67 | 4.19 | 0.29 | 1688.62 | 32 |
| SFF_50_100 | 4.94 | 5.65 | 0.71 | 30 | 27 | 32 | 7.62 | 5.49 | 0.36 | 1625.45 | 29 |
| MWW_25_100 | 4.90 | 5.83 | 0.93 | 29 | 29 | 36 | 9.76 | 4.77 | 0.37 | 1575.44 | 29 |
| ITH_Si | 4.22 | 4.64 | 0.42 | 28 | 24 | 23 | 6.74 | 4.74 | 0.32 | 1635.73 | 26 |
| TER_Si | 4.20 | 4.75 | 0.55 | 28 | 24 | 23 | 6.98 | 5.17 | 0.34 | 1649.03 | 26 |
| STI_10_100 | 4.18 | 5.86 | 1.68 | 33 | 35 | 47 | 6.04 | 4.33 | 0.30 | 1698.98 | 34 |
| NES_50_100 | 4.15 | 4.82 | 0.66 | 30 | 27 | 37 | 7.05 | 4.85 | 0.33 | 1620.85 | 29 |
| CAS_Si | 4.11 | 4.64 | 0.53 | 36 | 34 | 34 | 10.33 | 3.41 | 0.17 | 1833.03 | 35 |
| TUN_Si | 4.10 | 4.61 | 0.52 | 28 | 24 | 23 | 8.72 | 5.51 | 0.34 | 1628.85 | 26 |
| HEU_Si | 4.07 | 5.26 | 1.18 | 31 | 30 | 31 | 5.83 | 4.17 | 0.33 | 1646.28 | 31 |
| FER_Si | 4.05 | 4.56 | 0.51 | 30 | 25 | 24 | 6.33 | 4.66 | 0.30 | 1704.70 | 28 |
| MFS_Si | 3.97 | 4.41 | 0.44 | 30 | 24 | 24 | 6.82 | 5.47 | 0.30 | 1685.27 | 27 |
| LAU_Si | 3.81 | 4.43 | 0.63 | 30 | 26 | 24 | 6.04 | 4.10 | 0.30 | 1689.47 | 28 |
| MFI_Si | 3.79 | 4.36 | 0.56 | 28 | 25 | 24 | 6.85 | 5.55 | 0.32 | 1654.46 | 26 |
| SZR_Si | 3.78 | 4.19 | 0.41 | 31 | 25 | 20 | 6.26 | 4.62 | 0.28 | 1696.17 | 28 |
| IMF_Si | 3.78 | 4.27 | 0.49 | 28 | 23 | 22 | 7.44 | 5.44 | 0.33 | 1648.76 | 25 |
| EUO_25_100 | 3.58 | 4.38 | 0.80 | 31 | 30 | 35 | 7.10 | 4.88 | 0.28 | 1677.21 | 30 |
| TON_Si | 3.32 | 3.86 | 0.54 | 32 | 26 | 25 | 5.77 | 5.19 | 0.23 | 1759.92 | 29 |
| MTT_Si | 2.89 | 3.38 | 0.49 | 31 | 26 | 25 | 6.30 | 5.19 | 0.23 | 1760.11 | 28 |
| MRE_10_100 | 1.66 | 2.28 | 0.62 | 33 | 33 | 38 | 6.43 | 3.05 | 0.16 | 1881.31 | 33 |

The results are shown in Table 14

TABLE 14

PTSA2 Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| RWY_3_17 | 14.39 | 16.06 | 1.67 | 32 | 31 | 35 | 12.43 | 6.45 | 0.68 | 864.94 | 32 |
| IRY_10_67 | 11.21 | 12.13 | 0.92 | 30 | 28 | 42 | 10.82 | 7.23 | 0.59 | 1171.74 | 29 |
| IRR_10_33 | 10.32 | 11.35 | 1.03 | 28 | 30 | 39 | 12.18 | 9.07 | 0.56 | 1155.96 | 29 |
| TSC_25_33 | 9.31 | 9.93 | 0.62 | 29 | 30 | 40 | 14.97 | 3.89 | 0.46 | 1304.09 | 29 |
| ITT_25_50 | 8.98 | 9.53 | 0.56 | 27 | 26 | 42 | 13.55 | 9.57 | 0.52 | 1239.83 | 27 |
| RHO_Si | 8.97 | 9.49 | 0.52 | 30 | 26 | 29 | 10.62 | 3.82 | 0.46 | 1386.76 | 28 |
| FAU_5_83 | 8.65 | 10.11 | 1.46 | 34 | 32 | 38 | 8.03 | 5.38 | 0.41 | 1402.97 | 33 |
| EMT_10_100 | 8.40 | 9.25 | 0.84 | 33 | 29 | 34 | 9.93 | 6.59 | 0.42 | 1350.71 | 31 |
| KFI_Si | 8.39 | 9.17 | 0.78 | 30 | 28 | 29 | 10.74 | 4.06 | 0.42 | 1458.36 | 29 |
| AFT_Si | 8.18 | 8.80 | 0.62 | 31 | 25 | 28 | 7.59 | 3.67 | 0.42 | 1469.05 | 28 |
| UFI_Si | 8.16 | 8.80 | 0.64 | 31 | 26 | 28 | 10.33 | 3.41 | 0.44 | 1444.84 | 29 |
| CHA_Si | 8.10 | 8.63 | 0.53 | 31 | 23 | 22 | 7.23 | 3.82 | 0.42 | 1465.94 | 27 |
| AFX_Si | 8.10 | 8.80 | 0.70 | 32 | 27 | 29 | 7.56 | 3.66 | 0.42 | 1468.58 | 30 |
| PAU_Si | 8.02 | 8.86 | 0.84 | 31 | 29 | 30 | 10.55 | 3.82 | 0.38 | 1535.92 | 30 |
| VFI_1_0 | 7.67 | 9.19 | 1.52 | 31 | 33 | 36 | 9.67 | 8.69 | 0.41 | 1630.18 | 32 |
| LTA_50_83 | 7.45 | 7.89 | 0.44 | 29 | 25 | 44 | 10.95 | 3.72 | 0.41 | 1362.60 | 27 |
| STF_Si | 6.93 | 7.45 | 0.52 | 34 | 23 | 22 | 7.67 | 5.52 | 0.38 | 1603.81 | 29 |
| MWW_50_100 | 6.47 | 7.15 | 0.69 | 30 | 26 | 30 | 9.76 | 4.94 | 0.39 | 1558.59 | 28 |
| SFF_Si | 6.37 | 6.80 | 0.42 | 30 | 22 | 21 | 7.62 | 5.49 | 0.37 | 1605.67 | 26 |
| CAS_Si | 4.43 | 4.96 | 0.53 | 35 | 34 | 34 | 10.33 | 3.41 | 0.17 | 1833.03 | 35 |

Example 1E—VSA

Conditions:
Adsorption: 300K, 1 bar
Desorption: 300K, 0.1 bar

| Optimal boundaries | | |
|---|---|---|
| Topology | Si/Al ratio | K/(K + Na)% |
| RWY | 3-10 | 0-100 |
| IRY | 2-10 | 0-100 |
| FAU | 2-25 | 0-100 |
| UFI | 10-inf | 0-100 |
| KFI | 10-inf | 0-100 |
| IRR | 1-10 | 0-100 |
| EMT | 2-10 | 0-100 |
| RHO | 3-50 | 0-100 |
| AFX | 10-inf | 0-100 |
| PAU | 25-inf | 0-100 |
| VFI | 1-5 | 0-100 |
| AFT | 10-inf | 0-100 |
| RRO | 25-inf | 0-100 |
| CHA | 10-inf | 0-100 |
| DAC | 25-inf | 0-100 |

The results are shown in Table 15

TABLE 15

VSA Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| RWY_3_17 | 5.34 | 7.33 | 1.99 | 30 | 34 | 35 | 12.43 | 6.45 | 0.68 | 864.94 | 32 |
| IRY_3_83 | 4.48 | 7.54 | 3.06 | 30 | 35 | 47 | 10.18 | 5.45 | 0.54 | 1278.16 | 33 |
| FAU_5_100 | 4.28 | 6.03 | 1.75 | 32 | 34 | 35 | 7.73 | 5.73 | 0.41 | 1411.84 | 33 |
| UFI_25_100 | 3.98 | 5.20 | 1.22 | 32 | 32 | 35 | 8.76 | 3.41 | 0.43 | 1480.44 | 32 |
| KFI_25_100 | 3.94 | 5.46 | 1.52 | 33 | 34 | 36 | 10.74 | 4.06 | 0.40 | 1494.29 | 33 |
| IRR_3_100 | 3.79 | 6.47 | 2.68 | 31 | 37 | 43 | 12.81 | 7.31 | 0.50 | 1284.82 | 34 |
| EMT_5_83 | 3.78 | 5.73 | 1.95 | 31 | 35 | 41 | 9.14 | 6.38 | 0.41 | 1401.81 | 33 |
| RHO_10_50 | 3.59 | 6.66 | 3.06 | 32 | 36 | 56 | 8.94 | 3.82 | 0.43 | 1449.17 | 34 |
| AFX_25_33 | 3.54 | 5.49 | 1.95 | 32 | 34 | 37 | 7.56 | 3.66 | 0.40 | 1494.57 | 33 |
| PAU_50_33 | 3.53 | 5.26 | 1.73 | 33 | 33 | 50 | 10.01 | 3.82 | 0.37 | 1549.18 | 33 |
| VFI_1_0 | 3.52 | 5.47 | 1.94 | 32 | 35 | 36 | 9.67 | 8.69 | 0.41 | 1630.18 | 34 |
| AFT_25_83 | 3.51 | 4.94 | 1.43 | 31 | 32 | 42 | 7.59 | 3.67 | 0.40 | 1501.73 | 32 |
| RRO_Si | 3.43 | 4.24 | 0.80 | 33 | 31 | 29 | 4.67 | 4.19 | 0.29 | 1688.62 | 32 |
| CHA_25_83 | 3.40 | 4.70 | 1.30 | 31 | 32 | 34 | 7.23 | 3.82 | 0.41 | 1497.78 | 32 |
| DAC_Si | 3.39 | 4.72 | 1.32 | 32 | 32 | 33 | 5.34 | 3.85 | 0.31 | 1686.90 | 32 |
| LTA_5_50 | 3.30 | 5.54 | 2.24 | 33 | 36 | 46 | 8.17 | 3.71 | 0.39 | 1458.46 | 34 |
| TSC_5_0 | 3.27 | 6.22 | 2.94 | 32 | 38 | 48 | 12.33 | 3.40 | 0.45 | 1359.20 | 35 |
| ITT_3_50 | 3.16 | 7.06 | 3.90 | 31 | 39 | 53 | 10.45 | 7.76 | 0.46 | 1368.48 | 35 |
| STF_50_100 | 3.13 | 3.94 | 0.81 | 30 | 30 | 33 | 7.67 | 5.52 | 0.36 | 1623.58 | 30 |
| HEU_Si | 2.84 | 4.14 | 1.30 | 31 | 32 | 31 | 5.83 | 4.17 | 0.33 | 1646.28 | 31 |

TABLE 15-continued

VSA Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| MWW_10_100 | 2.72 | 4.90 | 2.18 | 33 | 35 | 49 | 7.25 | 4.45 | 0.34 | 1625.99 | 34 |
| SFF_25_67 | 2.69 | 4.01 | 1.32 | 30 | 33 | 51 | 7.62 | 5.49 | 0.35 | 1639.66 | 32 |
| CAS_Si | 2.61 | 3.37 | 0.76 | 35 | 35 | 34 | 10.33 | 3.41 | 0.17 | 1833.03 | 35 |
| TER_50_100 | 2.31 | 3.16 | 0.86 | 28 | 30 | 33 | 6.98 | 5.17 | 0.32 | 1669.26 | 29 |
| STI_10_83 | 2.29 | 4.46 | 2.17 | 34 | 36 | 47 | 6.04 | 4.22 | 0.31 | 1692.28 | 35 |
| MFS_25_100 | 2.25 | 3.58 | 1.33 | 33 | 34 | 40 | 6.82 | 4.50 | 0.28 | 1725.88 | 33 |
| TUN_50_100 | 2.23 | 2.94 | 0.71 | 27 | 29 | 31 | 8.72 | 5.51 | 0.32 | 1648.92 | 28 |
| NES_10_67 | 2.22 | 4.56 | 2.34 | 35 | 37 | 51 | 7.04 | 4.02 | 0.30 | 1678.83 | 36 |
| FER_50_100 | 2.18 | 2.96 | 0.78 | 30 | 31 | 35 | 6.33 | 4.65 | 0.29 | 1725.23 | 30 |
| ITH_25_100 | 2.17 | 3.44 | 1.26 | 30 | 34 | 40 | 6.74 | 3.93 | 0.29 | 1675.66 | 32 |
| LAU_Si | 2.15 | 2.62 | 0.47 | 28 | 26 | 24 | 6.04 | 4.10 | 0.30 | 1689.47 | 27 |
| MFI_50_100 | 2.13 | 2.97 | 0.84 | 28 | 30 | 43 | 6.85 | 5.55 | 0.31 | 1674.84 | 29 |
| SZR_50_83 | 2.05 | 2.82 | 0.78 | 30 | 32 | 41 | 6.26 | 4.62 | 0.27 | 1715.03 | 31 |
| EUO_25_100 | 1.98 | 2.83 | 0.84 | 29 | 32 | 35 | 7.10 | 4.88 | 0.28 | 1677.21 | 31 |
| IMF_50_100 | 1.96 | 2.83 | 0.87 | 27 | 30 | 33 | 7.44 | 5.44 | 0.31 | 1668.62 | 29 |
| TON_Si | 1.95 | 2.38 | 0.43 | 29 | 27 | 25 | 5.77 | 5.19 | 0.23 | 1759.92 | 28 |
| MTT_Si | 1.59 | 1.96 | 0.37 | 28 | 26 | 25 | 6.30 | 5.19 | 0.23 | 1760.11 | 27 |
| MRE_10_100 | 0.96 | 1.70 | 0.74 | 33 | 34 | 38 | 6.43 | 3.05 | 0.16 | 1881.31 | 34 |

Example 1F—VTSA1

Conditions:
Adsorption: 300K, 1 bar
Desorption: 373K, 0.1 bar

Optimal boundaries

| Topology | Si/Al ratio | K/(K + Na)% |
|---|---|---|
| IRY | 2-10 | 0-100 |
| IRR | 2-10 | 0-100 |
| FAU | 1-10 | 0-100 |
| EMT | 1-10 | 0-100 |
| RWY | 3-10 | 0-100 |
| ITT | 2-10 | 0-100 |
| KFI | 1-10 | 0-100 |
| RHO | 1-25 | 0-100 |
| TSC | 1-5 | 0-100 |
| PAU | 1-25 | 0-100 |
| CHA | 1-25 | 0-100 |
| UFI | 2-10 | 0-100 |
| AFX | 1-25 | 0-100 |
| LTA | 1-5 | 0-100 |
| AFT | 2-10 | 0-100 |

The results are shown in Table 16

TABLE 16

VTSA1 Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| IRY_2_0 | 8.78 | 10.07 | 1.29 | 32 | 42 | 48 | 11.00 | 6.80 | 0.58 | 1250.14 | 37 |
| IRR_2_0 | 7.82 | 9.19 | 1.37 | 32 | 43 | 50 | 11.01 | 8.86 | 0.54 | 1244.85 | 38 |
| FAU_2_33 | 7.51 | 8.17 | 0.66 | 37 | 40 | 44 | 7.77 | 4.29 | 0.42 | 1469.88 | 39 |
| EMT_2_0 | 7.26 | 8.36 | 1.09 | 38 | 42 | 51 | 8.75 | 4.48 | 0.43 | 1432.34 | 40 |
| RWY_3_17 | 7.14 | 7.33 | 0.20 | 30 | 31 | 35 | 12.43 | 6.45 | 0.68 | 864.94 | 31 |
| ITT_2_17 | 6.92 | 8.33 | 1.41 | 33 | 45 | 54 | 10.78 | 7.88 | 0.48 | 1383.09 | 39 |
| KFI_3_0 | 6.83 | 7.97 | 1.14 | 39 | 44 | 50 | 8.38 | 3.25 | 0.37 | 1591.16 | 41 |
| RHO_5_0 | 6.71 | 8.39 | 1.68 | 36 | 46 | 58 | 9.03 | 3.82 | 0.44 | 1470.95 | 41 |
| TSC_1_0 | 6.60 | 7.55 | 0.96 | 34 | 44 | 54 | 12.11 | 1.49 | 0.42 | 1514.78 | 39 |
| PAU_10_33 | 6.41 | 7.39 | 0.98 | 36 | 44 | 54 | 8.55 | 3.82 | 0.35 | 1598.89 | 40 |
| CHA_1_0 | 6.33 | 7.53 | 1.20 | 43 | 45 | 58 | 4.47 | 1.18 | 0.32 | 1732.93 | 44 |
| UFI_2_0 | 6.14 | 7.65 | 1.52 | 35 | 45 | 49 | 7.86 | 2.25 | 0.42 | 1619.58 | 40 |
| AFX_10_17 | 6.01 | 6.68 | 0.67 | 35 | 41 | 46 | 7.56 | 3.66 | 0.39 | 1523.45 | 38 |
| LTA_1_0 | 5.93 | 7.42 | 1.49 | 38 | 46 | 48 | 7.60 | 1.49 | 0.38 | 1592.05 | 42 |
| AFT_5_0 | 5.78 | 7.53 | 1.74 | 38 | 46 | 57 | 6.82 | 3.67 | 0.37 | 1558.23 | 42 |
| VFI_2_0 | 5.31 | 5.68 | 0.38 | 32 | 38 | 45 | 9.70 | 8.26 | 0.40 | 1546.46 | 35 |
| STF_5_0 | 5.24 | 6.84 | 1.59 | 41 | 45 | 53 | 6.13 | 3.05 | 0.34 | 1700.80 | 43 |
| SFF_3_0 | 5.05 | 7.24 | 2.19 | 43 | 47 | 56 | 6.46 | 4.03 | 0.33 | 1751.88 | 45 |
| MWW_2_33 | 4.87 | 6.70 | 1.83 | 40 | 46 | 61 | 7.35 | 1.87 | 0.31 | 1770.73 | 43 |
| STI_2_0 | 4.82 | 7.18 | 2.36 | 45 | 49 | 56 | 4.92 | 2.86 | 0.30 | 1802.60 | 47 |
| DAC_50_17 | 4.75 | 5.06 | 0.31 | 33 | 38 | 47 | 5.34 | 3.85 | 0.30 | 1700.19 | 36 |
| RRO_10_83 | 4.57 | 5.22 | 0.64 | 38 | 44 | 54 | 4.66 | 2.98 | 0.23 | 1777.50 | 41 |
| NES_2_0 | 4.47 | 7.03 | 2.56 | 45 | 49 | 59 | 5.57 | 3.10 | 0.30 | 1794.39 | 47 |
| HEU_25_17 | 4.11 | 4.52 | 0.41 | 34 | 39 | 44 | 5.83 | 4.11 | 0.32 | 1672.23 | 36 |

TABLE 16-continued

VTSA1 Results

| Zeolite | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| MFS_10_17 | 4.04 | 4.90 | 0.86 | 36 | 44 | 54 | 6.82 | 3.68 | 0.28 | 1747.71 | 40 |
| FER_10_33 | 3.79 | 4.52 | 0.74 | 35 | 43 | 51 | 6.32 | 3.25 | 0.27 | 1774.17 | 39 |
| SZR_5_67 | 3.77 | 4.78 | 1.01 | 42 | 46 | 58 | 5.49 | 2.92 | 0.21 | 1849.39 | 44 |
| EUO_3_0 | 3.77 | 5.67 | 1.91 | 38 | 48 | 57 | 6.00 | 3.26 | 0.28 | 1787.16 | 43 |
| ITH_10_17 | 3.74 | 4.70 | 0.96 | 34 | 44 | 54 | 6.74 | 3.93 | 0.29 | 1696.30 | 39 |
| TER_10_17 | 3.66 | 4.88 | 1.22 | 35 | 44 | 63 | 6.98 | 3.24 | 0.30 | 1709.97 | 39 |
| TUN_10_67 | 3.60 | 4.09 | 0.48 | 33 | 39 | 46 | 6.99 | 3.52 | 0.29 | 1709.50 | 36 |
| LAU_10_0 | 3.44 | 4.55 | 1.11 | 35 | 44 | 59 | 6.04 | 3.44 | 0.27 | 1745.57 | 40 |
| MFI_10_33 | 3.34 | 4.23 | 0.88 | 34 | 43 | 57 | 6.85 | 3.02 | 0.29 | 1722.60 | 39 |
| CAS_Si | 3.31 | 3.37 | 0.06 | 35 | 34 | 34 | 10.33 | 3.41 | 0.17 | 1833.03 | 35 |
| IMF_10_0 | 3.28 | 4.33 | 1.04 | 35 | 43 | 55 | 7.44 | 3.24 | 0.30 | 1702.98 | 39 |
| MTT_10_83 | 2.60 | 2.93 | 0.33 | 35 | 40 | 43 | 6.29 | 2.92 | 0.19 | 1853.19 | 38 |
| TON_25_0 | 2.46 | 2.91 | 0.46 | 32 | 42 | 53 | 5.77 | 5.19 | 0.22 | 1783.96 | 37 |
| MRE_2_0 | 2.10 | 3.24 | 1.14 | 43 | 48 | 51 | 4.85 | 2.96 | 0.18 | 1996.05 | 45 |

Example 1G—VTSA2

Conditions:
Adsorption: 300K, 1 bar
Desorption: 473K, 0.2 bar

| Optimal boundaries | | |
|---|---|---|
| Topology | Si/Al ratio | K/(K + Na)% |
| IRY | 2-10 | 0-100 |
| FAU | 1-10 | 0-100 |
| EMT | 1-10 | 0-100 |
| IRR | 2-5 | 0-100 |
| ITT | 2-10 | 0-100 |
| RHO | 1-10 | 0-100 |
| PAU | 2-10 | 0-100 |
| KFI | 1-10 | 0-100 |
| UFI | 1-5 | 0-100 |
| TSC | 1-10 | 0-100 |
| CHA | 1-10 | 0-100 |
| AFT | 1-10 | 0-100 |
| AFX | 1-10 | 0-100 |
| RWY | 3-10 | 0-100 |
| LTA | 1-10 | 0-100 |

The results are shown in Table 17

TABLE 17

VTSA2 Results

| Name | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| IRY_2_0 | 9.88 | 10.07 | 0.19 | 32 | 39 | 48 | 11.00 | 6.80 | 0.58 | 1250.14 | 36 |
| FAU_1_0 | 9.28 | 9.62 | 0.34 | 40 | 45 | 52 | 7.60 | 3.01 | 0.41 | 1510.18 | 43 |
| EMT_1_0 | 9.09 | 9.51 | 0.42 | 36 | 46 | 54 | 8.74 | 3.05 | 0.41 | 1509.89 | 41 |
| IRR_2_0 | 8.97 | 9.19 | 0.22 | 32 | 41 | 50 | 11.01 | 8.86 | 0.54 | 1244.85 | 37 |
| ITT_2_0 | 8.36 | 8.65 | 0.28 | 31 | 44 | 57 | 10.27 | 8.41 | 0.49 | 1364.86 | 38 |
| RHO_3_0 | 8.19 | 8.53 | 0.34 | 36 | 49 | 58 | 7.73 | 2.44 | 0.42 | 1513.04 | 43 |
| PAU_5_0 | 8.00 | 8.47 | 0.47 | 41 | 52 | 61 | 7.49 | 3.19 | 0.33 | 1629.16 | 47 |
| KFI_3_0 | 7.80 | 7.97 | 0.16 | 39 | 41 | 50 | 8.38 | 3.25 | 0.37 | 1591.16 | 40 |
| UFI_2_0 | 7.44 | 7.65 | 0.21 | 35 | 43 | 49 | 7.86 | 2.25 | 0.42 | 1619.58 | 39 |
| TSC_1_0 | 7.42 | 7.55 | 0.13 | 34 | 40 | 54 | 12.11 | 1.49 | 0.42 | 1514.78 | 37 |
| CHA_1_0 | 7.40 | 7.53 | 0.14 | 43 | 43 | 58 | 4.47 | 1.18 | 0.32 | 1732.93 | 43 |
| AFT_3_0 | 7.37 | 7.73 | 0.36 | 39 | 47 | 56 | 5.67 | 3.67 | 0.36 | 1602.83 | 43 |
| AFX_3_0 | 7.28 | 7.57 | 0.29 | 43 | 45 | 53 | 6.07 | 2.24 | 0.36 | 1602.31 | 44 |
| RWY_3_17 | 7.28 | 7.33 | 0.06 | 30 | 28 | 35 | 12.43 | 6.45 | 0.68 | 864.94 | 29 |
| LTA_1_0 | 7.22 | 7.42 | 0.20 | 38 | 42 | 48 | 7.60 | 1.49 | 0.38 | 1592.05 | 40 |
| SFF_2_0 | 6.98 | 7.50 | 0.51 | 45 | 47 | 54 | 5.67 | 3.17 | 0.33 | 1800.62 | 46 |
| MWW_2_0 | 6.82 | 7.41 | 0.59 | 40 | 50 | 58 | 7.71 | 2.40 | 0.35 | 1725.15 | 45 |
| STF_2_0 | 6.62 | 7.14 | 0.52 | 44 | 48 | 55 | 5.56 | 3.07 | 0.33 | 1798.92 | 46 |
| VFI_2_0 | 5.61 | 5.68 | 0.07 | 32 | 35 | 45 | 9.70 | 8.26 | 0.40 | 1546.46 | 33 |
| CAS_2_0 | 3.97 | 4.23 | 0.25 | 43 | 60 | 67 | 3.86 | 1.96 | 0.14 | 2055.60 | 51 |

Example 1H—VTSA3

Conditions:
Adsorption: 300K, 5 bar
Desorption: 473K, 0.2 bar
The results are shown in Table 18

TABLE 18

VTSA3 Results

| Zeolite | ΔN mmol/cc |
|---|---|
| RWY_3_17 | 12.78 |
| IRY_2_0 | 12.74 |
| IRR_2_0 | 11.60 |
| FAU_1_0 | 10.76 |
| ITT_2_0 | 10.51 |
| EMT_1_0 | 10.34 |
| RHO_5_0 | 9.73 |
| TSC_1_0 | 9.23 |
| PAU_5_0 | 8.99 |
| KFI_5_0 | 8.90 |
| UFI_2_0 | 8.56 |
| AFT_5_0 | 8.39 |
| AFX_5_0 | 8.37 |
| LTA_1_0 | 8.12 |
| CHA_10_0 | 7.95 |
| VFI_1_0 | 7.85 |
| SFF_2_0 | 7.69 |
| MWW_2_0 | 7.68 |
| STF_5_0 | 7.43 |
| CAS_Si | 4.62 |

Example 1I—TSA

Conditions:
Adsorption: 300K, 1 bar
Desorption: 473K, 1 bar

Optimal boundaries

| Topology | Si/Al ratio | K/(K + Na)% |
|---|---|---|
| IRY | 2-10 | 0-100 |
| IRR | 2-10 | 0-100 |
| FAU | 1-10 | 0-100 |
| EMT | 1-10 | 0-100 |
| ITT | 2-10 | 0-100 |
| RHO | 1-25 | 0-100 |
| KFI | 1-10 | 0-100 |
| RWY | 1-10 | 0-100 |
| PAU | 1-25 | 0-100 |
| TSC | 1-10 | 0-100 |
| CHA | 1-10 | 0-100 |
| UFI | 1-10 | 0-100 |
| LTA | 1-10 | 0-100 |
| AFX | 1-10 | 0-100 |
| AFT | 1-10 | 0-100 |

The results are shown in Table 19

TABLE 19

TSA Results

| Name | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| IRY_2_0 | 9.21 | 10.07 | 0.86 | 32 | 39 | 48 | 11.00 | 6.80 | 0.58 | 1250.14 | 36 |
| IRR_2_0 | 8.26 | 9.19 | 0.94 | 32 | 40 | 50 | 11.01 | 8.86 | 0.54 | 1244.85 | 36 |
| FAU_1_0 | 8.21 | 9.62 | 1.41 | 40 | 45 | 52 | 7.60 | 3.01 | 0.41 | 1510.18 | 43 |
| EMT_1_0 | 7.93 | 9.51 | 1.59 | 36 | 45 | 54 | 8.74 | 3.05 | 0.41 | 1509.89 | 41 |
| ITT_2_0 | 7.53 | 8.65 | 1.12 | 31 | 43 | 57 | 10.27 | 8.41 | 0.49 | 1364.86 | 37 |
| RHO_5_0 | 7.34 | 8.39 | 1.05 | 36 | 44 | 58 | 9.03 | 3.82 | 0.44 | 1470.95 | 40 |
| KFI_3_0 | 7.25 | 7.97 | 0.72 | 39 | 42 | 50 | 8.38 | 3.25 | 0.37 | 1591.16 | 41 |
| RWY_3_17 | 7.07 | 7.33 | 0.27 | 30 | 28 | 35 | 12.43 | 6.45 | 0.68 | 864.94 | 29 |
| PAU_5_33 | 6.97 | 8.13 | 1.16 | 40 | 47 | 57 | 7.07 | 3.19 | 0.32 | 1651.71 | 44 |
| TSC_1_0 | 6.96 | 7.55 | 0.59 | 34 | 41 | 54 | 12.11 | 1.49 | 0.42 | 1514.78 | 37 |
| CHA_1_0 | 6.84 | 7.53 | 0.69 | 43 | 43 | 58 | 4.47 | 1.18 | 0.32 | 1732.93 | 43 |
| UFI_2_0 | 6.72 | 7.65 | 0.94 | 35 | 42 | 49 | 7.86 | 2.25 | 0.42 | 1619.58 | 39 |
| LTA_1_0 | 6.52 | 7.42 | 0.91 | 38 | 41 | 48 | 7.60 | 1.49 | 0.38 | 1592.05 | 40 |
| AFX_3_0 | 6.46 | 7.57 | 1.11 | 43 | 44 | 53 | 6.07 | 2.24 | 0.36 | 1602.31 | 43 |
| AFT_3_0 | 6.42 | 7.73 | 1.31 | 39 | 46 | 56 | 5.67 | 3.67 | 0.36 | 1602.83 | 43 |
| SFF_2_0 | 5.86 | 7.50 | 1.63 | 45 | 48 | 54 | 5.67 | 3.17 | 0.33 | 1800.62 | 46 |
| STF_5_0 | 5.72 | 6.84 | 1.11 | 41 | 44 | 53 | 6.13 | 3.05 | 0.34 | 1700.80 | 43 |
| MWW_3_0 | 5.62 | 7.32 | 1.70 | 38 | 47 | 60 | 7.52 | 2.80 | 0.36 | 1678.46 | 42 |
| VFI_2_0 | 5.34 | 5.68 | 0.34 | 32 | 35 | 45 | 9.70 | 8.26 | 0.40 | 1546.46 | 33 |
| CAS_2_0 | 3.37 | 4.23 | 0.85 | 43 | 57 | 67 | 3.86 | 1.96 | 0.14 | 2055.60 | 50 |

Example 1J—PSA3

Conditions:
Adsorption: 300K, 0.066 bar
Desorption: 300K, 0.0026 bar
The results are shown in Table 20

TABLE 20

PSA3 Results

| Name | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| FAU_1_0 | 4.53 | 7.10 | 2.57 | 45 | 48 | 52 | 7.60 | 3.01 | 0.41 | 1510.18 | 47 |
| KFI_1_0 | 4.48 | 6.21 | 1.73 | 49 | 50 | 52 | 6.98 | 1.22 | 0.34 | 1723.96 | 49 |
| EMT_1_0 | 4.29 | 6.99 | 2.71 | 45 | 49 | 54 | 8.74 | 3.05 | 0.41 | 1509.89 | 47 |
| CHA_1_0 | 4.26 | 5.54 | 1.28 | 47 | 47 | 58 | 4.47 | 1.18 | 0.32 | 1732.93 | 47 |
| IRY_2_0 | 4.21 | 5.31 | 1.10 | 39 | 46 | 48 | 11.00 | 6.80 | 0.58 | 1250.14 | 42 |
| IRR_2_0 | 4.11 | 5.41 | 1.31 | 41 | 47 | 50 | 11.01 | 8.86 | 0.54 | 1244.85 | 44 |
| UFI_2_0 | 3.93 | 5.43 | 1.50 | 43 | 48 | 49 | 7.86 | 2.25 | 0.42 | 1619.58 | 45 |
| LTA_1_0 | 3.92 | 5.44 | 1.51 | 44 | 49 | 48 | 7.60 | 1.49 | 0.38 | 1592.05 | 46 |
| TSC_1_0 | 3.84 | 4.75 | 0.91 | 43 | 47 | 54 | 12.11 | 1.49 | 0.42 | 1514.78 | 45 |
| RHO_3_0 | 3.74 | 5.88 | 2.15 | 41 | 49 | 58 | 7.73 | 2.44 | 0.42 | 1513.04 | 45 |
| AFX_3_0 | 3.67 | 5.48 | 1.81 | 45 | 48 | 53 | 6.07 | 2.24 | 0.36 | 1602.31 | 46 |
| AFT_3_0 | 3.61 | 5.98 | 2.37 | 45 | 49 | 56 | 5.67 | 3.67 | 0.36 | 1602.83 | 47 |
| ITT_2_17 | 3.59 | 4.94 | 1.35 | 42 | 48 | 54 | 10.78 | 7.88 | 0.48 | 1383.09 | 45 |
| PAU_5_33 | 3.49 | 5.67 | 2.18 | 44 | 50 | 57 | 7.07 | 3.19 | 0.32 | 1651.71 | 47 |
| MWW_2_33 | 3.43 | 5.24 | 1.80 | 44 | 47 | 61 | 7.35 | 1.87 | 0.31 | 1770.73 | 46 |
| SFF_2_0 | 3.17 | 5.99 | 2.82 | 48 | 50 | 54 | 5.67 | 3.17 | 0.33 | 1800.62 | 49 |
| STF_2_0 | 2.87 | 5.44 | 2.57 | 46 | 49 | 55 | 5.56 | 3.07 | 0.33 | 1798.92 | 48 |
| VFI_2_17 | 1.94 | 2.20 | 0.26 | 38 | 44 | 45 | 9.86 | 7.94 | 0.39 | 1566.89 | 41 |
| CAS_2_0 | 1.50 | 3.68 | 2.18 | 52 | 56 | 67 | 3.86 | 1.96 | 0.14 | 2055.60 | 54 |
| RWY_3_17 | 1.34 | 1.41 | 0.07 | 34 | 35 | 35 | 12.43 | 6.45 | 0.68 | 864.94 | 34 |

Example 1K—PSA4

Conditions:
Adsorption: 233K, 0.066 bar
Desorption: 233K, 0.0026 bar
The results are shown in Table 21

TABLE 21

PSA4 Results

| Name | ΔN mmol/cc | $N^{ads}$ mmol/cc | $N^{des}$ mmol/cc | $Q_{st}^{ads}$ kJ/mol | $Q_{st}^{des}$ kJ/mol | $Q_{st}^{0}$ kJ/mol | LCD (Di) Å | PLD (Df) Å | Accessible volume- | density kg/m³ | $Q_{st}^{ave}$ kJ/mol |
|---|---|---|---|---|---|---|---|---|---|---|---|
| RWY_3_17 | 6.99 | 9.50 | 2.50 | 29 | 36 | 35 | 12.43 | 6.45 | 0.68 | 864.94 | 32 |
| FAU_5_0 | 5.77 | 8.75 | 2.98 | 34 | 36 | 43 | 8.97 | 4.63 | 0.43 | 1355.07 | 35 |
| UFI_25_100 | 5.74 | 7.10 | 1.36 | 31 | 34 | 35 | 8.76 | 3.41 | 0.43 | 1480.44 | 33 |
| KFI_50_100 | 5.53 | 6.66 | 1.13 | 31 | 34 | 32 | 10.74 | 4.06 | 0.41 | 1476.32 | 32 |
| PAU_Si | 5.32 | 6.14 | 0.82 | 33 | 32 | 30 | 10.55 | 3.82 | 0.38 | 1535.92 | 32 |
| AFX_25_100 | 5.00 | 6.78 | 1.78 | 32 | 34 | 36 | 7.56 | 3.66 | 0.39 | 1504.77 | 33 |
| CHA_25_100 | 4.93 | 6.19 | 1.26 | 31 | 34 | 32 | 7.23 | 3.82 | 0.41 | 1500.19 | 32 |
| EMT_5_67 | 4.92 | 7.55 | 2.64 | 31 | 35 | 44 | 8.96 | 6.59 | 0.42 | 1392.94 | 33 |
| STF_50_100 | 4.86 | 5.65 | 0.79 | 31 | 33 | 33 | 7.67 | 5.52 | 0.36 | 1623.58 | 32 |
| RHO_10_100 | 4.83 | 7.88 | 3.05 | 32 | 35 | 56 | 7.98 | 3.82 | 0.42 | 1466.50 | 34 |
| AFT_25_0 | 4.81 | 6.80 | 1.99 | 31 | 35 | 55 | 7.59 | 3.67 | 0.41 | 1489.49 | 33 |
| IRY_5_50 | 4.46 | 7.09 | 2.63 | 29 | 36 | 44 | 10.09 | 6.33 | 0.57 | 1208.08 | 33 |
| IRR_5_50 | 4.43 | 7.05 | 2.62 | 29 | 36 | 43 | 12.01 | 7.98 | 0.54 | 1201.02 | 33 |
| LTA_10_100 | 4.42 | 5.41 | 0.99 | 30 | 35 | 36 | 8.28 | 3.72 | 0.38 | 1422.00 | 32 |
| VFI_1_0 | 4.25 | 6.84 | 2.58 | 32 | 37 | 36 | 9.67 | 8.69 | 0.41 | 1630.18 | 34 |
| TSC_10_0 | 4.05 | 6.07 | 2.02 | 29 | 36 | 45 | 13.61 | 3.89 | 0.46 | 1323.95 | 33 |
| ITT_5_100 | 3.71 | 6.14 | 2.43 | 29 | 35 | 44 | 11.20 | 7.01 | 0.46 | 1345.06 | 32 |
| SFF_25_67 | 3.62 | 5.08 | 1.45 | 30 | 35 | 51 | 7.62 | 5.49 | 0.35 | 1639.66 | 33 |
| MWW_10_100 | 3.49 | 6.01 | 2.52 | 33 | 35 | 49 | 7.25 | 4.45 | 0.34 | 1625.99 | 34 |
| CAS_Si | 3.44 | 4.48 | 1.04 | 36 | 36 | 34 | 10.33 | 3.41 | 0.17 | 1833.03 | 36 |

The relationship between the working capacity and accessible pore volume for the optimal composition of each topology has been investigated. Interestingly, almost linear correlations were observed for all these processes. FIG. 2 shows the case for PSA1. Based on the linear relationships, the upper bound of the working capacity for a specified process could be estimated for a zeolite material once its accessible pore volume was determined.

It was further found that their average Qst are located in a narrow range for each process. FIG. 3 shows the case for PSA1. The mean value with the standard deviation for all these optimal compositions were calculated to be 27±3, 32±2, 30±3, and 40±4 kJ/mol for PSA1, VSA, PTSA1, and VTSA1, respectively. In contrast, their heats of adsorption at zero coverage (Qst0) were located in a relatively larger range for each process (not shown). The results mean that suitable average Qst were required for maximizing the working capacity of each topology in a specified process. Too high an average Qst will lead to a large amount of residual adsorbed adsorbate at the desorption pressure, and therefore to a reduced working capacity, whereas too low an average Qst will also result in a low working capacity. As a result, for each topology there was an optimal average Qst for obtaining the maximum working capacity.

It was found that for each zeolite topology there was an optimal composition (Si/Al ratio and K/(K+Na) ratio) that yields the highest working capacity for the topology. Although for a specified process the optimal composition is topology-dependent, the average heats of adsorption of the optimal composition are close for different topologies. The highest performing materials were found to have both large pore volume and the optimal average heats of adsorption.

Figure 4A:
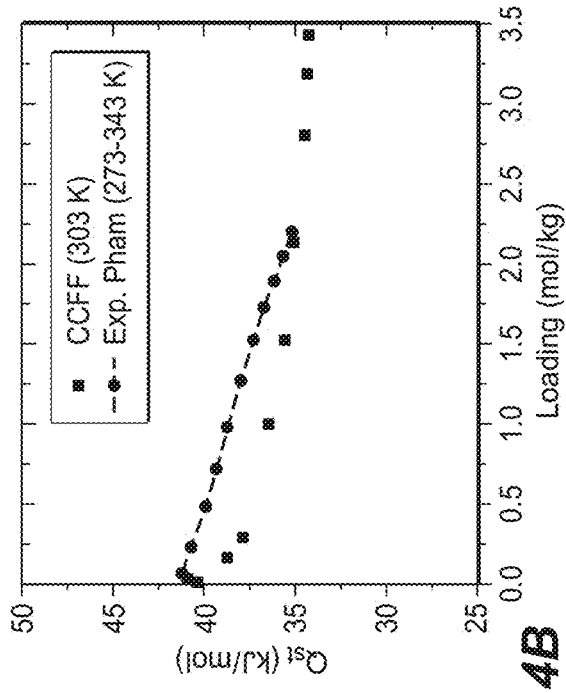
FIGS. 4(a)-(f) illustrate comparison of simulated and experimental adsorption properties of $CO_2$ in K-exchanged and K/Na-exchanged zeolites as follows: (a) isotherms and (b) isosteric heats of adsorption in K-CHA (Si/Al=12), (c) isotherms and (d) isosteric heats of adsorption in K-MCM-22 (Si/Al=15), (e) isotherms in KX (Si/Al=1.23) and KY (Si/Al=2.37) at 298 K, and (f) isotherms in K/Na-LTA (Si/Al=1, 17.4% K). The experimental data are from Pham et al. (Pham, T. D.; Liu, Q. L.; Lobo, R. F. *Langmuir* 2013, 29, 832), Zukal et al. (Zukal, A.; Pawlesa, J.; Cejke, J. *Adsorption* 2009, 15, 264), Walton et al. (Walton, K. S.; Abney, M. B.; LeVan, M. D. *Micropor Mesopor Mat* 2006, 91, 78), and Liu et al. (Liu, Q. L.; Mace, A.; Bacsik, Z.; Sun, J. L.; Laaksonen, A.; Hedin, N. *Chem Commun* 2010, 46, 4502). Lines are drawn to guide the eye.
Figure 4B:
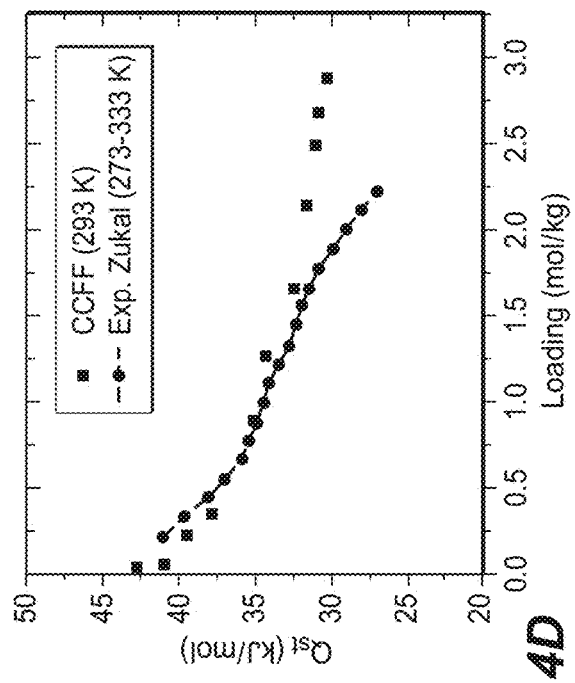
Figure 4C:
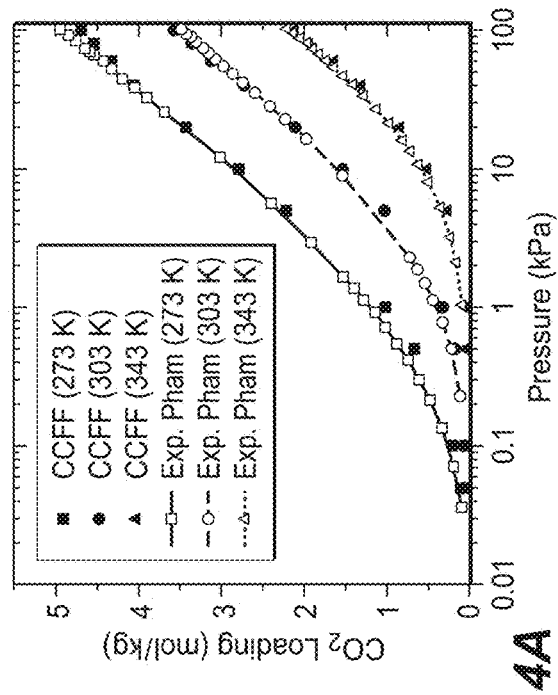
Figure 4D:
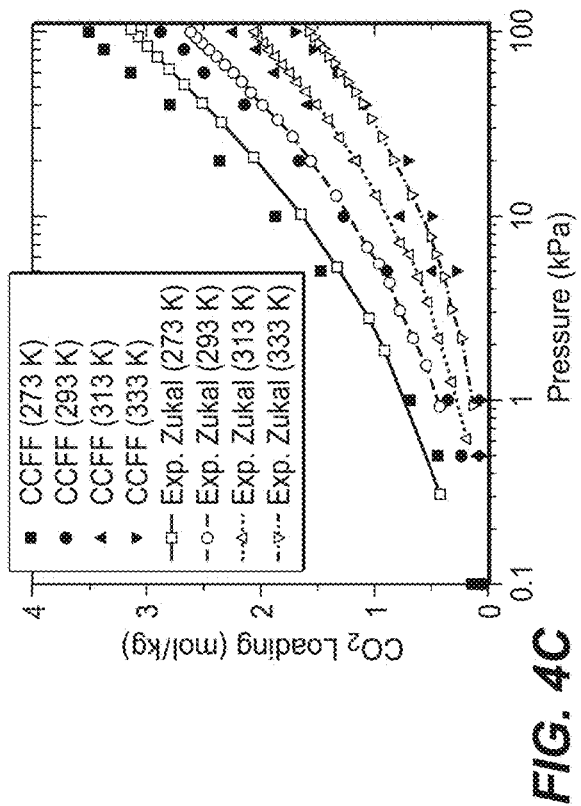
Figure 4E:
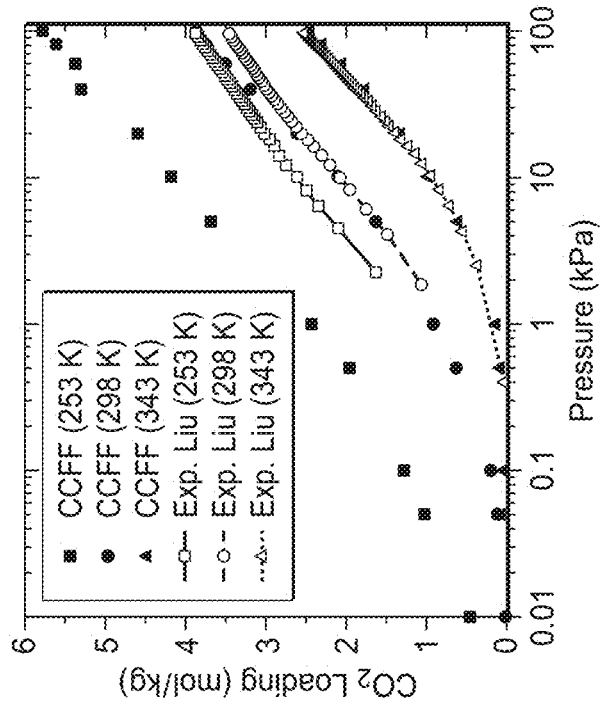

Example 2—Validation of Simulations $CO_2$ adsorption isotherms simulated with the developed CCFF force field were compared with the experimental data for a range of zeolites with different Si/Al ratios and cation compositions. FIG. 4 shows the comparison for $CO_2$ in several pure K- and mixed cation zeolites. The calculated results come from our first-principles derived force fields; these calculations were not fitted to experimental data in any way. For K-CHA (Si/Al=12, FIGS. 4a and 4b), the simulated isotherms based on CCFF are in excellent agreement with the experimental data from Pham et al. at all three temperatures. For K-MCM-22 (Si/Al=15, FIGS. 4c and 4d), CCFF makes predictions that are in reasonable agreement with experimental data reported by Zukal et al. at room and high temperatures, but slightly underestimates the $CO_2$ loading at low pressures and overestimates at high pressures at 273 K. FIG. 4e shows the comparison for $CO_2$ adsorption in KX and KY. Both materials have the same topology, FAU, but with different Si/Al ratios, 1.23 for KX and 2.37 for KY. The experimental samples prepared by Walton et al. have the compositions $K76Na10Al86Si106O384$ and $K5Na52Al57Si135O384$ for KX (88.7% K) and KY (91.7% K), respectively (Walton, K. S.; Abney, M. B.; LeVan, M. D. Micropor Mesopor Mat 2006, 91, 78). Reasonable agreement was found between the simulated isotherms and the experiments for these two samples, although CCFF may overestimate $CO_2$ loading slightly at low pressures for KX. The higher adsorption capacity of KX compared to KY in the medium pressure region may be due to the higher concentration of cation sites in KX, especially dual cation sites, where one $CO_2$ molecule can effectively interact with two cations.

Figure 4F:
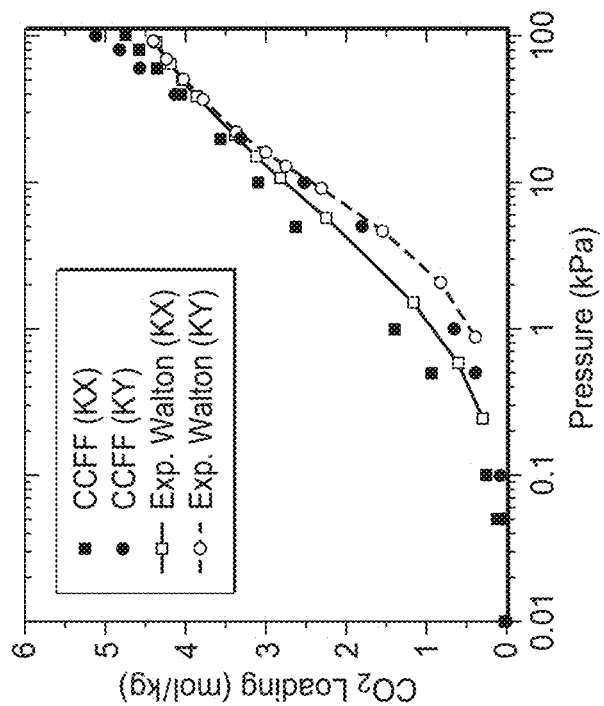

Finally, the force fields were applied to K/Na-LTA (Si/Al=1). Previous studies on separation of $CO_2/N_2$ using K/Na-LTA showed that K cations make it difficult for $CO_2$ to diffuse in the zeolite because they block 8MR windows. GCMC simulations alone cannot account for the blockage effect. Data was chosen from a sample with composition $K17Na79Al96Si96O384$ (17.4% K), since the blockage effect is likely to be small for this composition (Liu, Q. L.; Mace, A.; Bacsik, Z.; Sun, J. L.; Laaksonen, A.; Hedin, N. Chem Commun 2010, 46, 4502). As shown in FIG. 4f, the simulated isotherms at 29 8K and 343 K agree well with the experimental data reported by Liu et al. (Liu, Q. L.; Mace, A.; Bacsik, Z.; Sun, J. L.; Laaksonen, A.; Hedin, N. Chem Commun 2010, 46, 4502), but overestimated at 253 K for the whole pressure region. The significant deviation may be due to the slow adsorption kinetics of $CO_2$ in experimental measurement at this low temperature (Cheung, O.; Bacsik, Z.; Liu, Q. L.; Mace, A.; Hedin, N. Appl Energ 2013, 112, 1326).

The good performance of the CCFF force fields for $CO_2$ adsorption in the diverse zeolite samples represented in FIG. 4 indicates that this approach accurately describes these materials. This outcome means that for the first time a reliable force field for $CO_2$ adsorption in Na- and K-containing zeolites for the full range of Si/Al ratios is available. This situation opens the possibility of applying these methods to screening of zeolite materials for $CO_2$ capture at different process conditions.

$CO_2$ adsorption isotherms were determined for the following zeolites in order to validate the simulations. High-resolution adsorption isotherms of carbon dioxide were obtained by employing three different adsorption instruments. For measurements below 1 atm Autosorb-1 volumetric instrument (Quantachrome Instr.) and in-house Cahn gravimetric microbalance were used. For high-pressure measurements volumetric instrument iSORB (Quantachrome Instr.) was used. Prior to each adsorption experiment, zeolite samples were subjected to in-situ outgassing at 400 C under vacuum of the order of $1\times10^{-4}$ torr. The experimental isotherms were converted from excess to absolute adsorption using the theoretical (helium) pore volumes according to (Neimark, A. V.; Ravikovitch, P. I. Langmuir, 1997, 13, 5148)

$$N_{abs} = N_{ex} + \rho V_p$$

SSZ-35 (STF Framework Structure)

A gel of composition: 10.2 SDAOH: 2.65 $Na_2O$: $Al_2O_3$: 124 $SiO_2$: 1714 $H_2O$ was prepared by mixing 18.2 g of deionized water, 7.5 g of Cab-O-Sil fumed silica, 13.8 g of 13.65% 6,10-dimethyl-5-azoniaspiro(4,5)decane hydroxide, 0.4 g 50% sodium hydroxide, 0.2 g $Al(OH)_3$ (53% $Al_2O_3$), and 20 mg of SSZ-35 seeds in a plastic beaker with a spatula. The mixture was thoroughly homogenized in a 125 ml blender for 20 minutes and then placed in a 45 ml teflon-lined autoclave. The autoclave was placed in 170° C. oven and tumbled at 43 rpm for 7 days. The product was vacuum filtered, washed with de-ionized water and dried in an air oven at 110° C. Phase analysis by powder X-ray diffraction showed the sample to be pure SSZ-35 zeolite. The sample was then calcined in air for three hours at 600° C. to remove the organic template.

The sample was then ammonium exchanged by mixing 6.3 g of the calcined sample with 6.3 g $NH_4Cl$ in 63 mls de-ionized water for 1 hr at 60-80° C. on a hot plate stirrer. The sample was then calcined again at 600° C. for three hours in air, and then re-exchanged a second time as before. Elemental analysis by ICP gave Si/Al=78 and Na/Al=0.04.

Figure 5:
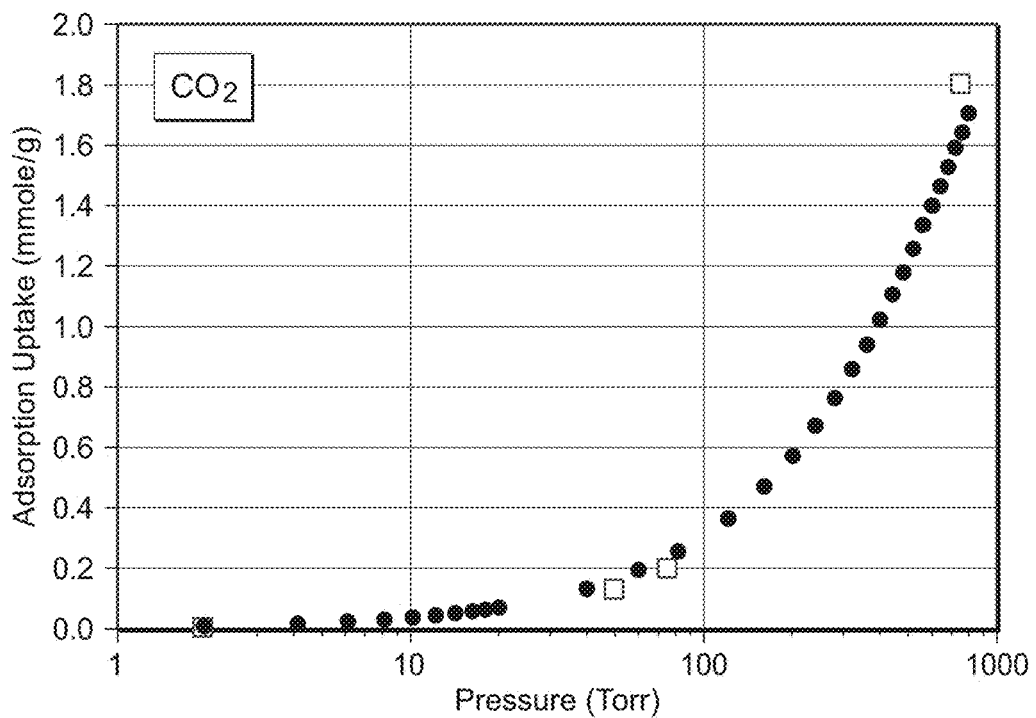
FIG. 5 illustrates a $CO_2$ adsorption isotherm for SSZ-35 (circles) compared to the simulated $CO_2$ adsorption (open squares).

The $CO_2$ adsorption isotherm for SSZ-35 is shown in FIG. 5, which shows the comparison to the simulations (open squares) and the experimental SSZ-35 (points).

SSZ-13 (CHA Framework Structure)

A gel of composition: 3 SDAOH: 10 $Na_2O$: $Al_2O_3$: 35 $SiO_2$: 1000 $H_2O$ was prepared by adding 8.9 g of 25% trimethyladamantaammonium hydroxide, 0.7 g of 50% NaOH, 21.0 g of sodium silicate (29% $SiO_2$, 9% Na2O), 42.3 g of de-ionized water and 2.1 g of USY zeolite (Englehard EZ-190, 60.2% $SiO_2$, 17.2% $Al_2O_3$) to a 125 ml teflon autoclave. The mixture was reacted for three days at 140° C. in a tumbling oven rotating at 20 rpm. The product was vacuum filtered, washed with de-ionized water and dried in an air oven at 115° C. Phase analysis by powder X-ray diffraction showed the sample to be pure SSZ-13 zeolite. Elemental analysis by ICP gave Si/Al=8.2 and Na/Al=0.49.

Zeolite RHO

A gel of composition: 0.44 $Cs_2O$: 0.5 $TEA_2O$: 2.46 $Na_2O$: $Al_2O_3$: 11.1 $SiO_2$: 110 $H_2O$ was prepared by first preparing a cesium, sodium aluminate solution by dissolving 7.9 g NaOH in 10 mls distilled H$_2$O and 10.4 g 50% CsOH. Added 6.16 g of Al$_2$O$_3$.3H$_2$O and heated to a boil until alumina dissolved and then cooled down to room temperature. To a 250 ml beaker added 65.8 g of 40% colloidal silica (Ludox HS-40), 14.5 g of 40% TEAOH, cesium, sodium aluminate solution and enough water to bring the total weight of solution to 125 g. The solution was mixed thoroughly with a spatula, transferred to a 125 ml teflon bottle and allow to age at room temperature for four days and then in an 85° C. oven for three days. The product was vacuum filtered, washed with distilled water and dried in an air oven at 115° C. Phase analysis by powder X-ray diffraction showed the sample to be pure RHO zeolite. Elemental analysis by ICP and AA gave Si/Al=3.1, Cs/Al=0.45, and Na/Al=0.51.

Figure 6:
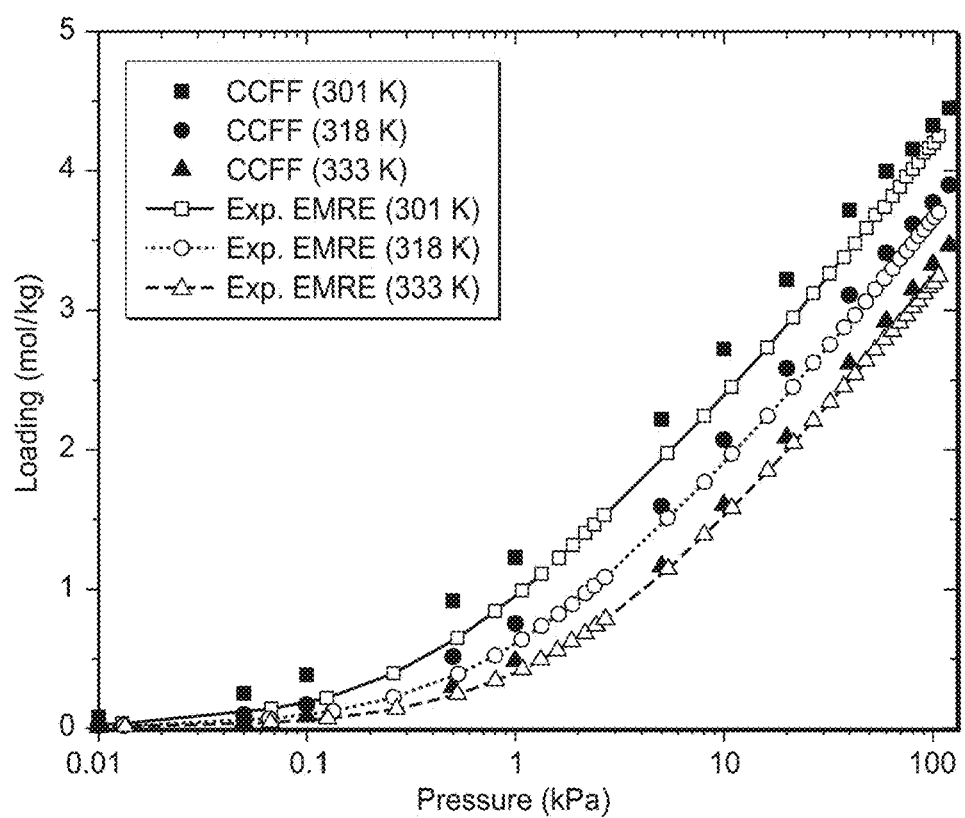
FIG. 6 illustrates $CO_2$ adsorption isotherms at different temperatures (open symbols) for SSZ-13 (circles) compared to the simulated $CO_2$ adsorption isotherms (points).

In another example SSZ-13 material has been prepared with Si/Al=7, and Na/Al=0.75. CO$_2$ adsorption isothermss for SSZ-13 (open symbols) at different temperatures are compared to the simulated CO$_2$ adsorption isotehrms (solid symbols) in FIG. 6.

SSZ-16 (AFX Framework Structure)

A gel of composition: 0.3 SDA(OH)2: 0.3 NaOH: 0.025 Al$_2$O$_3$: SiO$_2$: 30 H$_2$O was prepared by adding 15.7 g Ludox LS-30 colloidal silica, 31.6 g of 22.6% Pentane-1,5-bis(N-methylpiperidinium hydroxide), 1.5 g of 50% NaOH, 0.8 g USALCO 45 sodium aluminate solution (19.3% Na2O, 25% Al$_2$O$_3$), and 5.4 g deionized water to a plastic beaker. The mixture was stirred for three hours and then placed in two 23 and one 45 ml teflon autoclaves. It was then reacted for three days at 160° C. in a tumbling oven rotating at 20 rpm. The product was vacuum filtered, washed with de-ionized water and dried in an air oven at 115° C. Phase analysis by powder X-ray diffraction showed the sample to be pure SSZ-16 zeolite. Elemental analysis by ICP gave Si/Al=4.7 and Na/Al=0.59.

Figure 7:
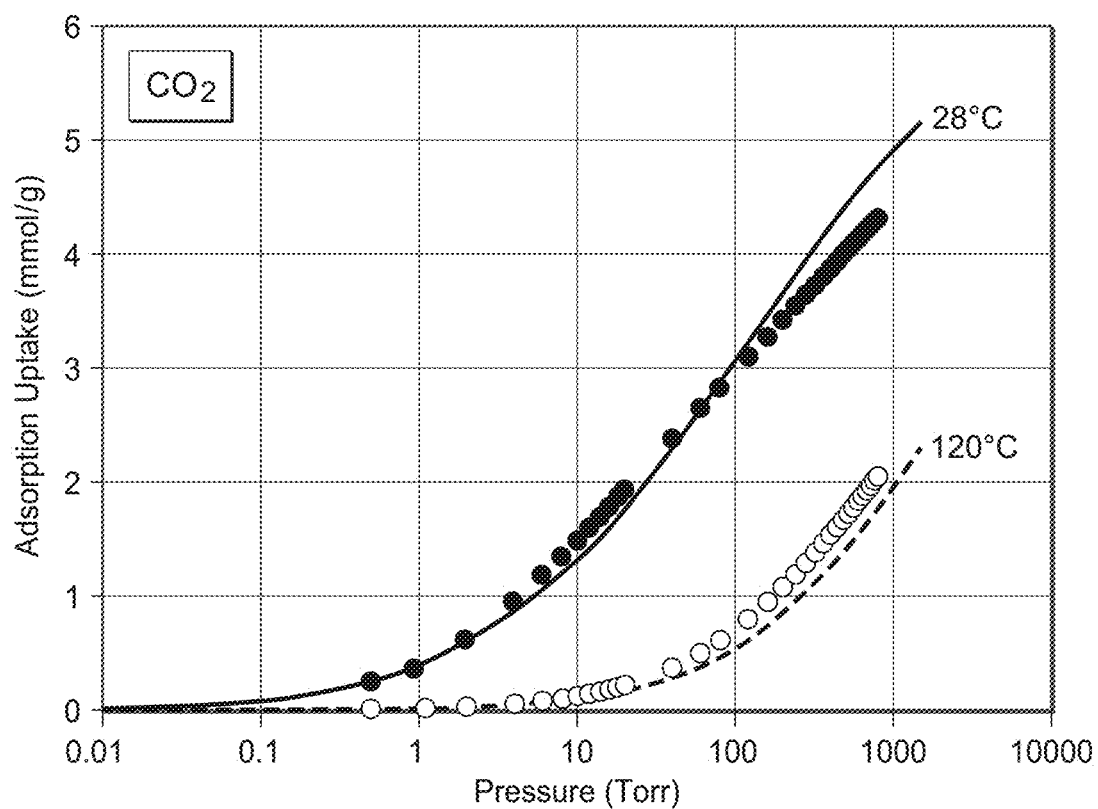
FIG. 7 illustrates a $CO_2$ adsorption isotherm for SSZ-16 (points) compared to the simulated $CO_2$ adsorption (lines) at 28° C. and 120° C.

CO$_2$ adsorption isotherms for SSZ-16 (points) are compared to the simulated CO$_2$ adsorption (lines) in FIG. 7.

What is claimed is:

1. A pressure temperature swing adsorption process for separating a CO$_2$ from a feed gas mixture, wherein the process comprises:
    a) subjecting the feed gas mixture comprising CO$_2$ to an adsorption step by introducing the feed gas mixture into a feed input end of an adsorbent bed, wherein the adsorbent bed comprises:
        a feed input end and a product output end; and
        an adsorbent material selective for adsorbing CO$_2$, wherein the adsorbent material comprises one or more of the following:
        (i) a zeolite having a Si/Al ratio above about 100 and a framework structure selected from the group consisting of AFT, AFX, CAS, DAC, HEU, IMF, ITH, KFI, LAU, MFS, MTT, PAU, RRO, SFF, STF, SXR, TER, TON, TUN, and a combination thereof; or
        (ii) a zeolite with a framework structure selected from the group consisting of AFT, AFX, CHA, EMT, EUO, FAU, IRR, IRY, ITT, KFI, LTA, MRE, MWW, NES, PAU, RHO, RWY, SFF, STI, TSC, UFI, VFI, and a combination thereof, having:
            a. a Si/Al ratio of about 3 to about 100; and
            b. a potassium cation concentration of about 1% to about 100%;
        wherein the adsorbent bed is operated at a first pressure and at a first temperature, and wherein at least a portion of the CO$_2$ in the feed gas mixture is adsorbed by the adsorbent bed and wherein a gaseous product depleted in CO$_2$ exits the product output end of the adsorbent bed;
    b) stopping the introduction of the feed gas mixture to the adsorbent bed before breakthrough of CO$_2$ from the product output end of the adsorbent bed;
    c) heating the adsorbent bed to a second temperature higher than the first temperature, resulting in desorption of at least a portion of CO$_2$ from the adsorbent bed and recovering at least a first portion of CO$_2$; and
    d) reducing the pressure of the adsorbent bed to a second pressure lower than the first pressure and recovering a second portion of CO$_2$, and
    wherein the first temperature is from about −20° C. to about 80° C. and the first pressure is such that the partial pressure of CO$_2$ is from about 3 bar to about 25 bar.

2. The process of claim 1, wherein the first temperature is from about 0° C. to about 50° C. and the first pressure is such that the partial pressure of CO$_2$ is from about 3 bar to about 10 bar.

3. The process of claim 1, wherein the first temperature is from about 0° C. to about 50° C. and the first pressure is such that the partial pressure of CO$_2$ is from about 15 bar to about 25 bar.

4. The process of claim 1, wherein the second temperature is from about 50° C. to about 150° C., and the second pressure is such that the partial pressure of CO$_2$ is from about 0.5 bar to about 2 bar.

5. The process of claim 1, wherein the feed gas mixture is a natural gas stream.

6. The process of claim 1, wherein the adsorbent material has a working capacity of about 3.0 mmol/cc to about 17.0 mmol/cc.

7. The process of claim 1, wherein the adsorbent bed has open flow channels throughout its entire length through which the feed gas mixture is passed.

8. The process of claim 7, wherein the adsorbent bed is a parallel channel contactor.

9. The process of claim 1, wherein the adsorbent material is a zeolite having a Si/Al ratio above about 100 and a framework structure selected from the group consisting of AFT, AFX, CAS, DAC, HEU, IMF, ITH, KFI, LAU, MFS, MTT, PAU, RRO, SFF, STF, SXR, TER, TON, TUN, and a combination thereof.

10. The process of claim 1, wherein the adsorbent material is a zeolite with a framework structure selected from the group consisting of EUO, IRR, IRY, ITT, MRE, MWW, NES, PAU, RWY, SFF, STI, UFI, VFI, and a combination thereof, having:
    a. a Si/Al ratio of about 3 to about 75; and
    b. a potassium cation concentration about 1% to about 100%.

11. The process of claim 1, wherein the adsorbent material comprises one or more of the following:
    (i) a zeolite having a Si/Al ratio above about 100 and a framework structure selected from the group consisting of AFT, AFX, KFI, PAU, TSC, and a combination thereof; or
    (ii) a zeolite with a framework structure selected from the group consisting of AFT, AFX, CHA, KFI, LTA, PAU, RHO, TSC, UFI and a combination thereof, having:
        a. a Si/Al ratio of about 5 to about 60; and
        b. a potassium cation concentration of about 1% to about 100%.

12. The process of claim 1, wherein the adsorbent material is a zeolite having a Si/Al ratio above about 100 with a framework structure selected from the group consisting of CAS, DAC, IMF, ITH, LAU, MFS, MTT, PAU, RRO, SFF, STF, SXR, TER, TON, TUN, and a combination thereof.

* * * * *